United States Patent [19]

Provisor et al.

[11] Patent Number: 4,517,638

[45] Date of Patent: May 14, 1985

[54] APPARATUS AND METHOD OF MICROPROCESSOR-CONTROLLING LASER SCANNING OF A MATERIAL HELD BY A TRANSPORT, THE LOADING AND UNLOADING OF THE TRANSPORT ALSO BEING MICROPROCESSOR-CONTROLLED

[75] Inventors: Zvi Provisor, Fairfax; Henry H. T. Burford, Jr., Annandale, both of Va.

[73] Assignee: Crosfield Data Systems, Inc., Springfield, Va.

[21] Appl. No.: 388,813

[22] Filed: Jun. 16, 1982

[51] Int. Cl.³ .................... G06F 15/46; H04N 1/06
[52] U.S. Cl. ................................ 364/146; 271/3; 358/290; 364/514; 364/478
[58] Field of Search ............ 364/514, 518, 523, 525, 364/527, 478, 200, 900; 358/75, 77, 78, 256, 280, 285, 286, 287, 288, 289, 290, 291, 903; 350/6.1, 6.2, 6.9, 6.91, 6.5; 271/3, 110, 121, 250, 265, 267, 268, 269, 277, 258, 259

[56] References Cited

U.S. PATENT DOCUMENTS

| | | | |
|---|---|---|---|
| 3,139,319 | 6/1964 | Mellon | 364/518 X |
| 3,651,256 | 3/1972 | Sherman et al. | 358/290 |
| 3,849,592 | 11/1974 | Rosenheck | 358/286 |
| 3,875,587 | 4/1975 | Pugsley | 358/80 |
| 3,889,057 | 6/1975 | Perreault et al. | 358/267 |
| 3,921,969 | 11/1975 | Hickey et al. | 271/3 |
| 3,949,159 | 4/1976 | Ricards et al. | 358/286 |
| 4,007,362 | 2/1977 | Sindermann | 358/280 X |
| 4,033,575 | 7/1977 | Fujimoto | 271/3 |
| 4,054,928 | 10/1977 | Butler et al. | 358/283 |
| 4,075,663 | 2/1978 | Wellendorf | 358/283 |
| 4,131,916 | 12/1978 | Landsman | 358/285 |
| 4,139,243 | 2/1979 | Landsman | 308/9 |
| 4,196,450 | 4/1980 | Miller et al. | 358/903 X |
| 4,205,350 | 5/1980 | Gunning | 358/285 X |
| 4,206,482 | 6/1980 | DeLavalette | 358/290 |
| 4,233,636 | 11/1980 | Harbaugh et al. | 358/287 |
| 4,254,439 | 3/1981 | Fowler et al. | 358/265 |
| 4,280,145 | 7/1981 | Norrell | 358/289 |
| 4,295,167 | 10/1981 | Wiggins | 358/285 |
| 4,303,948 | 12/1981 | Arai et al. | 358/287 |
| 4,305,093 | 12/1981 | Nasu | 358/75 |
| 4,326,222 | 4/1982 | Connin et al. | 358/293 |
| 4,327,380 | 4/1982 | Yamada et al. | 358/264 |
| 4,345,276 | 8/1982 | Colomb | 358/903 X |
| 4,405,951 | 9/1983 | Omori et al. | |

OTHER PUBLICATIONS

Service Manual–Logescan Model 2417–Laser Platemaking System–Logescan Systems–Springfield, VA–Feb. 1, 1980.

Primary Examiner—Joseph F. Ruggiero
Attorney, Agent, or Firm—William D. Hall

[57] ABSTRACT

A laser platemaking control system includes a control panel (410), microprocessor means (408, 424), and an interface (524) therebetween, the control system controlling (a) the loading and unloading of transports (150) onto and from the inner surface of a support with an arcuate cross-section perpendicular to the longitudinal axis of the drum (243), (b) the translational scanning of paste-ups (478) to be optically read and plates (516) or the like to be optically written on by optical devices (462, 502) which are translated along and rotated about the drum axis, and (c) the selection of size and position of paste-ups (478) and plates (516) on a transport to be scanned. A display (412) also provides communication to an operator from the microprocessor means (403, 424). The microprocessors (403) and (424) are, optionally, incorporated into a single microprocessor.

32 Claims, 52 Drawing Figures

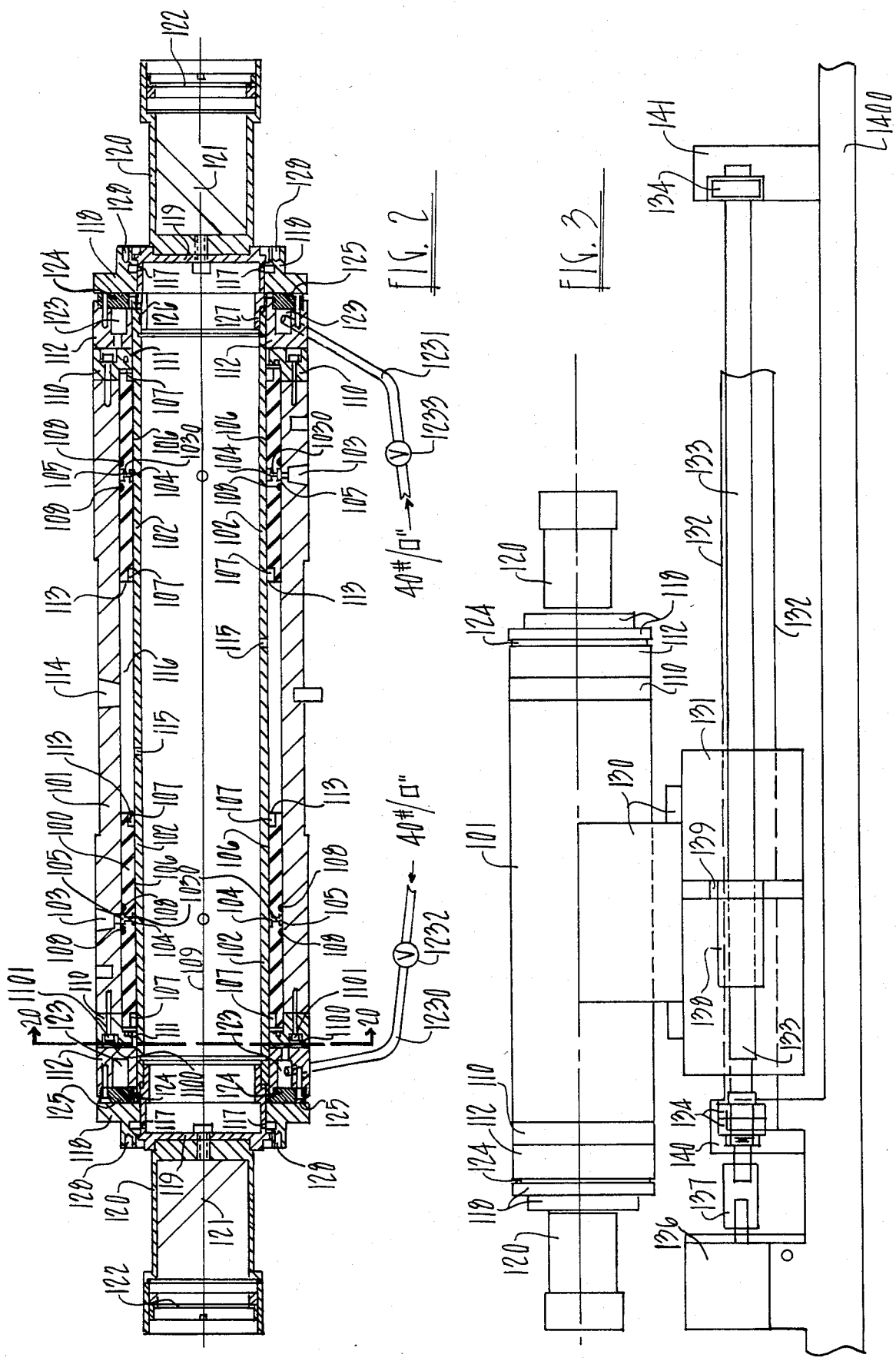

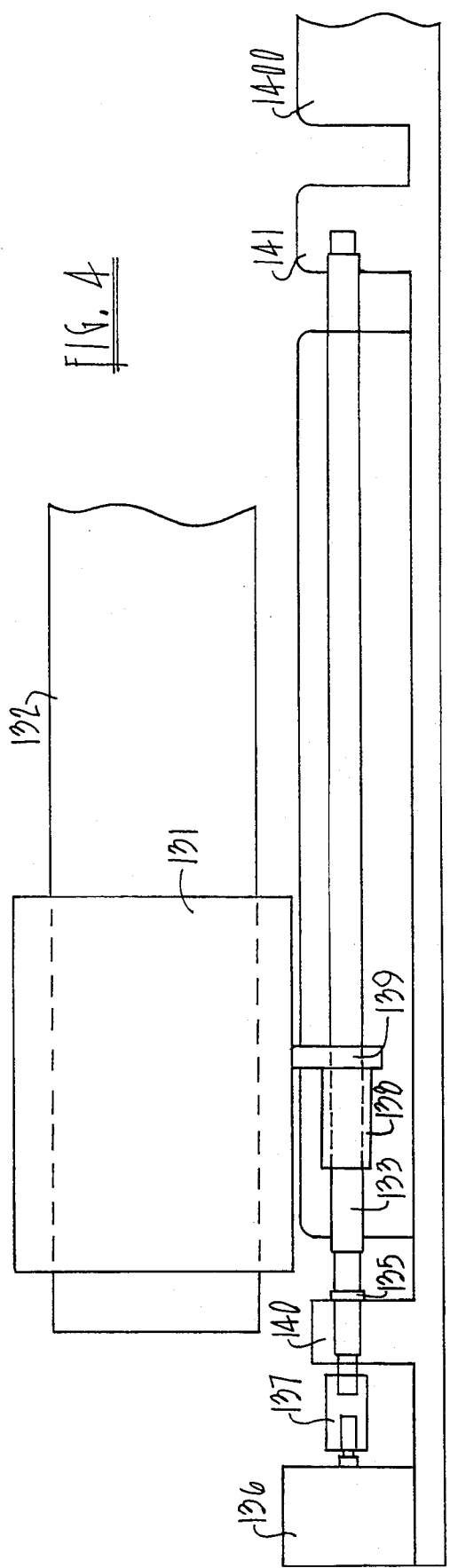
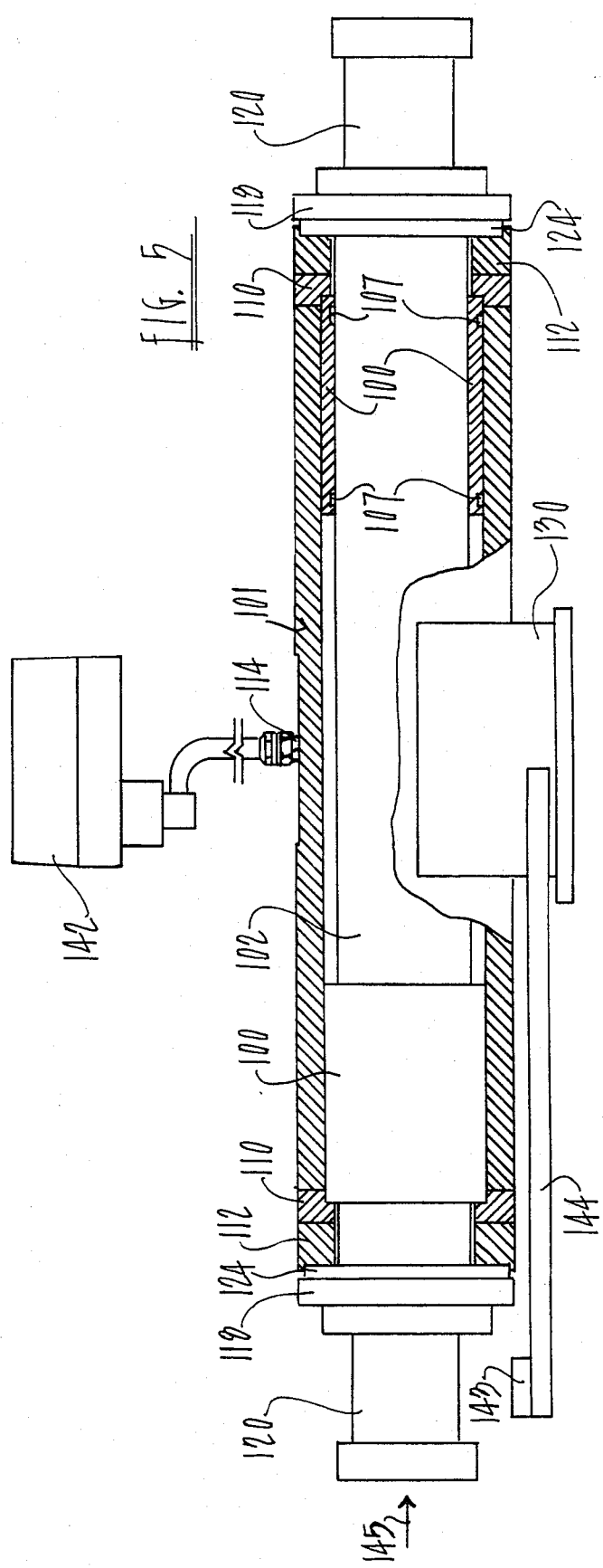

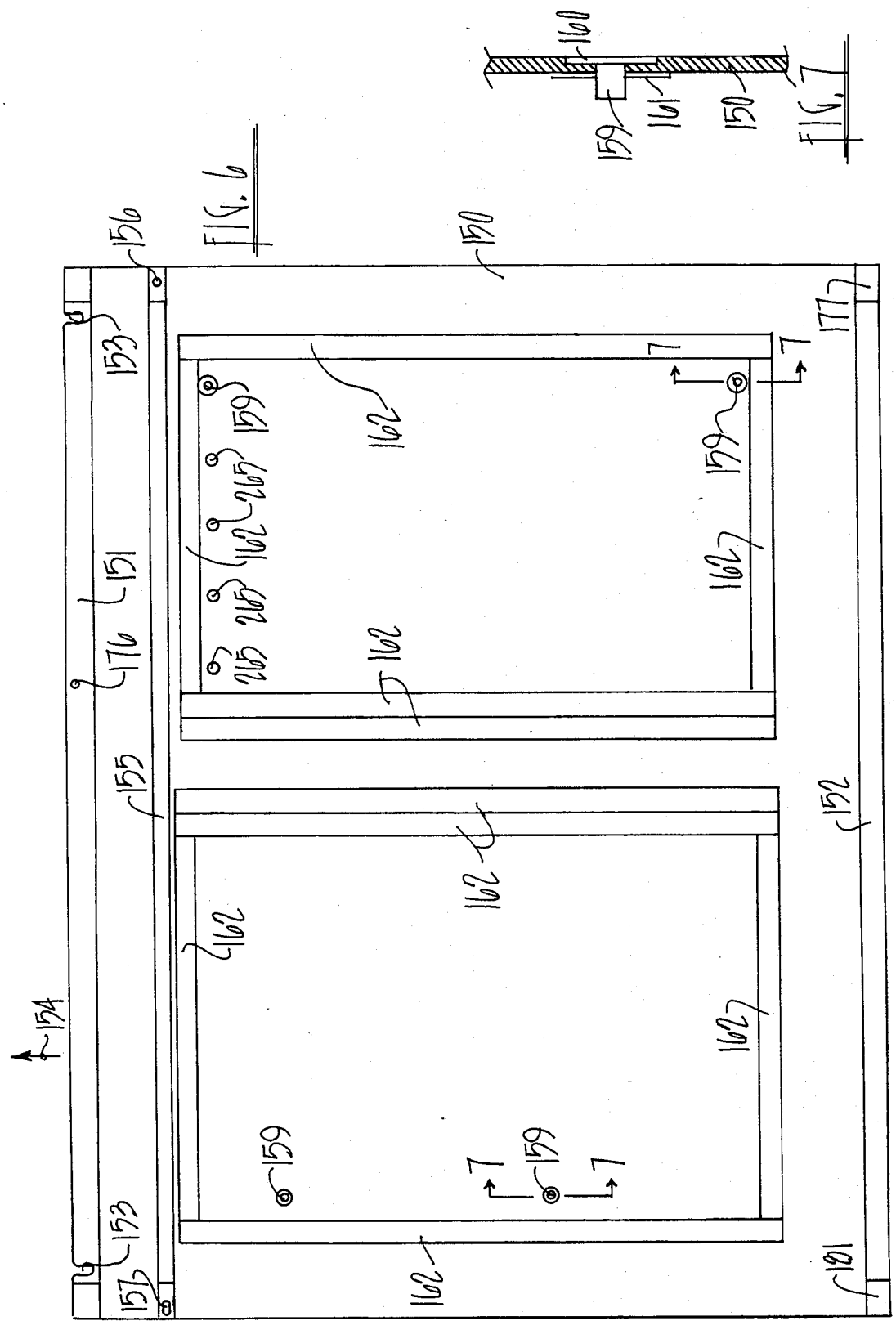

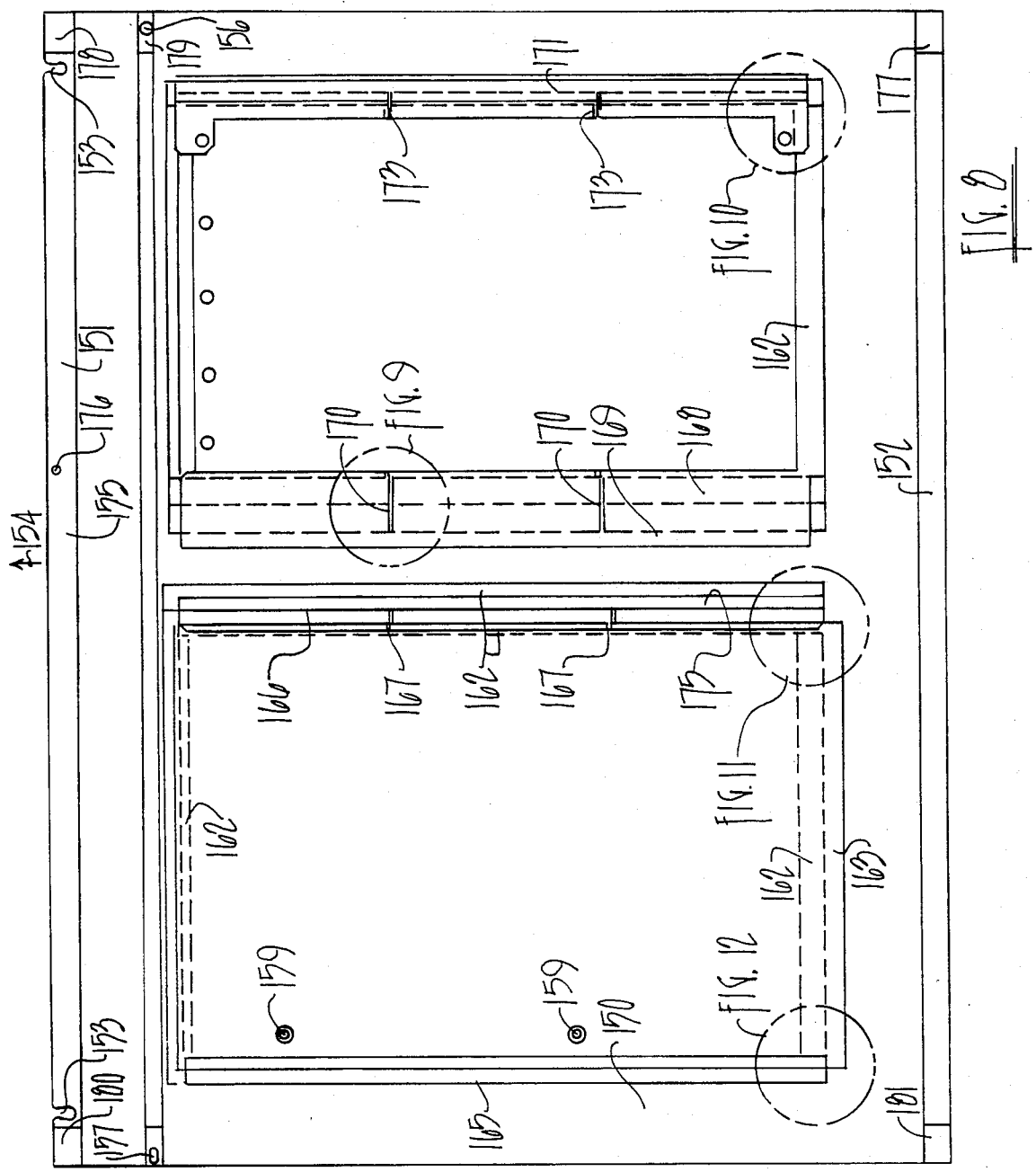

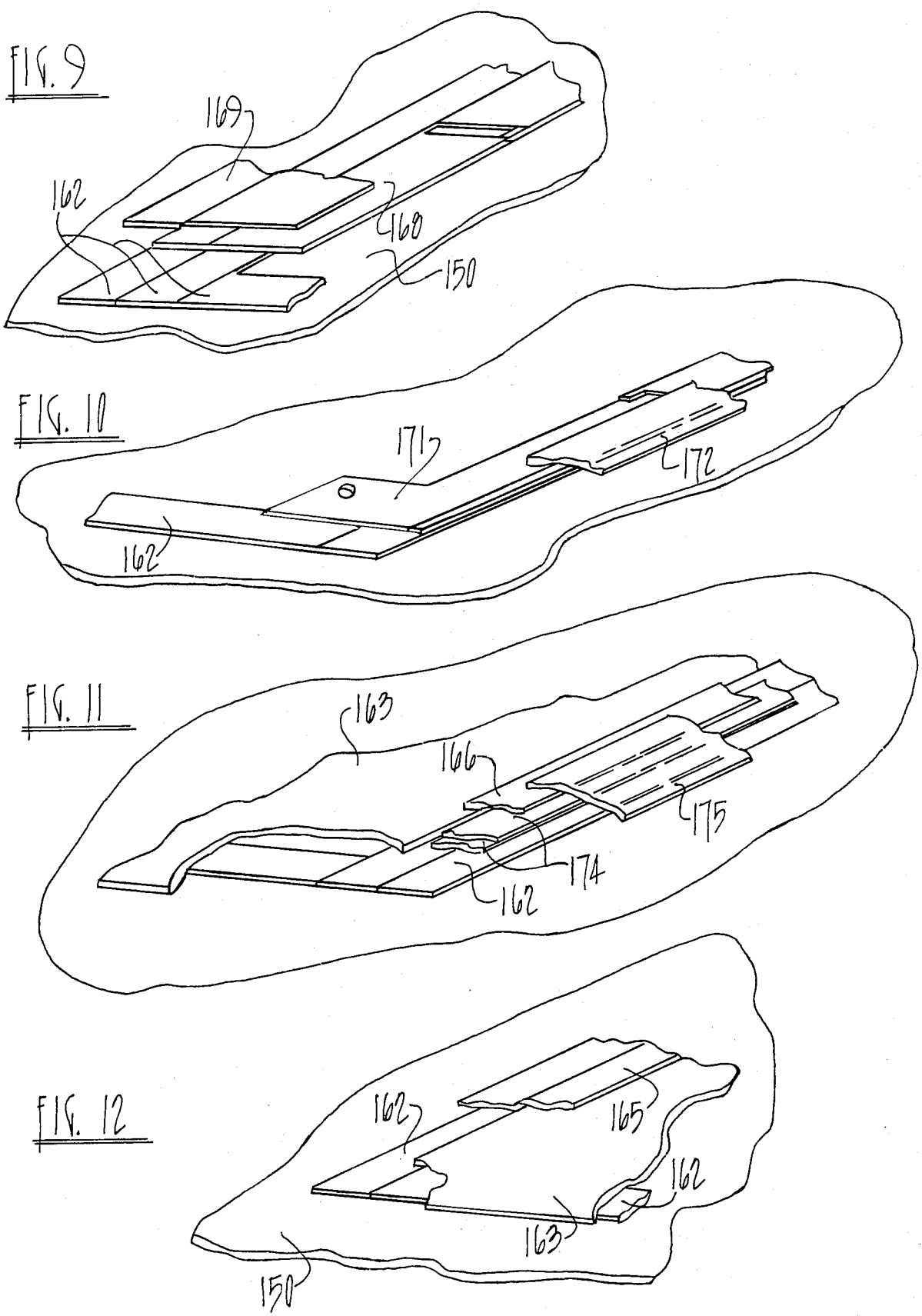

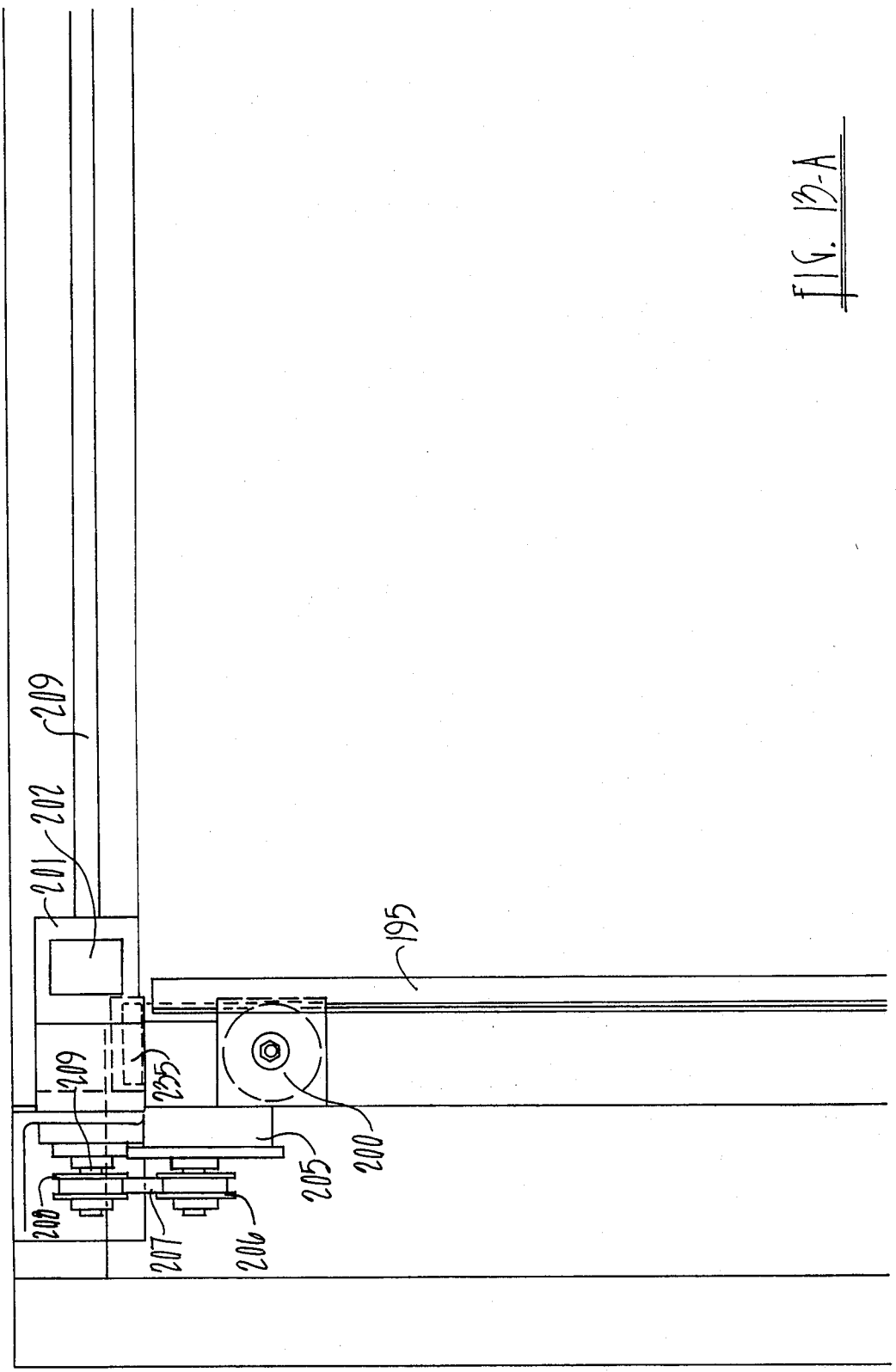

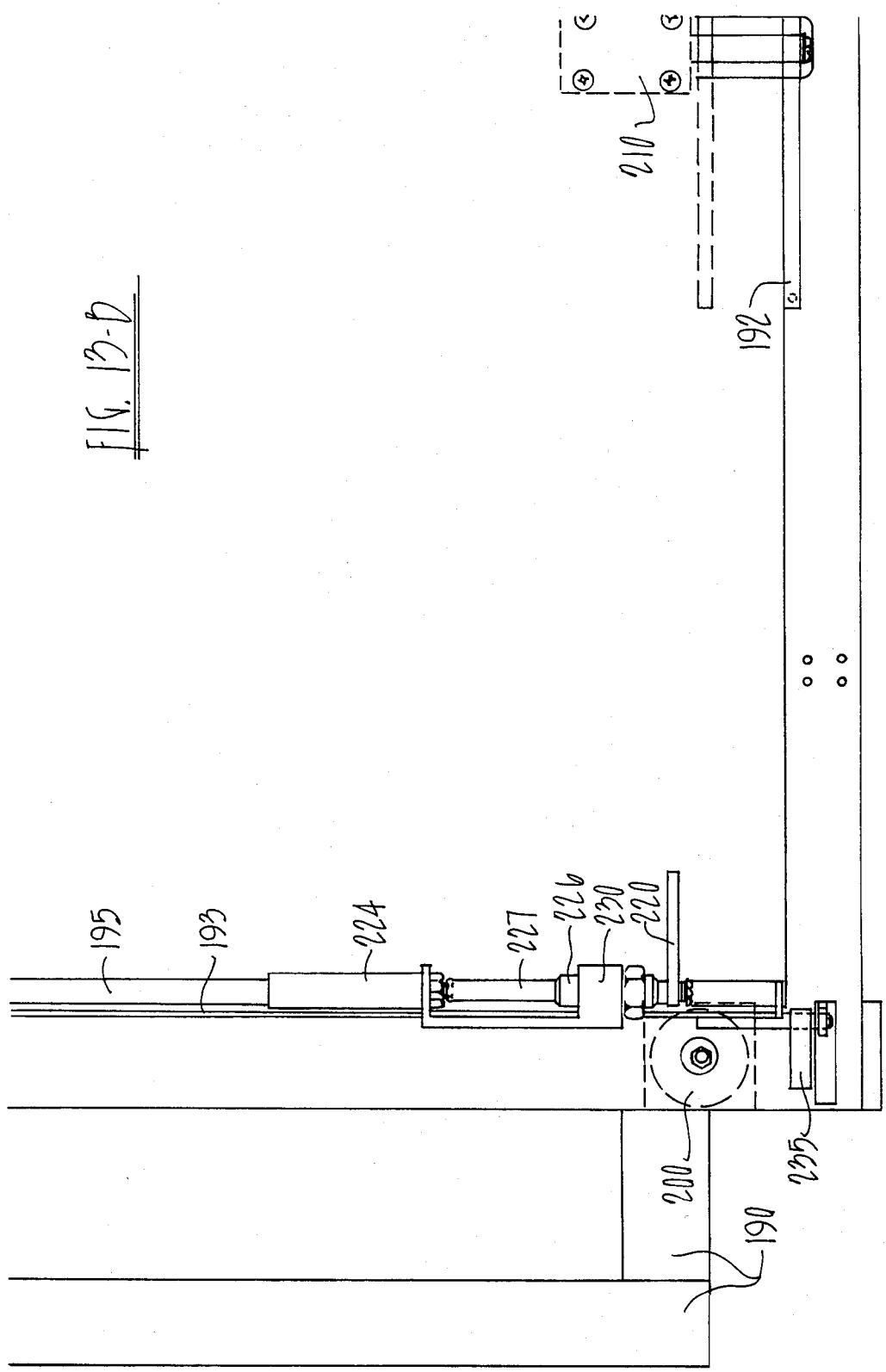
FIG. 13-B

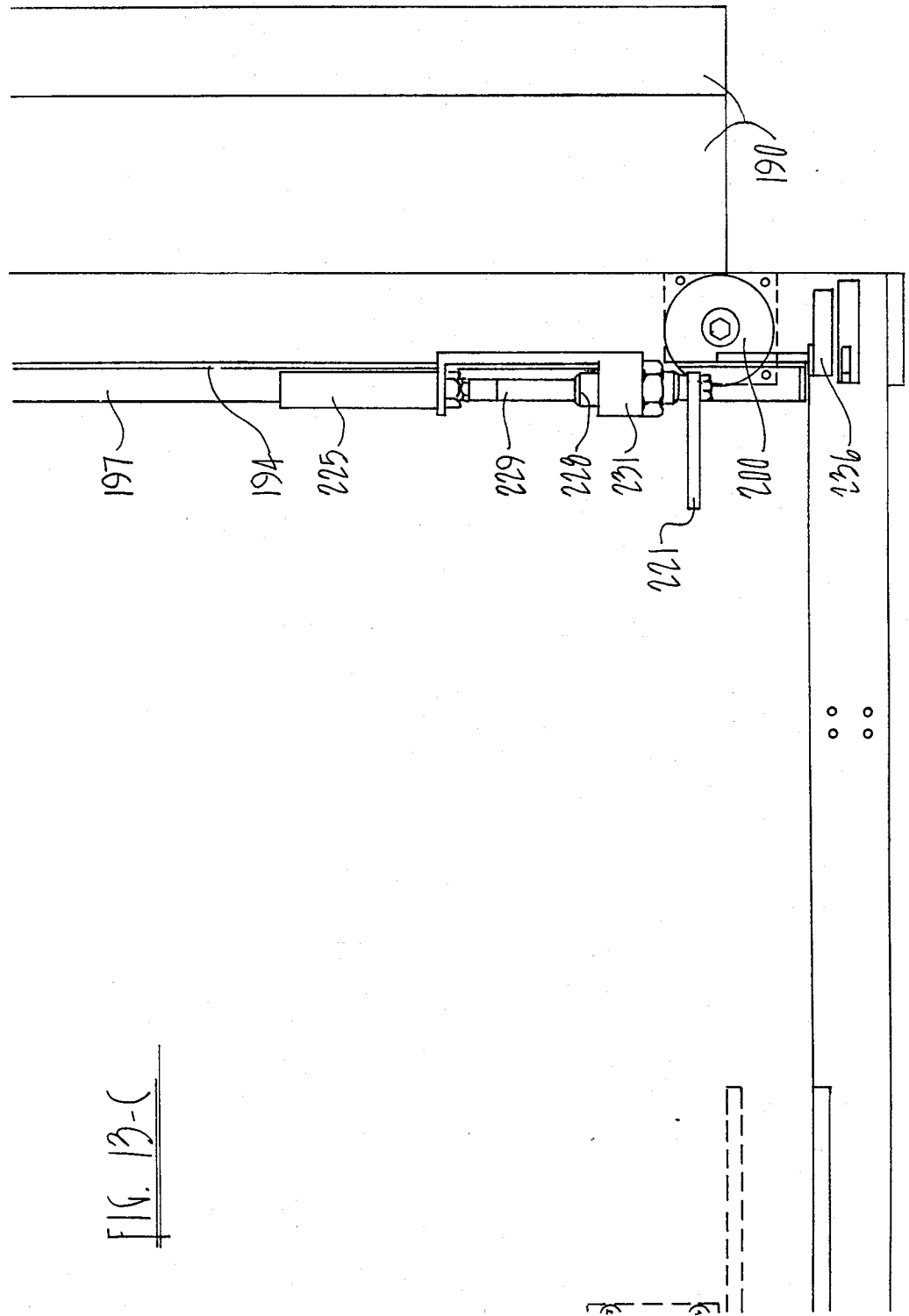

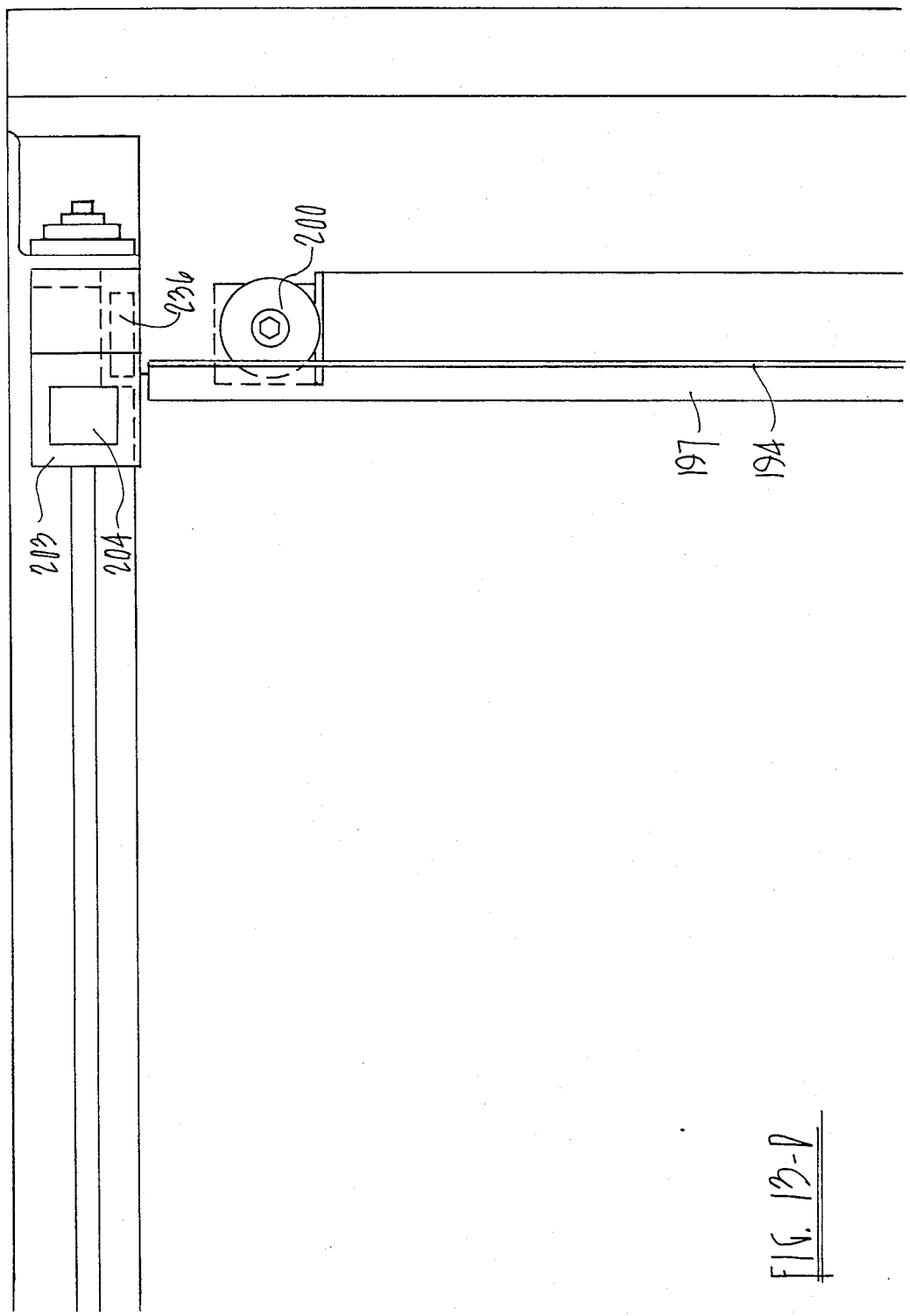

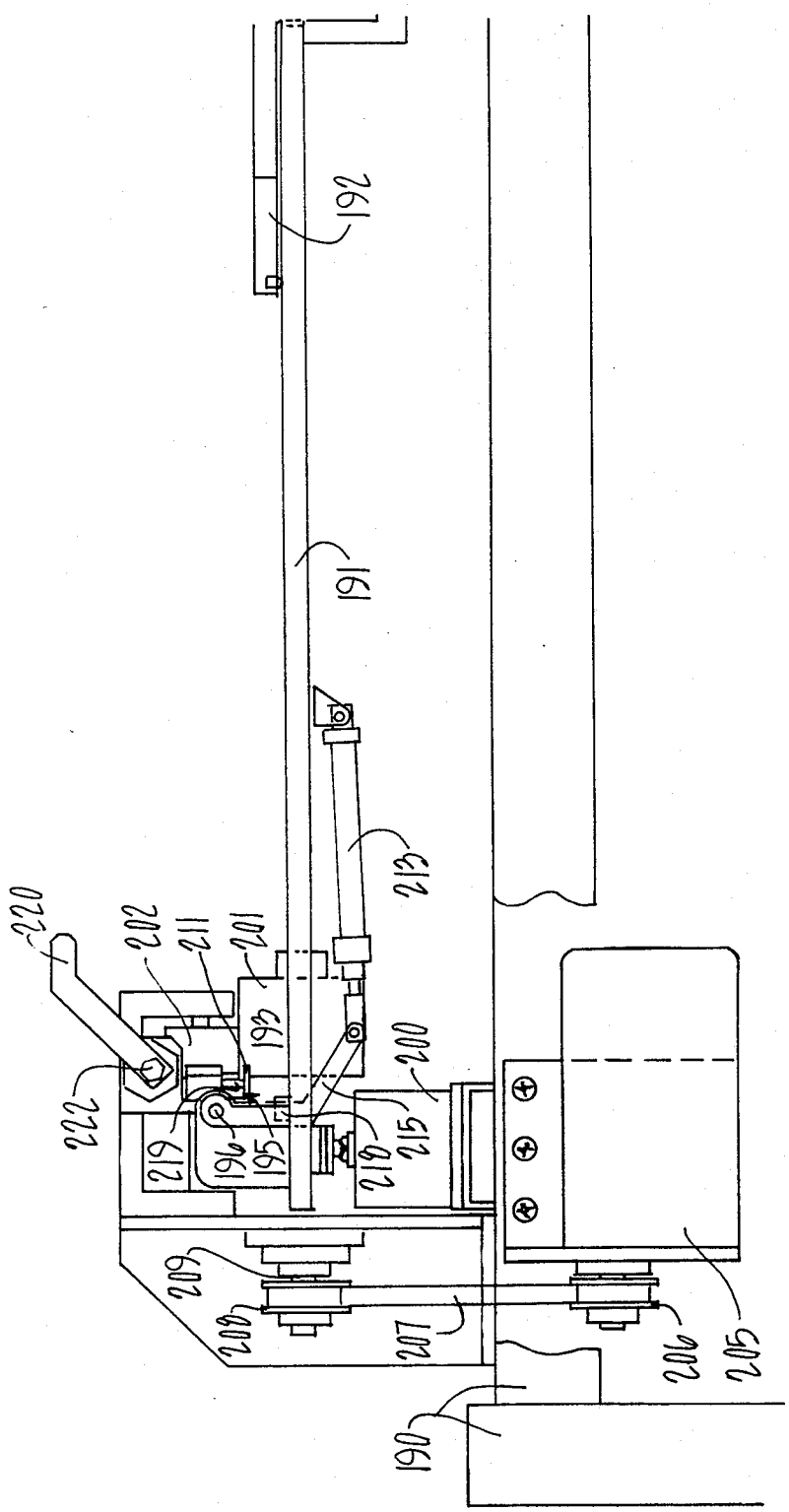

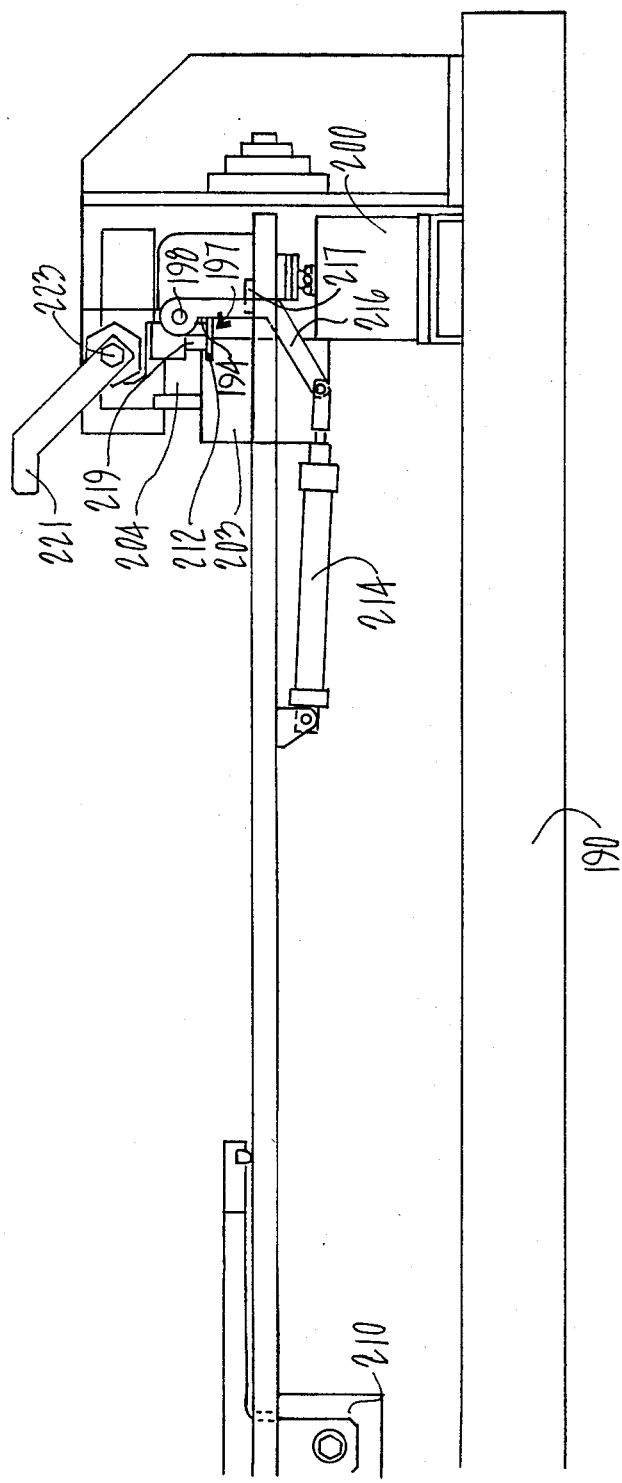
FIG. 14-D

| FIG. 13 | |
|---|---|
| FIG. 13-A | FIG. 13-B |
| FIG. 13-D | FIG. 13-C |

| FIG. 14 | |
|---|---|
| FIG. 14-A | FIG. 14-B |

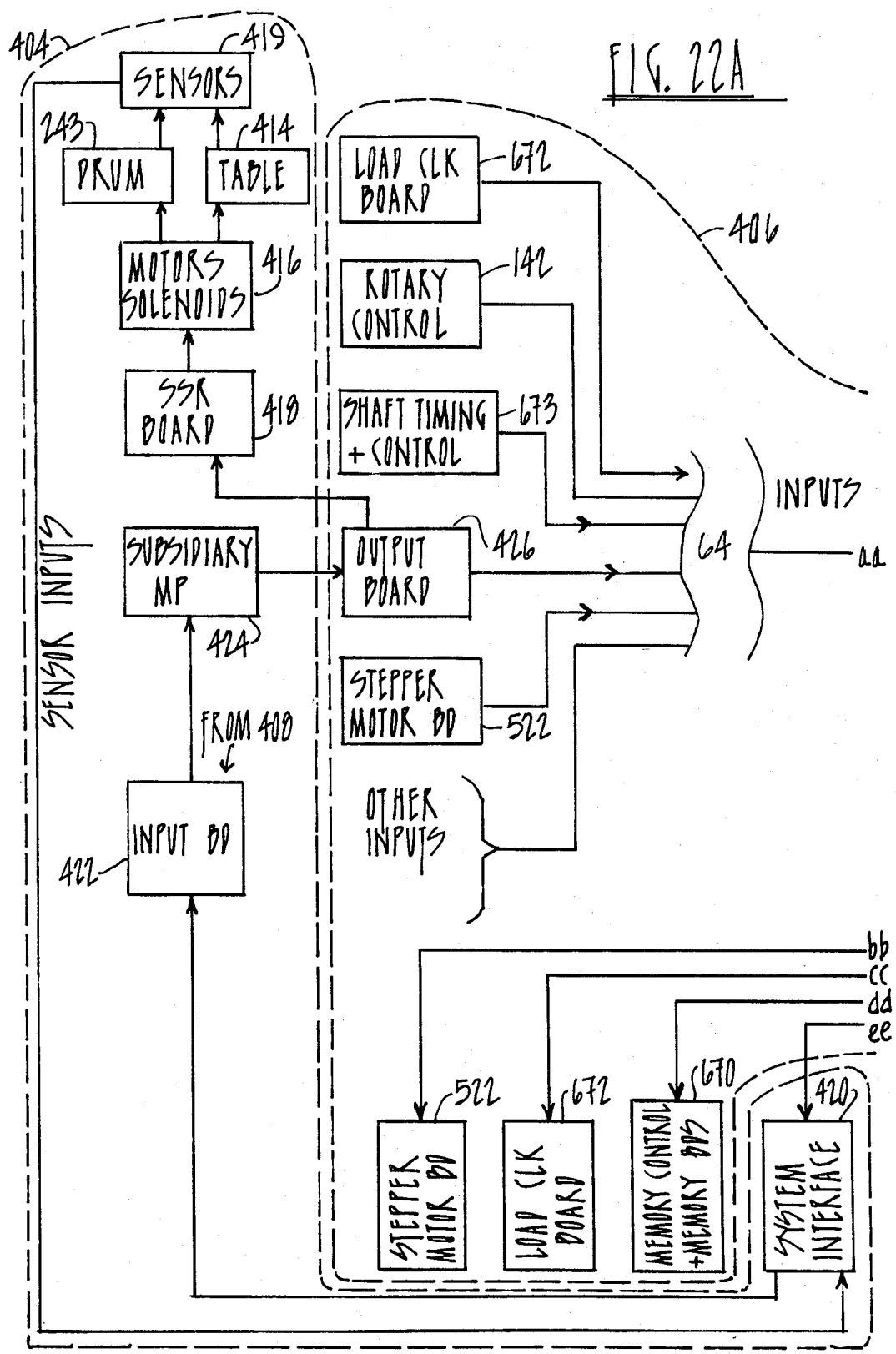

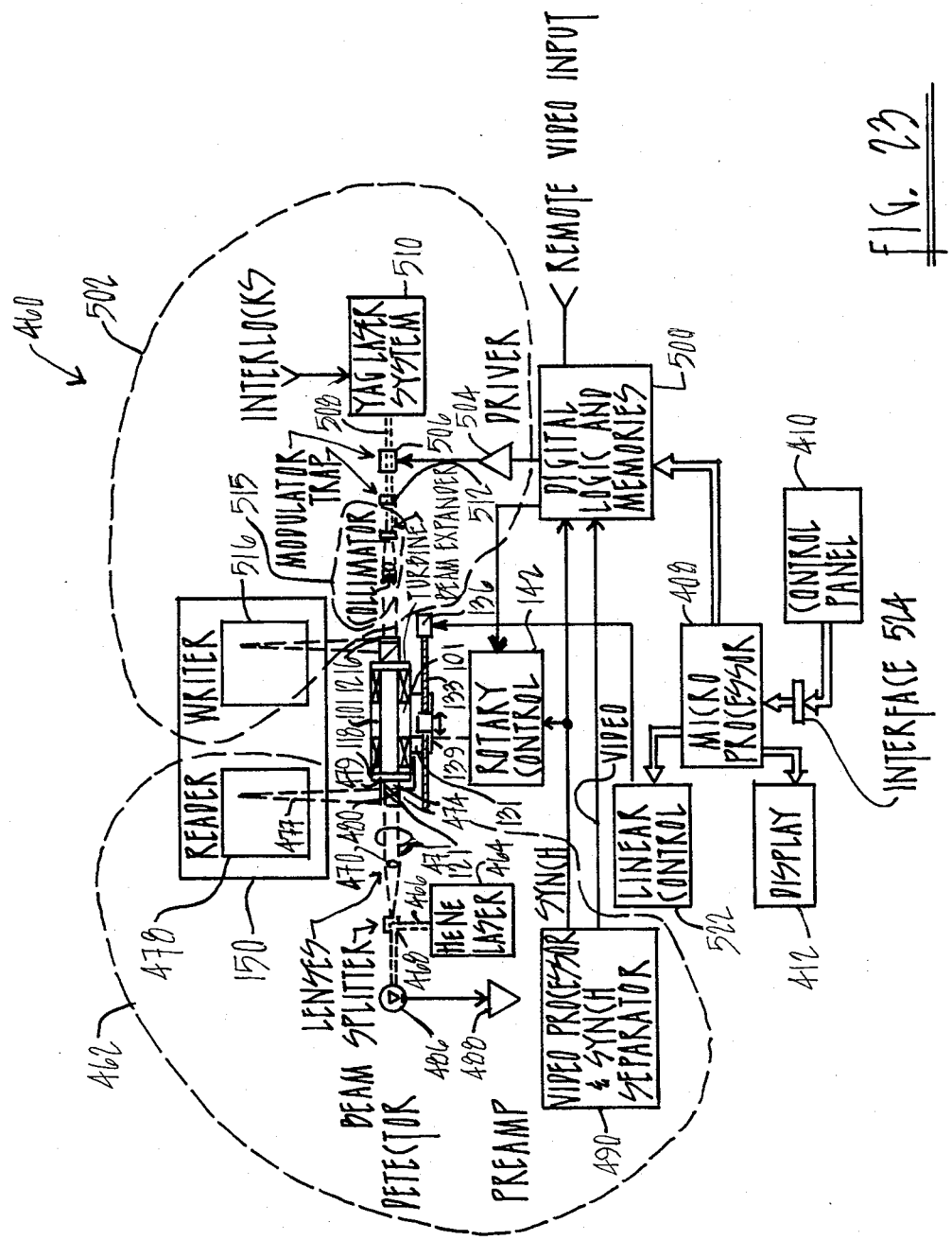

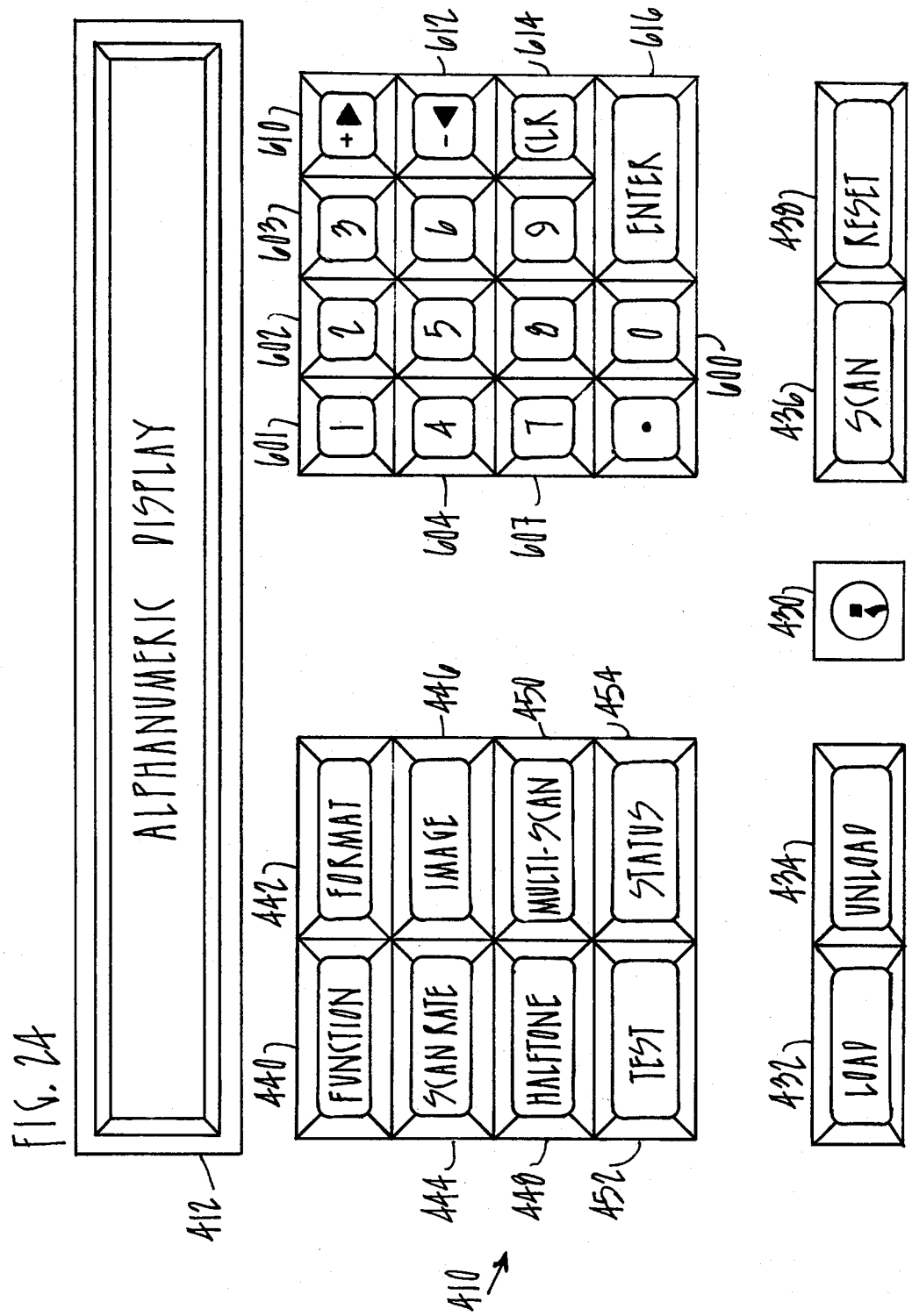

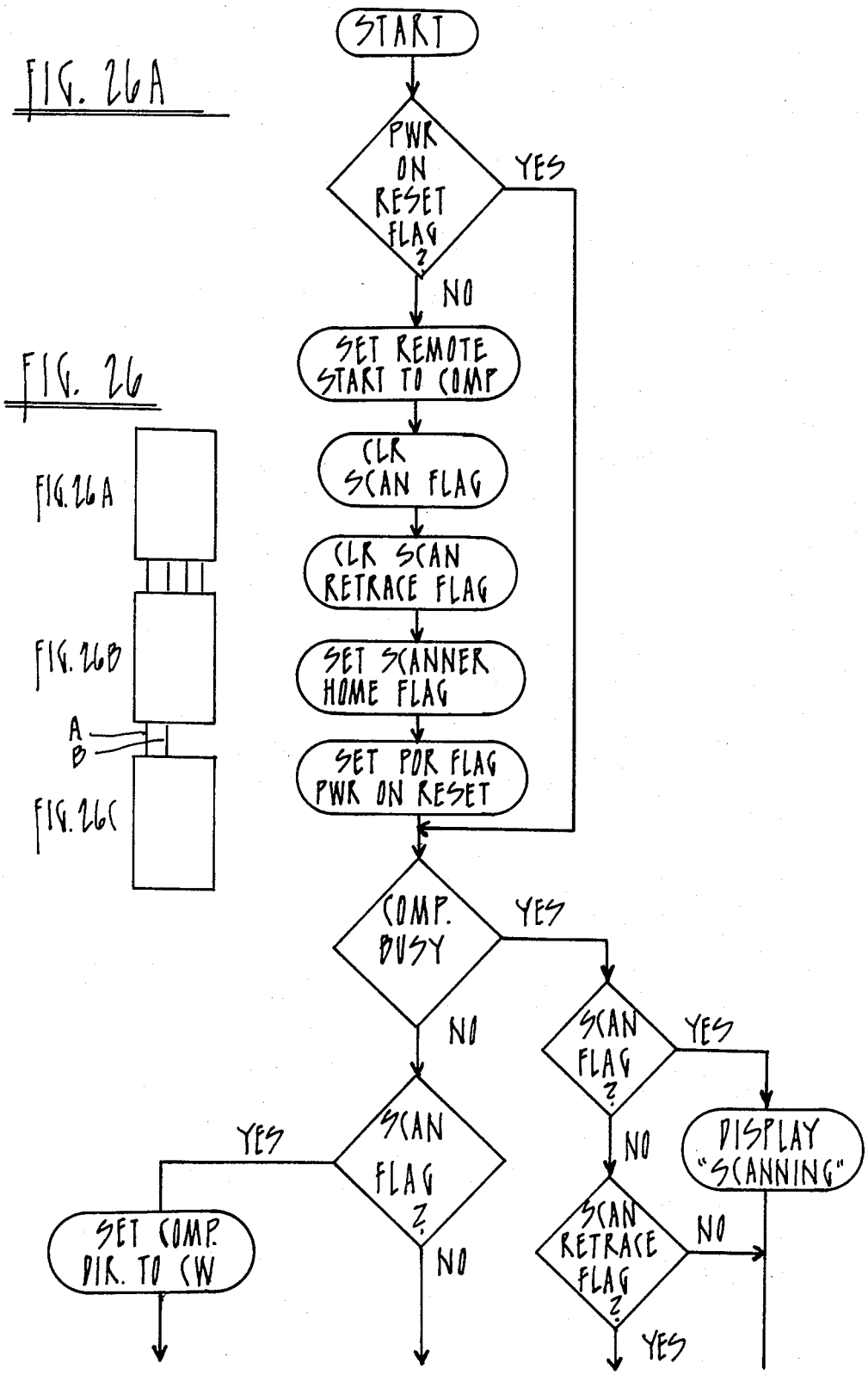

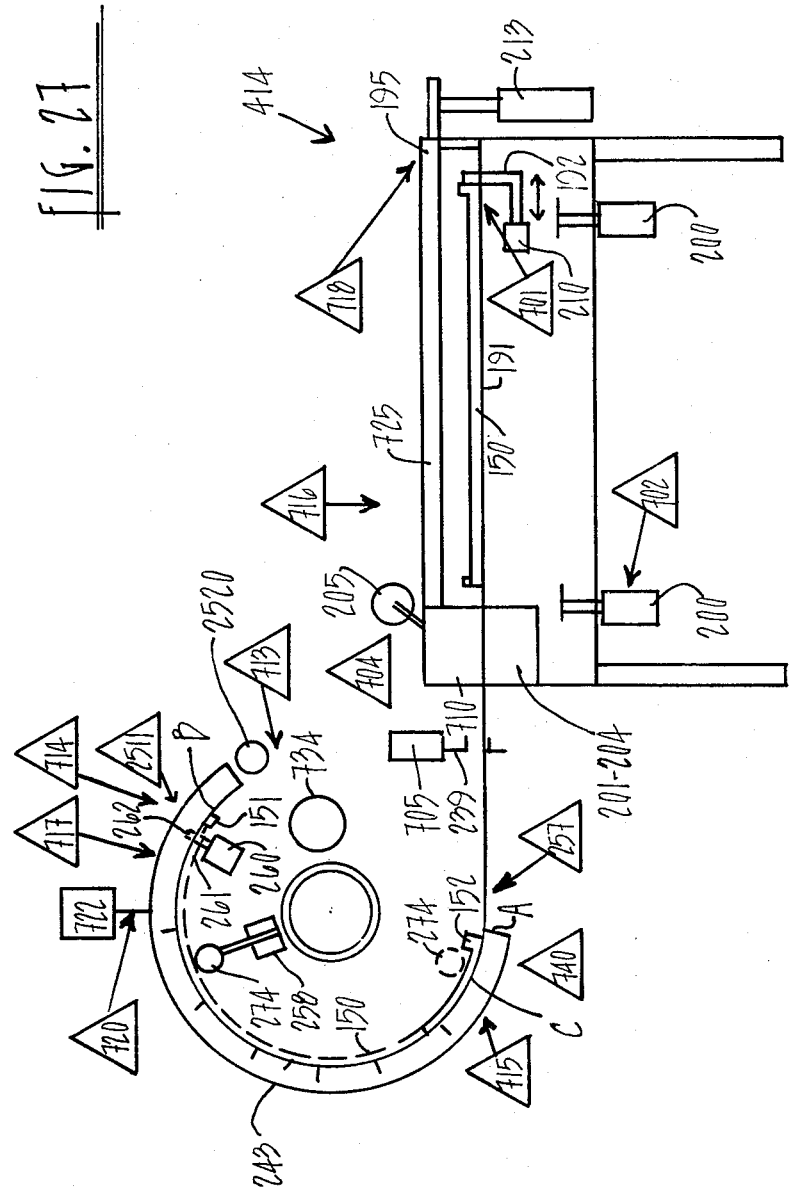

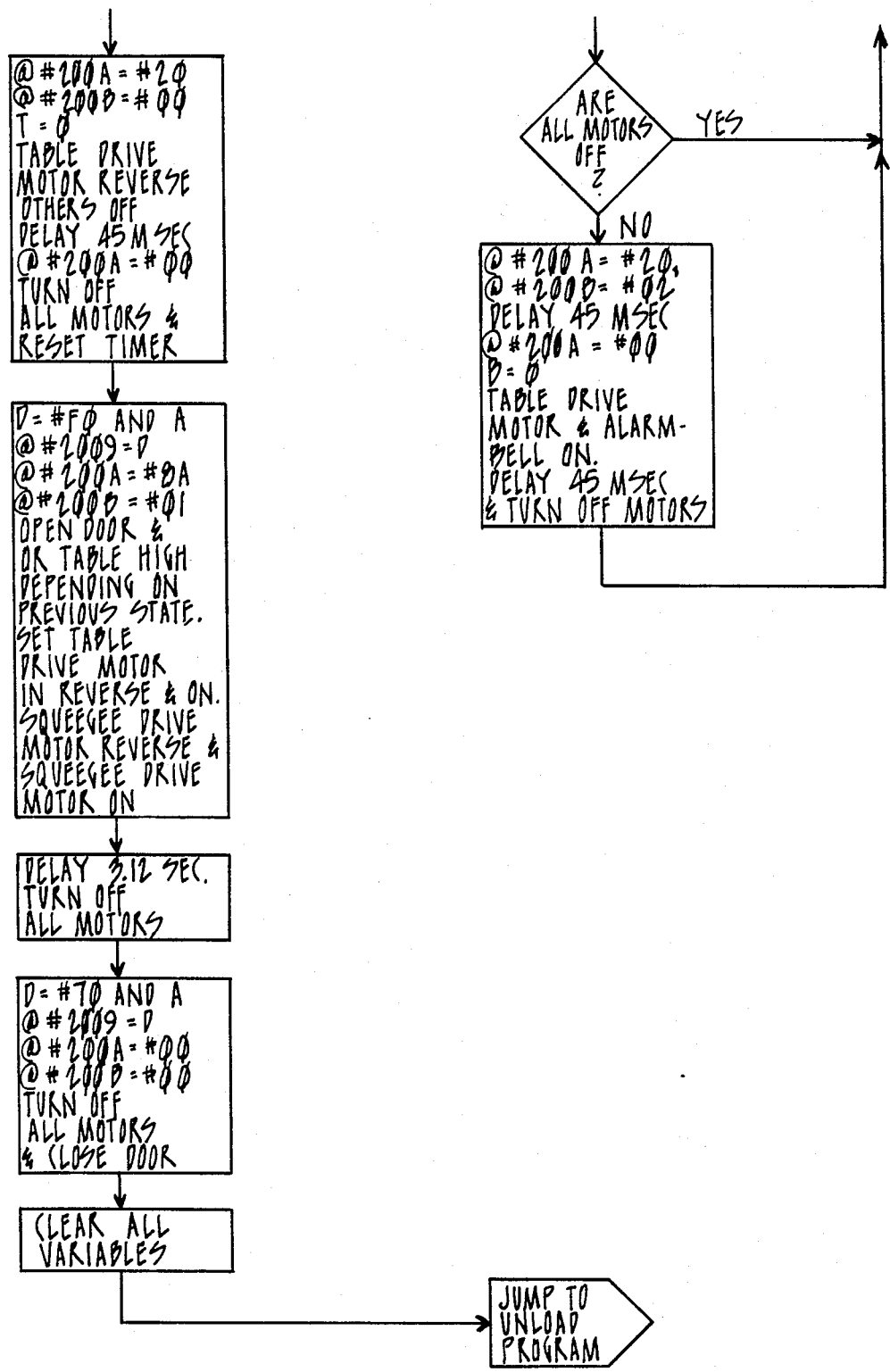
FIG. 28-O

APPARATUS AND METHOD OF MICROPROCESSOR-CONTROLLING LASER SCANNING OF A MATERIAL HELD BY A TRANSPORT, THE LOADING AND UNLOADING OF THE TRANSPORT ALSO BEING MICROPROCESSOR-CONTROLLED

TECHNICAL FIELD

This invention relates to a microprocessor-controlled system and method for reading from and/or writing onto a material with a scanning laser beam. The material is held on a transport which is selectively positioned for bean scanning and removed from the path of beam scanning by microprocessor control.

BACKGROUND ART

It is discussed in the LogEscan Systems Inc. Service and Maintenance Manual LogEscan Model 2417 Laser Platemaking System (1980) how a state sequencer can control certain operations of a laser scanner. Landsman, in U.S. Pat. No. 4,139,243, discusses electronic elements for dual memory alternation and timing which facilitate an understanding of the present invention.

DISCLOSURE OF THE INVENTION

The present invention relates to a system and method for controlling with an operator-interactive microprocessor the (a) scanning of a laser beam onto a material carried by a transport which is held against the inner surface of a drum section and (b) loading a transport from a table onto the drum section and unloading the transport back onto the table. The table has two levels, the lower level—defined as a bed—holding transports enroute to the drum section with the upper level—defined by brackets—receiving transports from the drum section.

A control panel is coupled to the microprocessor so that an operator can initiate a scan operation or a load or unload operation, or define the format—i.e. the size or position of an image to be scanned—which the operator desires.

RELATED APPLICATIONS

Prior to my invention Ernest M. Rossini, invented the broad concept of a table for supporting a transport together with means for feeding that transport into a scanning device and positioning it along a curved inner wall of the scanning device. His invention is claimed in copending application Ser. No. 384,366, Pat. No. 4,479,147, filed previously and entitled: Method of and Apparatus for Feeding the Positioning Material to be Scanned.

Certain improvements in the rotary scanning system (see FIG. 2 of this application) are described and claimed in the application of Joseph J. Crane and Daniel T. Beasley, Ser. No. 383,930, filed previously and entitled: Scanning System Employing a Laser Beam.

Improvements in the means for rotating and laterally moving and scanning device are described and claimed in the application of Joseph J. Crane, Ser. No. 383,928, filed previously and entitled: Scanning System Wherein the Scanning Beam Rotates and Translates. These improvements are shown in FIGS. 3 and 4 of this application.

An improved means for positioning and holding the transport in the drum is described and claimed in an application, filed previously of Daniel T. Beasley et al., Ser. No. 384,431, Pat. No. 4,479,148, entitled: Method of and Apparatus for Insuring That the Transport of a Scanning System is Contiguous With its Support.

Wah Shek has one application pending for the apparatus for feeding the transports to, and receiving the transports from, the scanning system; Ser. No. 383,929, filed previously and entitled: Apparatus for Feeding Material to and Receiving it From a Scanning System. A second application of Wah Shek for an invention entitled: Method of Feeding Material to and Receiving it From a Scanning System, has also previously been filed and has a Ser. No. 383,927.

The present embodiment disclosed herein incorporates various improvements added since the filing of the abovementioned cases, on June 2, 1982.

BRIEF DESCRIPTION OF THE DRAWINGS

FIG. 2 is a cross-sectional view of the rotating scanning means and the housing therefor.

FIG. 3 is a side view of the scanning device and shows the means for moving the scanning device laterally.

FIG. 4 is a top view of the means for moving the scanning device laterally.

FIG. 5 is a view partly in cross-section, of the rotating scanning device and its housing.

FIG. 6 is a top view of a transport for carrying the mterials to be scanned to the scanning system.

FIG. 7 is a cross-section, of registration pin (159) and its support, taken along line 7—7 of FIG. 6.

FIG. 8 is a top view of a transport for performing the same function as the transport of FIG. 6, except it shows certain modified forms of tapes for holding the materials to be scanned.

FIG. 9 is a detailed view of a portion of FIG. 8.

FIG. 10 is another detailed view of a portion of FIG. 8.

FIG. 11 is a detailed view of still another portion of FIG. 8.

FIG. 13 is a top view of a table for holding a transport. This figure is composed of four sub-FIGS. 13A, 13B, 13C and 13D which should be put together as shown in FIG. 21 to show FIG. 13.

FIG. 14 is a rear view of the table (FIG. 13) for the transport. This figure is composed of two sub-FIGS. 14A,14B which are to be put together to produce FIG. 14.

FIG. 18 shows further details of the means in the drum for positioning a transport.

FIG. 23 is a schematic diagram of a laser scanning a reader-writer system.

FIG. 24 is a diagram of a control panel for a scanning device.

FIG. 26 shows how FIGS. 26A, 26B and 26C fit together.

FIG. 27 is a simplified side view of a drum (as in FIGS. 17 and 18) and a table (as in FIG. 1) showing sensors, motors, solenoids, cylinders, and the like used in loading and unloading transports between the drum and the table.

In multi-sheet drawings, the same lines are similarly alphabetically identified.

BEST MODE FOR CARRYING OUT THE INVENTION

Before describing the overall machine in detail, a very brief description of it will be given with reference to FIG. 1.

Figure 1:
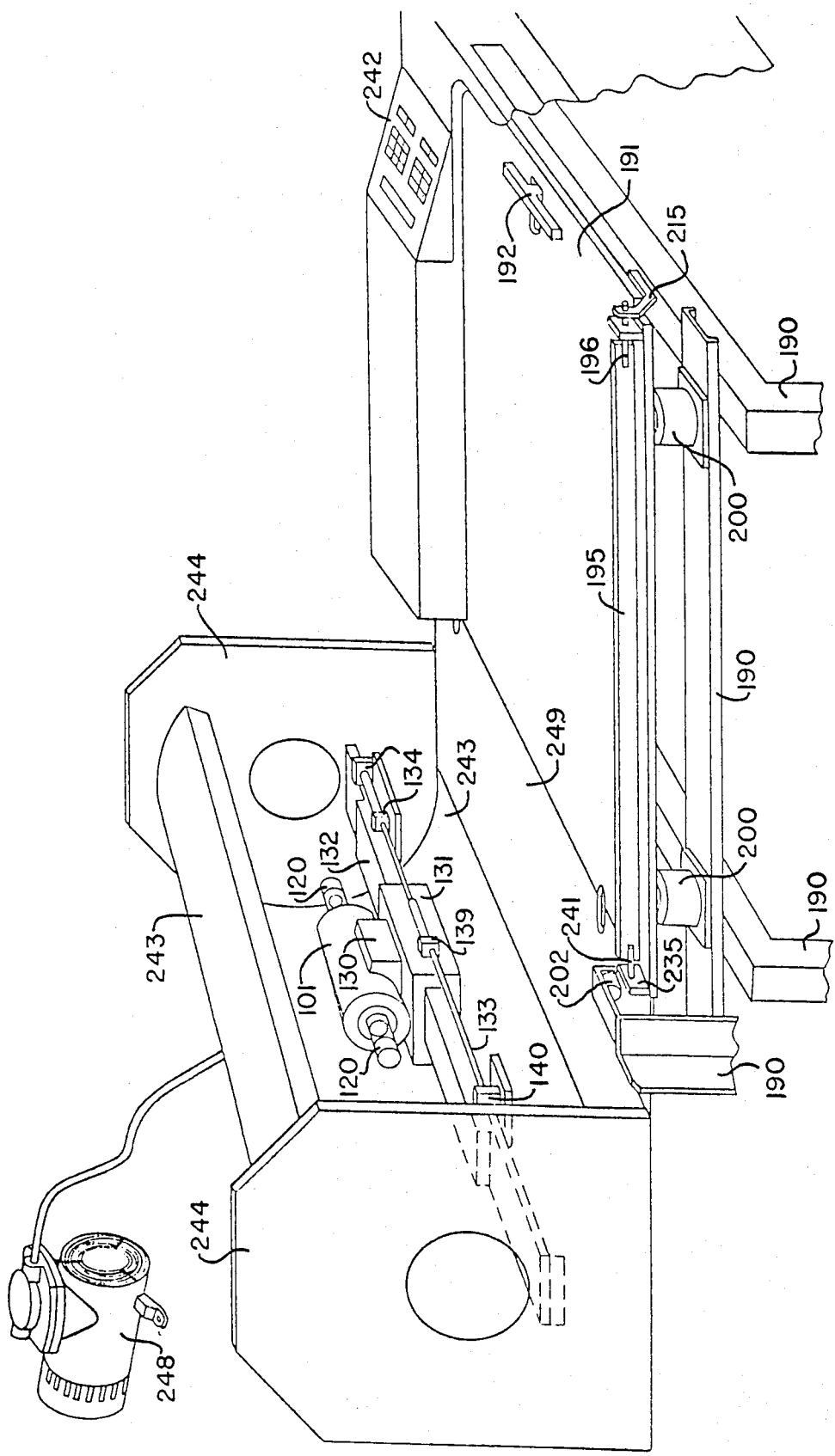
FIG 1 is a view, partly schematic and partly perspective, of a scanning and feeding device embodying the invention.
Figure 15:
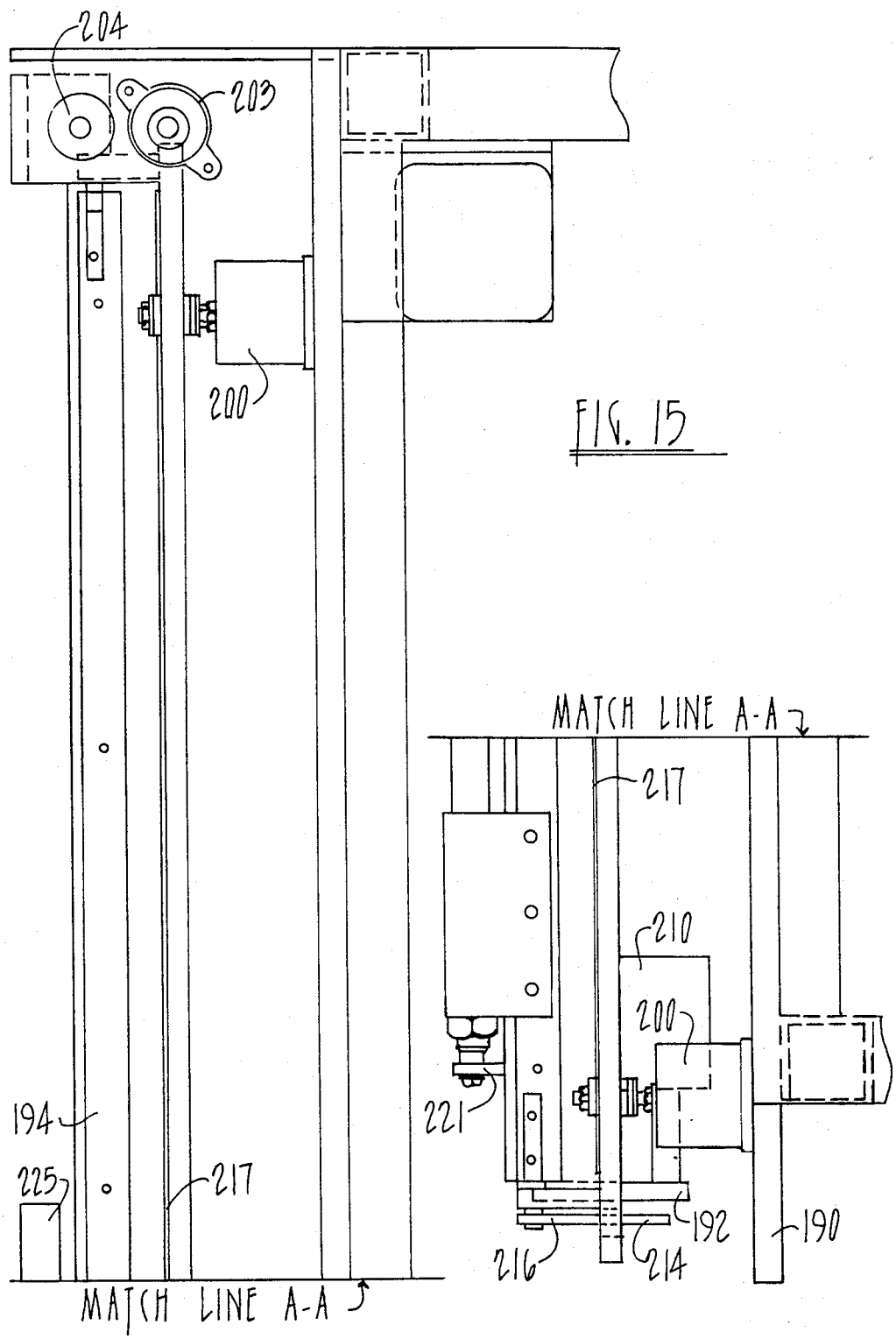
FIG. 15 is a right side view of the table (FIG. 13) for the transport. The two parts of this figure are to be put together along the match line.
Figure 16:
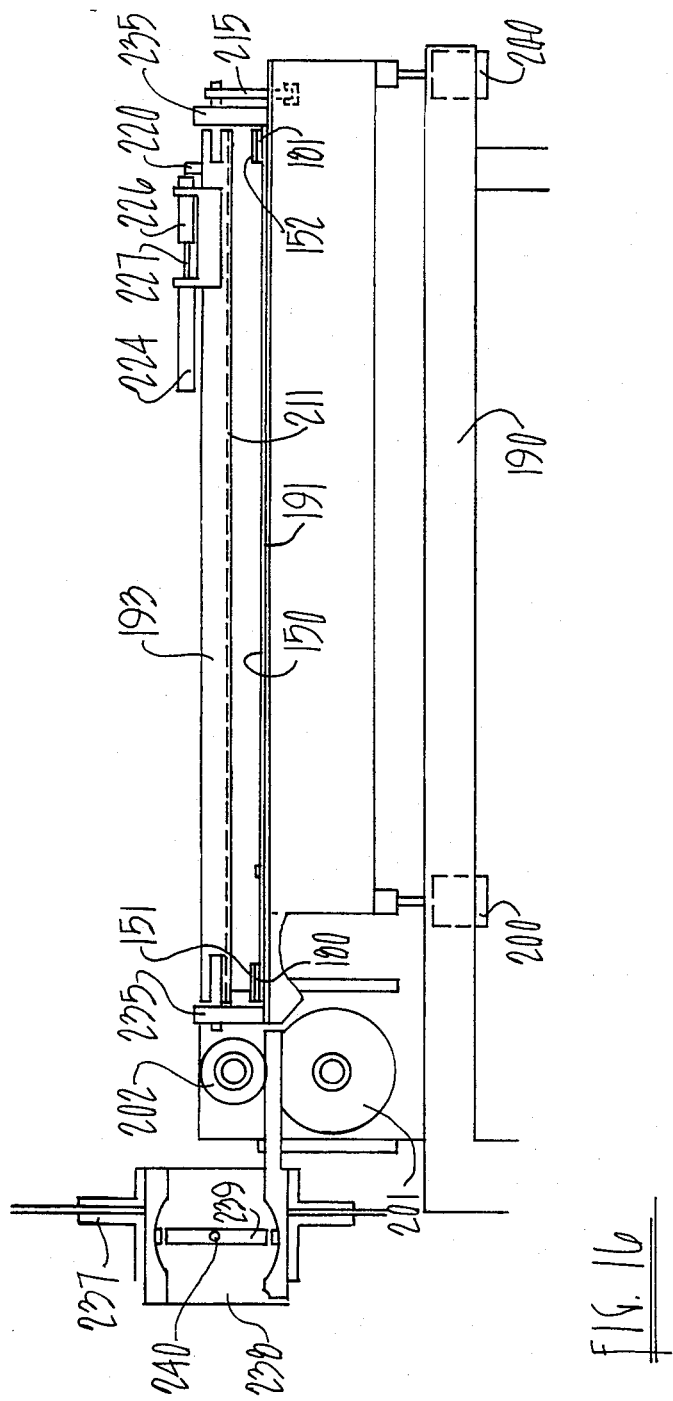
FIG. 16 is a left side view of the table (FIG. 13) and its associated door.

FIG. 1 is an overall schematic of the scanning device for reading and/or writing using laser beams.

A cylindrical drum section (243), having side walls (244), carries support member (131) which in turn supports cradle (130) which in turn supports the housing (101), which contains a rotating element (120) with mirrors for reflecting the laser beams onto the materials to be read and/or written upon. The mirrors provide scanning and, therefore, both rotate and translate. The rotary motion is achieved by virture of a turbine (118) (FIG. 2) which is operated by compressed air fed into the housing (101). The turbine (118) rotates the rotating elements (120). Linear motion of the elements (120) is provided by the lead screw (133), which is rotated by a stepping motor (136), (shown in FIG. 3), and which passes through the internally threaded housing (138) attached to the support (131) by clamp (139). The lead screw (133) is supported by bearings (134) located in casings (140) and (141).

The reading and/or writing material is placed on a transport (150) (FIG. 6) which is placed on bed (191) in front of bar (192) (FIG. 1). When it is desired to move the transport (150) (FIG. 6), carrying the materials to be read and/or to be written upon, into the drum (243), the bar (192) is moved forwardly a short distance which causes the transport plate (150) to pass to a group of pinch rollers (one of which (202) is shown in FIG. 1). These rollers drive the transport (150) into drum (243) as will be more fully explained. A second transport (150) carrying additional spaces for reading and writing may be placed on two L-shaped brackets, one of which is shown in FIG. 1 and bears reference number (195). A similar L-shaped bracket is provided on the opposite side of the apparatus as more fully explained in connection with FIG. 13. After the first transport (150) has been fed into the drum (243) for the purposes of reading and/or writing, the second transport (150) may be dropped upon the bed (191) by rotating the bracket (195) and its corresponding bracket on the other side of the machine. The second transport (150), therefore, drops by gravity on the bed (191) and has the material for scanning placed on it. After reading and/or writing has been accomplished on the first transport (150) that was sent into the drum (243), the air is exhausted from cylinders (200) to lower bed (191) so that the horizontal section of brackets (195) (and its corresponding bracket on the other side of the machine) are at the level to receive the first transport (150) that was previously fed into the machine. The material in the reading and writing sections of the first transport (150), may, therefore, be changed to provide a new page for the newspaper after the second transport (150) has been loaded and the first transport (150) dropped. The cylinders (200) must be placed under air pressure, or relieved of air pressure, as necessary to correctly position the bed (191) and brackets (195, 197) (FIG. 13). When a transport (150) is to be fed into the drum (243), the bed (191) is in its raised position; and when the brackets (195, 197) are to receive a transport (150) from the drum (243), the bed (191) is in its lower position.

As will appear, a vacuum is desirable in order to hold the transport (150) in place in the drum (243), during scanning, and, therefore, a vacuum pump (248) is provided.

A guiding ramp (249) is provided between the bed (191) and the drum (243) so that the transport may pass along this ramp when passing to and from the drum (243).

The bearing (100) is supported by the housing (101) which as we shall see, moves laterally and parallel to the material to be scanned, but does not rotate about the axis (109) of FIG. 2. The shaft (102) rotates, with reference to the bearing (100) and the housing (101), around the axis (109). Air under pressure from 80 to 100 pounds per square inch is connected to input (103) and enters an annular slot (105) which completely encircles the outer portion of bearing (100). The air under pressure also enters annular trough (104) through holes (1030), to thus provide an air bearing surface between the rotating shaft (102) and the bearing (100). This air space (106), between bearing (100) and shaft (102), is approximately 0.0028 inches wide. The air is slowed along the gap (106) between bearing (100) and shaft (102) by seals (107) which are of annular shape leaving a gap of 0.0002 inches and are preferably made of a material known as Vespel manufactured by DuPont. The O rings (108) prevent leaking of the air passing inlet (103) to the annular groove (104). The cap (110) is connected to the housing (101) and has a vent (111) which feeds hole (1110) (FIG. 20), whereby any air which leaks past seal (107) is vented to the atmosphere. Some air from the gap (106) also passes seal (107) to space (113) which is at lower pressure, as will be seen, than the pressure in gap (106).

Air under pressure from a servo mechanism that controls the air pressure (see part 142 in FIG. 5) enters inlet (114) to the spaces (116), and then via air ports (115) to the ports (117) to drive the turbines (118). The turbines rotate the endplates (119) which in turn rotates optical housing (120) which carries with it the mirrors (121) and the lens (122), both of which, therefore, rotate at the same speed as the turbines (118).

Air under pressure at about 40 lbs. per square inch is also fed into the annular groove (123) from which air under pressure passes slowly through the bronze porous plate (124) and applies pressure to the flat inner surface (125) of the turbine (118). An air gap of approximately 0.003 to 0.005 inches is provided between the porous plate (124) and the plate which comprises the end surface (125) of the turbine (118.)

Heretofore, devices with rotary air bearings have been used, not only in connection with scanning devices of the general class involved here, but also in other applications. One problem that has arisen in connection with such air bearings is that there is unwanted lateral movement between the housing and the rotating part. Such unwanted lateral movement is very objectionable in the case of a scanning device of the character involved here because any lateral error in the position of the mirrors (121 will cause an error in the materials being read and/or printed as the case may be. This lateral movement which causes such error is avoided, in accordance with this invention, by reason of the porous bronze plate (124) at both ends of the device. Air under pressure enters the annular cavities (123), both at the right end of the device via feed line (1230) and at the left end of the device via feed line (1231), and passes slowly through the porous bronze plates (124) and applies pressures on the flat surfaces (125) of the turbines (118) (see FIG. 19).

With reference to FIG. 2, the air under pressure to cavity (123) on the left side of the machine is preferably separately regulated from the air pressure entering cavity (123) on the right hand side of the machine, and if this is not done, instability may result. The correct pressures for the two cavities (123) are selected experimentally using two pressure regulators (1232) and (1233) (FIG. 2.) The two pressures are adjusted to achieve maximum stability.

The end plate (119) is attached to the shaft (102) by threads. The inner surface of shaft (102) is threaded along surface (126) and the outer surface of the ring attached to end plate (119) is threaded on its outer surface (127). The mating threads between the inner surface of shaft (102) and the outer surface (127), hold the end plate (119) to the shaft (102).

The current to pressure transducer (142) (FIG. 5) may be Fairchild Series T5100 manufactured by Fairchild Industrial Products Division, 1501 Fairchild Drive, Winston-Salem, N.C. Preferably this apparatus is catalog number T5120-1 having an input impedance of 2,340 ohms and an input range of 1 to 5 milliamperes. This transducer controls the air pressure to inlet (114) and holds that pressure at approximately 40 lbs. per square inch as previously explained.

Tapped holes, such as (128), may be placed in the ends of plates (119). Set screws may be inserted (or omitted) in these holes. The size and placement of the set screws may be selected to perfectly balance the rotating mechanism mechanically.

Figure 19:
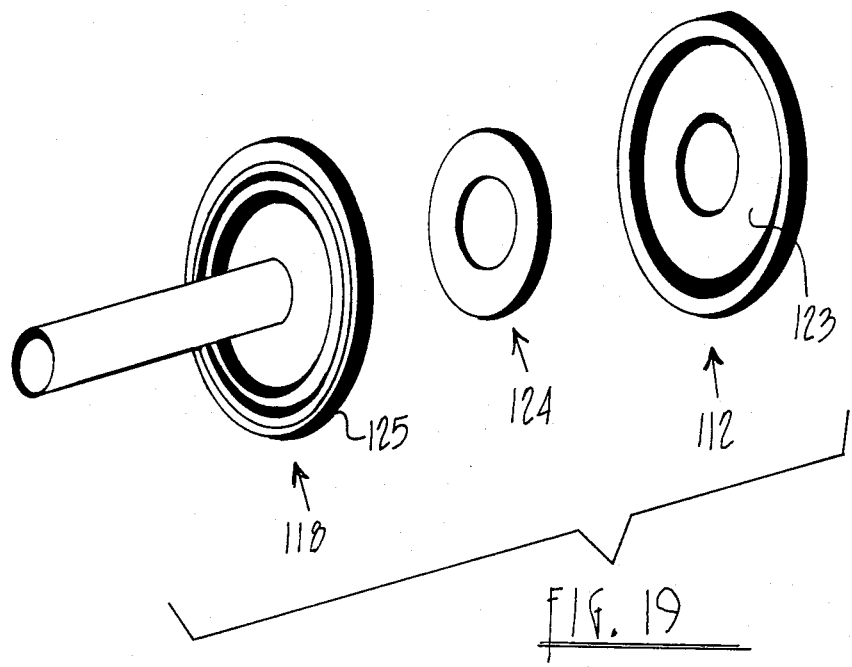
FIG. 19 is an exploded view of certain details of FIG. 1.

FIG. 19 is an exploded view of the details of the manifold (112), the bronze porous plate (124) and the end plate (125) of the turbine (118).

Figure 20:
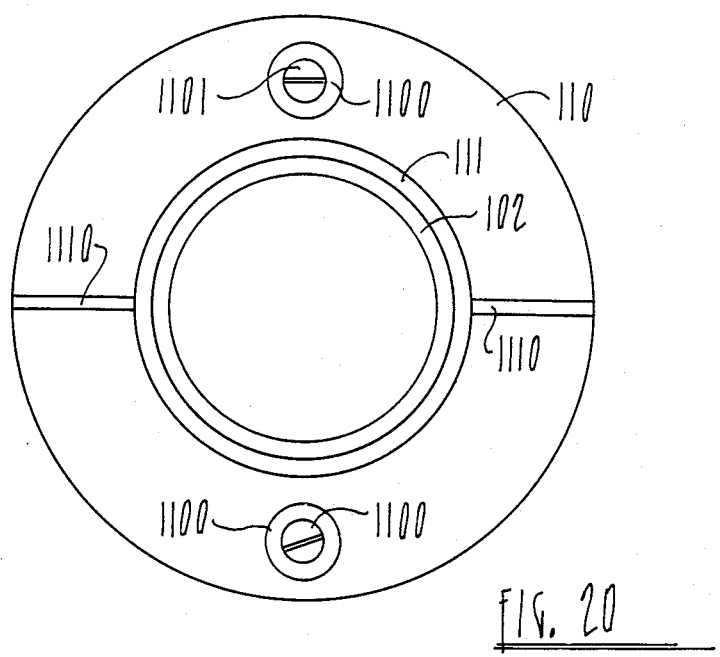
FIG. 20 is a cross-sectional view along line 20—20 of FIG. 1.

FIG. 20 illustrates certain details of caps (110) (FIG. 2). There are two of these caps (110), one at each end of the rotating apparatus of FIG. 2. While only the details of the left cap (110) are shown in FIG. 20, it is understood that the right hand cap (110) (FIG. 2) has similar details. The cap (110) has a borehole (1100) through which bolt (1101) passes to fasten the cap (110) securely to housing (101).

One desirable feature, shown in FIG. 20, is that there are air bleed holes (1110) extending from vent (111) to the ambient atmosphere to thus allow an escape of air that passed the outermost seals (107) into vent (111).

FIG. 3 shows the supporting mechanism for the apparatus shown in FIG. 2 and also moves the apparatus shown in FIG. 2 laterally for the purpose of providing the lateral component of the scanning motion. The scanning motion obviously has, in addition to the lateral movement, a rotating movement which has already been described. The housing (101) originally explained in connection with FIG. 2 and which is also shown in FIG. 3 is supported by the cradle (130). The cradle (130) is mounted on the Pneumo-Linear slide (131). This slide (131) is manufactured by Pneumo Precision, Inc., Precision Part, Keene, N.H., and, together with its supporting rail (132), is an established and well known supporting element. The slide (131) is supported, by air pressure, from the railing (132) which is also manufactured by said Pneumo Precision, Inc., as aforesaid.

In other words, the stationary rail (132) supports the slide (131), and the support function between (131) and (132) is by means of air pressure. The slide (131), in turn, supports the cradle (130) which in turn supports the housing (101).

Running parallel to, and along side of, the supporting element (131), and the rail (132), is a lead screw (133) which is supported by three bearings (134) and which is prevented from unwanted lateral movement by collar (135) which preloads two bearings (134) against each other. The lead screw (133) is rotated by stepping motor (136) which is connected to the lead screw (133) by the coupler (137).

The stepping motor (136) (FIG. 3) may be model M83-62 series motor/driver manufactured by Compumotor Corporation, 1310 Ross Street, Petaluma, Calif. This stepping motor (136) has 25,000 steps per revolution, and a preferred speed of approximately 1 revolution per second. Using a 10 pitch lead screw (133), the apparatus of FIG. 2 scans approximately 1,000 lines per inch during reading and/or writing. Following the scanning of a complete page, the stepping motor runs in reverse at a speed of approximately 6 revolutions per second in order to return the apparatus of FIG. 2 to its starting position for a new scan.

The stepping motor of 136 is a specie of the form of motors known as synchronous motors. With a synchronous rotor it is possible to determine electrically the exact lateral position of the scanning system (FIG. 2) at any given time.

The preferred speed for the turbine (118) is 6,000 rpm whereby the mirrors rotate at that speed during scanning.

FIG. 4 is a top view of FIG. 3. In FIG. 4 the stepping motor (136) drives the coupler (137) which in turn drives the lead screw (133) which cooperates with the lead screw nut (138) (FIG. 3) which is held in fixed relation to the apparatus of FIG. 2 by bracket (139). The lead screw bearings are supported by support blocks (140) and (141). The bracket (139) is firmly attached to the support (131) which is carried by the rail (132) by air pressure as explained heretofore. The apparatus of FIGS. 3 and 4 rests on base (1400).

FIG. 5 is another view of the device of FIG. 2 showing certain additional details. A laser beam (145) is shown entering the left end of the apparatus where it is focused by the lens (122) onto the mirror (121), and as the mirror rotates about the axis (109) (FIG. 2), the laser beam is reflected to provide scanning. This beam intermittently and periodically passes encoding device (143) which reflects one signal pulse for each revolution of the mirror (121). The pulses may be used for counting, synchronizing or the like. The light reflective encoder (143) is supported by bracket (144) from the cradle (130) which is more fully shown and explained in connection with FIG. 3.

FIG. 6 shows a transport (150) for transporting the material which is to be read (usually one full page), or the laser plate upon which writing will occur, into the drum of the machine as will subsequently be more fully explained. The transport (150) is basically a sheet of epoxy glass, NEMA G-10 manufactured by various companies including Westinghouse Corporation. Such a sheet is flexible so it can follow the inner curved surface of the drum (243), shown in FIG. 1. The sheet (150) has metal strips (151) and (152) along its forward and rear ends respectively. The forward strip (151) has indents (153) for the purpose of course registration, as hereafter will be explained. The entire device of FIG. 6 moves into the read/write drum (243) (FIG. 1) along the direction of arrow (154). For precise registration purposes there is a metal strip (155) having a registration hole (156) near its right end and a registration slot (157) near its left end.

Registration pins (159), for locating printing plates and paste-ups, project upwardly from the flexible plate (150). The details of the pins (159) are shown in FIG. 7. Each pin (159) has a metal base portion (160) and a metal washer (161) to hold it in place.

A number of strips (162) of polyurethane tape define the areas for the reading and writing materials. Strips (162) serve basically as a vacuum barrier for the material, on which reading or writing is to be undertaken. Such material will be sealed in place on the sheet (150).

Assuming that there is a page of material, which is to be converted into a printing plate, it would be placed in the reading section, which would normally be the left-hand rectangular section of FIG. 6, bounded by tape (162). After the material to be read has been positioned as aforesaid, a sheet of Plexiglas (163) (FIG. 8) is applied on top of the material. This sheet of Plexiglas (163) has clearance holes (164) which are slightly larger than the registration holes (159) to make sure that the piece of Plexiglas (163) covers the material to be read.

The strip of tape (165) acts as a hinge and enables the Plexiglas sheet (163) to be opened like a book for the insertion or removal of material to be read. At the right edge of the Plexiglas sheet (163) there is a flap (166) which is securely bonded, or otherwise fixed, to the glass epoxy sheet (150) but is not bonded or sealed to the Plexiglas sheet (163) and therefore constitutes a flap which may be used to cover the right edge of the Plexiglas sheet (163). The Plexiglas sheet (163) is, of course, transparent and non-polarized so that reading may take place through it. The flap (166) has slits (167) to prevent buckling when the epoxy glass sheet (150) moves into a curved position as will appear later. The flaps provide restraint to hold the materials into the transport (150) as it curves into the drum (243).

FIG. 9 illustrates a detail of the right hand section which is used to hold the output material (such as a printing plate or lasermask) on which writing may take place. The strips of tape (162) serve the same function for the (writing) right hand rectangle as they did for the reading (left hand) rectangle. They are covered by a flap (168) which is secured to the epoxy sheet (150) by tape (169). Slits (170) are provided to prevent buckling. These flaps also provide restraint to the materials.

A flexible thin aluminum plate is positioned on the epoxy sheet (150) beneath the output material and held along its left edge by flap (168). Its right edge is held by flap (171).

Flap (171) is hinged by a piece of tape (172) so that the flap may be raised out of the way to position the aluminum plate and the output material as desired. When the aluminum plate and the output material have been placed in position and their left and right hand edges covered by flaps (168) and (171), respectively, the transport sheet (150), and the elements held by that sheet, are ready for movement into position for reading and writing.

The details of the lower right hand corner of the Plexiglas sheet (163) and its covering are shown in FIG. 11, where the strip of tape (162) forms the outer limits of the material to be read and the Plexiglas sheet (163) is shown extending on top of tape (162). Two strips of tape (174) applied over the top of strip (162) are added so that all three strips of tape (162) and (174) equal the thickness of the Plexiglas sheet (163). The flap (166) is placed on top of tape (174) and is held in place by the strip of tape (175) which permits strip (166) to be hinged and, thus, be readily removable from, or placed onto, the top of Plexiglas sheet (163).

Figure 12:
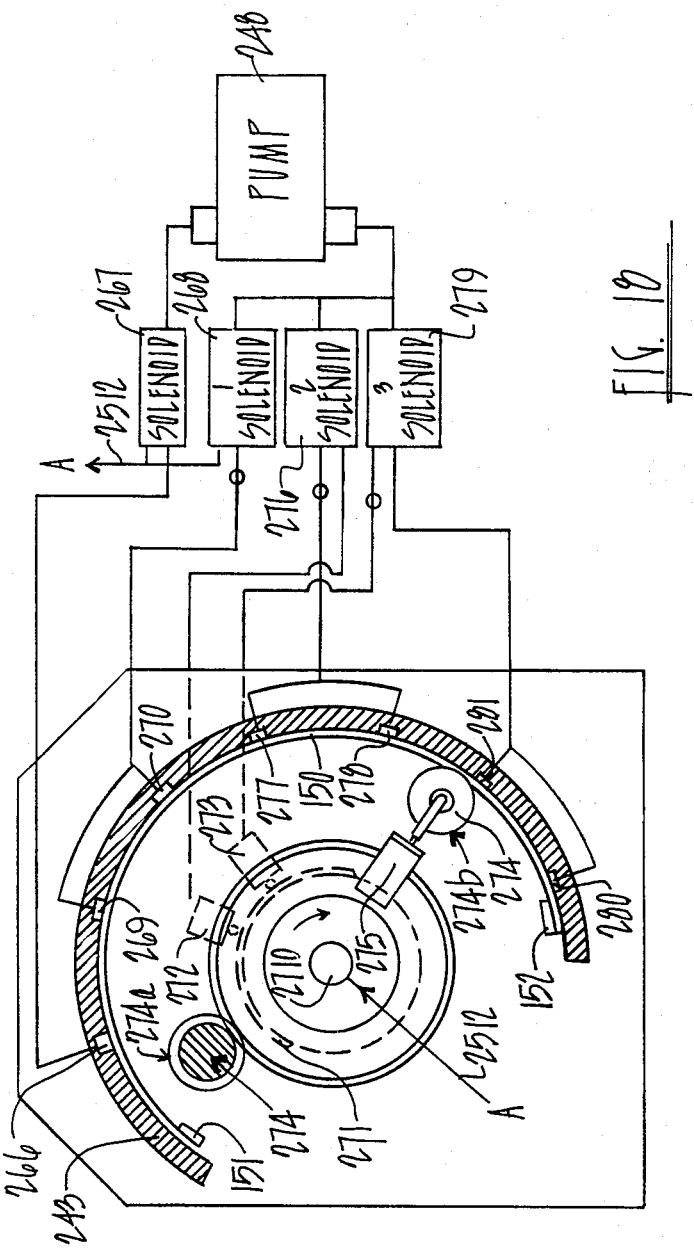
FIG. 12 is a detailed view of yet another portion of FIG. 8.

The details of the lower left hand corner of the Plexiglas sheet (163), are shown in FIG. 12 where the strip of tape (162) overlaps sheet (150). The sheet of Plexiglas (163) overlaps the tape (162) and is hinged to the sheet (150) by the strip of tape (165).

A magnet (176) is located on the strip (151) to enable the position of the apparatus to be sensed. This magnet is used for control purposes as will be explained later.

A limited portion of the right hand end of strip (152), namely portion (177), is thinner than the remaining portion of strip (152) because it is engaged by a pinch roller for driving the sheet (150) into position.

In like manner, a limited portion (178) of the right hand end of strip (151), a limited portion (179) of registration strip (155), a limited portion (180) at the left end of strip (151) and a limited portion (181) of strip (152) are also made thinner than the remainder of the strips to which they are connected for reasons similar to that described in connection with the thin portion (177).

Two identical transports (150) of the type shown in FIGS. 6 and 8 are normally used. The one which is first fed into the drum (243) will hereafter be called the first transport (150), and the other one will be called the second transport.

FIGS. 13, 14, 15 and 16 show the table on which the transport (150) of FIG. 6 is mounted prior to transport (150) being fed into the machine for reading or writing. These FIGS. 13 to 16 show a frame (190) and the bed (191) of the table. Near the rear end of the bed (191) of the table is a bar (192) which has a normal (rear) position shown in full lines and a forward position shown in dotted lines. The rear end of metal strip (152) of the transport (150) (FIG. 6) is placed on the table directly in front of bar (192) when the latter is in its rear (full-line) position. The overall width of the transport (150) (FIG. 6) is slightly smaller than the distance between the vertical members (193) and (194) of the brackets (195) and (197). The upper ends of the vertical members (193) and (194) are pivoted at (196) and (198) respectively. The length of transport (150), including strips (152) and (153) is slightly less than the lengths of brackets (195) and (197).

There are four air cylinders (200) which always operate in synchronism to either raise or lower the table by about 1 inch. When there is air pressure in the upper section of the four cylinders (200), the table bed (191) is in its lower position and when air pressure is applied to the four cylinders (200) in the lower section, the air pressure moves the table bed (191) to an upper position about 1 inch above the lower position.

When the table (191) has been raised to its upper position aforesaid, the plane of a transport (150) resting directly on bed (191) now coincides with the horizontal tangent of the pinch rollers (201, 202, 203 and 204). Rollers (202) and (204) are idle rollers which normally contact rollers (201) and (203) respectively. It is the horizontal tangent of the rollers, where the idle rollers contact the drive rollers (201) and (203), that is in the same plane as the transport (150), when the latter is resting on bed (191).

A motor (205) drives timing pulley (206) which in turn drives timing belt (207) which, in turn, rotates the driving rollers (201) and (203). The idling rollers (202) and (204) are driven by reason of their contact with rollers (201) and (203).

If we assume that the first transport (150), such as is shown in FIG. 6, is resting in its normal position on bed (191) with the rear edge of strip 152 (FIG. 6) in contact with a forward end of the bar (192) when the latter is in its rear position (solid lines), the apparatus is now ready to push the first transport toward the drum (243) for purposes for reading and/or writing.

Air cylinder (210), when air pressure is applied to it, causes bar (192) to move forwardly from its rear (solid line) position (FIG. 13) to its dotted line or forward position. When this bar moves forward, it presses the metal strip (152) (located at the rear end of the transport (150) of (FIG. 6), forwardly, causing the forward end (151) of the first transport (150), to move into a position where the thin ends of strip (151) are pinched between the pairs of rollers. That is to say the thin left end (180) of strip (151) moves between and is pinched between drive roller (201) and idle roller (202); and at the same time the thin right portion (178) of strip (141) moves between and is pinched between idle roller (204) and drive roller (203). Since the drive rollers (201) and (203) are driven by motor (205), the transport (150) continues to move forwardly into the drum (243) of the cylinder. Completion of the loading of the transport (150) will be described later.

After the first transport (150), described above, was fed into the machine, the operator may have loaded a second transport (150) so that it may also be fed into the machine as soon as the first transport (150) has been scanned and returned from the drum (243). In order to accomplish this result the operator has laid the second transport (150) on the shelves (211) and (212) of brackets (195) and (197) respectively. As soon as the first transport (150) has registered into drum (243), sensors (not shown) sense that action and automatically apply pressure to cylinders (213) and (214) to thereby cause arms (215) and (216), which are respectively connected to brackets (195) and (197), to rotate the brackets (195) and (197) about the pivots (196) and (198) respectively. Since the bracket (195) rotates clockwise, and the bracket (197) rotates counterclockwise, the second transport (150), which is now positioned on the brackets (195) and (197), will fall due to gravity onto the bed (191) of the table. Guides (217) and (218) are mounted on the upper surface of bed (191) and guides the second transport (150) after it has dropped by reason of gravity from the brackets (195) and (197). Guides (217) and (218) run the entire length of the bed (191) and are, of course, located on the bed (191) underneath the brackets (195) and (197), as shown in FIG. 14.

After the first transport (150) has been fed into the drum for scanning, and the second transport (150) has been dropped from brackets (195) and (197), onto the table (191), the brackets (195) and (197) are now ready to receive the first transport (150) after it has been scanned.

To prepare the apparatus for this function, the air is allowed to escape from cylinders (200) and the table bed (191) is lowered by 1 inch so the horizontal shelves (211) and (212) are at the same level as the horizontal plane that is the tangent of rollers (201) and (202) at the point of contact between those rollers. The first transport (150) that is returning from the drum (243) is therefore, at the same level as the shelves (211) and (212) and, since the motor (205) has been reversed, the rollers are driving the first transport (150) toward the rear of the brackets (195) and (197). This action continues until the first transport (150) has been driven as far rearwardly as the rollers (201) to (204) can drive it.

As the first transport (150) is being moved rearwardly, the upper side of its is engaged by brushes (219) for the purpose of firmly holding the first transport (150) against the upper surface of shelves (211) and (212). When the first transport (150) clears rollers (201–204), its strip (152) is moved more rearwardly than arms (220) and (221), which arms are respectively pivoted at (222) and (223). Next, the arms (220) and (221) are rotated about pivots (222) and (223) until the arms (220) and (221) contact the epoxy glass portion of the first transport (150). The arms (220) and (221) are then translated rearwardly, thereby causing the first transport (150) to move to a position where the rear edge of strip (152) (FIG. 6) is above the forward edge of bar (192), it being noted that this bar has been moved to its most rearward (solid line) position since the air pressure has been removed from cylinder (210).

It will be recalled that the second of the two transports (150) has been dropped onto the table bed (191), where it has remained while the first transport (150) has been scanned and returned. The second transport (150) is now fed into the scanning drum (243) by means of bar (192), rollers (201–204), etc., the same as was done for the first transport (150). Pressure may now be applied to cylinders (213) and (214) to cause the first transport (150) to fall on bed (191). The operator may now replace the paste-up or other material to be printed from the left hand section of the first transport (150), and similarly he or she places new output material into the right hand section of the first transport (150).

In order to provide the rotary and transitory motion of arms (220) and (221), there are provided two Stilson Miniature Rota-Clamps. The first of these Rota-Clamps comprise a housing (226) and a shaft (227). The housing (226) is supported by a frame (230) which is part of the bracket (195). The Stilson Miniature Rota-Clamp (226), (227) is so arranged that when the forward end of shaft (227) is pressed rearwardly, by the air cylinder (224), the arm (220) first rotates until it contacts the first transport (150), and then it translates rearwardly until it moves the first transport (150) to its ultimate final position above the edge of bar (192). The Stilson Rota-Clamp (228, 229) is held in position by frame (231) of the bracket (197). The second Stilson Rota-Clamp (229) is mounted on bracket (197) and when air pressure is applied to cylinder (225), it first causes rotation of arm (221) and then provides translation of arm (221) to move the first transport (150) rearwardly to its final position. Air pressure is normally applied to cylinders (224) and (225) simultaneously to thus cause arms (220) and (221) to act in unison in moving the first transport (150) rearwardly.

As stated earlier when the first transport (150) was on the brackets (195) and (197), the second transport (150) was being fed into scanning position. To do this air pressure was fed into cylinders (200) to raise bed (191). Bar (192) was moved forwardly, rollers (201 to 204) were rotated and all other steps performed in the sequence that was necessary for moving a transport into scanning position. Such steps were described in connection with moving the first transport (150) into scanning position. After the second transport (150) is fed into scanning position, the first transport (150) is dropped from brackets (195) and (197) onto bed (191) so material can be loaded and it can be fed into drum (243). The aforesaid procedure using the two transports (150) can be repeated over and over to form all of the pages of a newspaper.

The bracket (195) is pivoted about shaft (196) which in turn is supported by support elements (235) at both the front and rear ends of the machine. Similarly supports (236) support shaft (198) which carries bracket (197).

The drum (243), which is fed with a transport (150), is bounded by a wall (237) which has an opening (238), covered by a door (239), pivoted at (240). The purpose of the door (239) is to prevent the laser beam from exiting from the drum and injuring the personnel, such as by entering the eyes of the operator. Whenever a transport (150) is being fed to or from the drum, the door (239) is open. Whenever the door (239) is open, a mercury switch operated by rotation of the shaft (240) of the door deenergizes a solenoid to move a shield (not shown) to a position which prevents the laser beam from being directed toward the opening (238). When a transport (150) is not entering or leaving the drum (243), the door (239) is closed and this prevents the laser beam from injuring the operator.

Figures 17, 21:
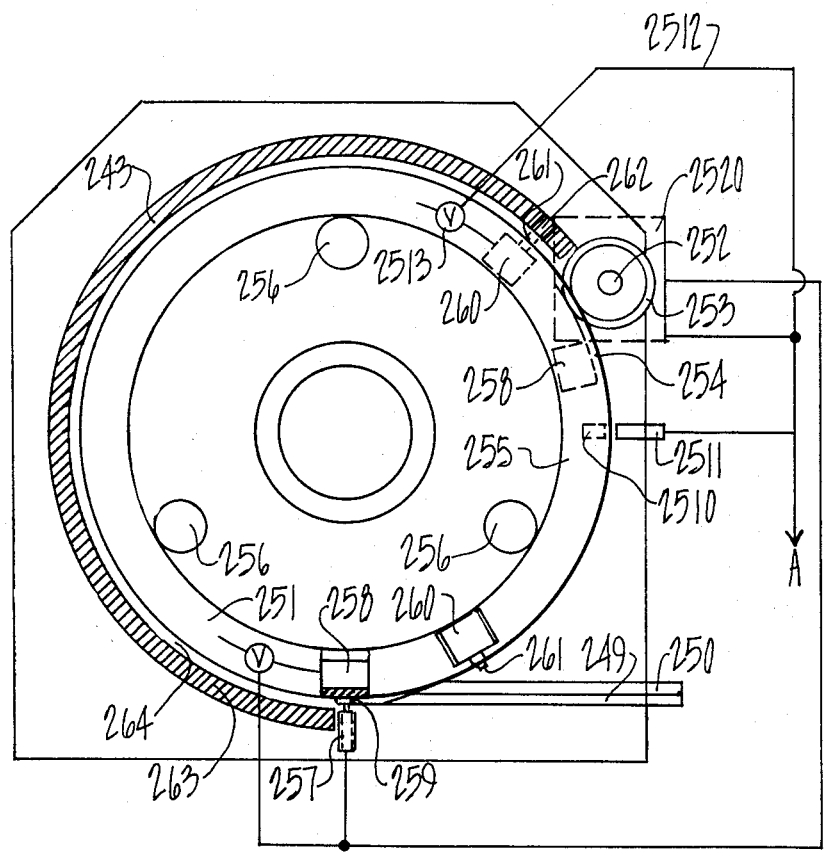
FIG. 17 shows a disc inside the drum together with means for positioning a transport in the drum (243).
FIG. 21 shows how the sub-drawings 13A, 13B, 13C and 13D are put together to form FIG. 13. It also shows how sub-drawing 14A and 14B form FIG. 14.

FIG. 17 illustrates the drum (243) and the apparatus of the left end of the drum for processing a transport (150). The ramp (249) has an upstanding flange (250), at each side thereof, to guide the transport into the the correct position as it enters the drum (243). As the transport (150) enters the drum (243), the magnet (176) (FIG. 6) on the transport (150) passes across sensor (257) which senses the presence of the magnet and thereupon actuates an electrical circuit which in turn applies air pressure to cylinder (258) which in turn causes shoulder screw (259) to be moved upwardly. Since the side walls of the left hand slot (153) in the forward strip (151) of the transport (150) (FIG. 6) have straddled the shaft (263), it is apparent that when the head (259) of the shoulder screw moves upwardly, it clamps the left end of strip (151) (see FIG. 6) to the disc (251) (FIG. 17). Since there is a similar shoulder screw and air cylinder on the right hand side of the drum (243), which cooperates with the slot (153) at the right end of transport (150), there will be two shoulder screws (259) clamping the strip (151) to rotatable discs such as (251). When the sensor (257) sensed the magnet (176), it not only energized the circuit (2571) which caused air pressure to be applied to cylinder (258), but it also energized a circuit starting a motor (2520) having a shaft (252) connected to a gear (253) which is mated with another gear (254) on disc (251), and thereby caused the disc (251) to start rotating. In view of the fact that the strip (151) of the transport (150) has been clamped (by shoulder screw head (259)) to the disc (251), the rotation of disc will continue to move transport (150) along slot (264) until the transport (150) has reached its final position, as will hereafter be described.

Shortly after the disc (251) begins to rotate, the pin (261) engages registration hole (157) (see FIG. 6) and thereby, ensures that the transport is registered with the inside surface of the drum (243). In its final position, the pin (261) is not only passing through the slot (157) but is in alignment with hole (262) in the drum (243), whereupon air pressure is applied to cylinder (260) to press pin (261) through the hole (157) and into the hole (262) in order to hold the transport (150) and disc (251) in precise position during scanning. The disc (251) is supported by rollers (256) which insures that it rotates with respect to the drum (243) axis.

Suitable means can be provided for automatically stopping the disc (251) when the pin (261) is in alignment with the hole (262). Such means may, for example, include a magnet (2510) on the disc (251). This magnet will be sensed by sensor (2511) when the disc (251) is rotated to the position where pin (261) is facing hole (262). An electrical circuit (2512) is provided for deenergizing the motor (2520) and thus, stopping motor shaft (252) in a position where pin (261) registers with hole (262). Circuit (2512) applies current to valve (2513) to admit air to cylinder (260) to move pin (261) into hole (262).

It is understood that the disc (251), bearings (256), cylinders (258) and (260), shoulder screw (259) and registering pin (261), together with hole (262), are located along the left hand margin of the transport (150), within the drum, for the purpose of driving and registering of the left hand portion of the transport (150). Similar devices are located at the right hand side of drum (243) to perform the same function along the right hand margin of transport (150).

FIG. 18 is a sectional view of the drum showing the vacuum system and is a view from the right hand side, as distinguished from FIG. 17 which is a view from the left hand side.

In FIG. 18, the transport (150) is shown in its final position with strip (151) at its forward end and strip (152) at its rear end. It is further assumed that the transport (150) has been moved to its final location within the drum (243) and that the registering pin (261) has entered hole (262) as described in connection to FIG. 17.

The transport (150) has holes (265) extending completely through the epoxy glass sheet (150) and located just below the upper piece of tape (162) for sealing the output material.

The aluminum plate which is used for making a printing plate extends from the lower piece of tape (162) (FIG. 6) to the lower edge of the holes (265). Therefore, there is a space between the upper end of the aluminum plate and the lower end of the upper strip of tape (162); and the holes (265) communicate with that space and are in alignment with the groove (266) which runs across the drum (243) parallel to the axis thereof. The groove (266) is connected, by tubing, to a solenoid valve (267) which is in turn connected to one input of vacuum pump (248). The pump has two separate inputs.

The output material (not shown) extends the complete distance from the upper edge of the lower strip of tape (162) to the lower edge of the upper strip of tape (162), so that it covers the air space between the upper edge of the aluminum plate and the lower edge of the forward strip of tape (162). The vacuum created in groove (266) and extending through the holes (265), therefore, sucks the output material toward the epoxy glass plate (150) along a limited upper portion of the output material. The output material is held in position along its right and left hand sides, until vacuum is applied, by the flaps (168) and (171) (FIG. 8). In this respect, see also FIG. 10.

The two solenoid valves (267) and (268) have an input electrical circuit connected to control wire (2512) (FIG. 17) which causes these solenoid valves to open when the pin (261) is registered in the hole (262) as aforesaid.

Grooves (269) and (270) run across drum (243) and apply vacuum to the upper part of the transport (150) to hold it firmly against the inside wall of drum (243). The vacuum for grooves (269) and (270) comes from the second input of the pump (248).

After the pin (261) has registered with hole (262) as aforesaid, the following series of events happens. The cam (271), when it is normally at an angular position 180° from that shown, is not actuating either of the switches (272) or (273). The squeegee roller (274) is shown in its inward position, as shown in (274A). When the pin (261) has moved to the position of registration with hole (262), circuit (2512) is actuated which not only energized solenoids (267) and (268) but also started motor (2710) for rotating the cam (271) clockwise. The squeegee roller (274) then moves outwardly into contact with the transport (150), under the force of air pressure fed into cylinder (275). As the cam (271) rotates clockwise, the squeegee roller (274) similarly swings clockwise until it reaches the position (274B). Sincd the cam rotates clockwise, it first actuates switch (272) which energizes solenoid valve (276) to allow vacuum to be applied to grooves (277) and (278); thus, sucking another section of the transport (150) inwardly towards the inner wall of (243).

As the cam (271) rotates further in the clockwise direkction, it energizes switch (273) which energizes solenoid valve (279) and applies vacuum to grooves (280) and (281). Like the other grooves, each of grooves (277, 278, 280 and 281) run across the drum (243) parallel to the axis thereof, and when vacuum is applied thereto, the transport (150) is sucked against the inner wall of the drum (243). As the cam (271) was rotating by about 160°, the squeegee roller (274) has been held against the inner wall of the transport (150) and has applied pressure to press the transport (150) against the inner wall of the drum (243), to this iron out any bubbles or other irregularities in the positioning of the transport (150) within the drum (243).

It is noted that the suction through grooves (266, 269 and 270) is applied as soon as the pin (261) registers with hole (262). At about the same time that the vacuum is applied to those grooves, the squeegee (274) is extended, and cam (271) and squeegee (274) begin rotating clockwise to, first move the cam into position, and secondly start the squeegee pressing the transport against the inner wall of (243). The squeegee is so positioned with respect to the switches (272) and (273) that the squeegee passes over the portion of the transport (150) that is covered by vacuum grooves (270) and (278) before suction is applied to those grooves. Similarly, the squeegee (274) passes over the portion of transport (150) that is covered by grooves (280) and (281) before the vacuum is applied to those grooves.

After scanning has been completed, the air pressure to cylinder (275) is reversed and the squeegee (274) retracts. The solenoid valves (267, 268, 276 and 279) are then deenergized, and pin (261) is retracted from hole (262) by cutting off the air pressure to cylinder (260). The transport (150) is now free to be removed from the drum (243). The motor (2520) which is controlling disc (251) is then reversed and the transport (150) is then ejected from the drum (243) along ramp (249). Once the transport (150) has reached the point where its rear strip (152) has reached the pinch rollers (201 to 204), those rollers then cause the transport (150) to continually move outwardly onto the brackets (195 and 197) (FIG. 13) until the strip (152) has passed the arms (220) and (221). Thereafter, application of air pressure to cylinders (244) and (225) cause the arms (220) and (221) to not only rotate, but also translate, and move the transport (150) along the brackets (195 and 197) to its normal starting position ahead of the front end of bar (192). Then that transport (150) is allowed to drop onto bed (191), as aforesaid.

The overall operation will now be stated:

Let it be assumed that two printing plates for two pages of a newspaper are to be prepared. The paste-up for the first page would be placed in the left hand section of the first transport (150) of FIG. 6. An aluminum plate together with an output material would be applied to the right hand section of said first transport (150) (FIG. 6) as aforesaid. This transport (150) would then be placed on the bed (191) of the table (FIG. 13) between the guides (217) and (218). The bar (192) would be in its rearward position and the rear end of strip (152) would be positioned against the forward face of the bar (192). The bar (192) is then moved forwardly pressing the first transport (150) into the rollers (201 to 204) which pinch the forward sections (181) and (178) of the bar (151), and cause the first transport (150) to move forwardly into the drum (243). The door (239) is then opened and at the same time a shield is moved into a position to prevent the laser beam from passing the opening (238). The rollers (201 to 204), acting upon the right and left edges of the transport (150) continues to push the first transport (150) forwardly until grooves (153) engaged the shoulder screw (159). At the same time that the aforesaid engagement occurs the magnet (176) is sensed by sensor (257) which causes air pressure to be applied to cylinder (258) to thus clamp the leading edge of strip (151) to the disc (251). The disc (251) then rotates until pin (261) registers with hole (262). The first transport (150) has now been rotated to its scanning position. Air pressure is then applied to cylinder (260) to cause the pin (261) to engage hole (262) and maintain the first transport (150) in its scanning position. At this point, the cylinder (258) is now located in its dotted line position. The air pressure applied to opening (114) rotates the turbine (118) which in turn rotates the shaft (102) and its heads (120). This accomplishes the rotating component of the scanning. The horizontal component of the scanning is accomplished by stepping motor (126) rotating the lead screw (133).

As a result, the reading and writing sections of the first transport (150) are scanned. While all of this has been taking place, the operator has applied the second page of paste-up material in the left hand section of the second transport (150) (FIG. 6) and has provided a new output material in right hand section of FIG. 6. The control system then releases air pressure from cylinders (200) causing the horizontal portions (211) and (212) of brackets (195) and (197) to move into alignment with the rollers (201 to 204). As the disc (251) (FIG. 17) rotates in the counterclockwise direction to the first transport (150), which has now been fully scanned, that transport (150) moves outwardly onto the brackets (195) and (197). Pushers (220 and 221) are activated to push the transport (150) away from the rollers. Air pressure is then applied to cylinders (200) to raise the bed (191) so that the second transport (150) may now move forward through the pinch rollers (201 to 204) in the same manner as was described in connection with the first transport (150). The first transport (150) is now dropped onto the bed (191), then reloaded with the third page of the newspaper to make room for the second transport (150) to return along the brackets (195) and (197). The first transport is now ready to be fed into the drum (243) a second time. This process is repeated until printing plates for the entire newspaper have been prepared.

The writing operation, which can be used to prepare any number of printing plates, is well known prior art. Alternatively, the writing laser may prepare the printing plate directly in accordance with other prior art teachings, There are two holes (1110) (FIG. 20) extending from slot (111) to the external atmosphere, but not along a line which will intercept one of the holes for the bolts (1101). The vent holes (1110) occur on both ends of the device, and also avoid instability in the operation of the shaft.

Having described the various parts of the invention, it may be helpful, in understanding the requirements of the control system for the machine, to set forth the steps required in order to operate the machine through one complete cycle. These steps are as follows:

1. Apply pressure to cylinders (200) to raise bed (191).
2. Apply pressure to cylinder (210) to push bar (192) forward.
3. Start motor (205) to cause rollers to move transport (150) into drum (243). Door (239) is also opened.
4. Sensor (257) senses magnet (176) which admits pressure into cylinder (258) to cause head (259) to clamp strip (151) of transport (150). The sensing of magnet (176) also starts a motor (2520) which rotates shaft (252) which in turn rotates disc (251) clockwise.
5. A sensor (2511) next senses when pin (261) is in alignment with hole (262), and applies air pressure to cylinder (260) to press pin (261) into hole (262). The door (239) is closed.
6. Air pressure is applied to cylinder (275) to move squeegee (274) outwardly and into contact with sheet (150).
7. Cam (271) rotates clockwise along with squeegee (274).
8. Vacuum solenoid valves (267) and (268) are energized simultaneously, but valve (276) is not energized until squeegee has passed grooves (277) and (278), and valve (279) is not energized until squeegee has passed grooves (280) and (281).
9. Immediately after step 5, air pressure is applied to cylinders (213) and (214) to rotate brackets (195) and (197) to drop second transport (150) on bed (191).
10. Air pressure is removed from cylinders (200) so that bed (191) of table is lowered. The operator may now load the materials.
11. Scanning is performed.
12. Squeegee (274) is retracted and rotated clockwise until it is in its original position.
13. Solenoid valves (267, 278, 276 and 279) are deenergized. Air pressure is exhausted from cylinder (258) so pin (261) is removed from hole (262). The motor which rotates shaft (252) is reversed and transport (150) is driven out of drum (243). The door (239) is opened.
14. Rollers (201 to 204) are driven in reverse by motor (205) to drive first transport (150) out of drum (243) onto brackets (195) and (197). Pushers (220) and (221) are activated to push transport (150) off of rollers.
15. Air pressure is applied to cylinders (200) to raise platform so second transport (150) is in alignment with rollers (201 to 204).

16–24. Steps 2 to 10 are now performed on the second transport (150).

25–26. After second transport (150) is scanned, steps 12 through 14 are performed on second transport (150) to eject it from drum (243) and onto brackets (195) and (197), etc.

The above 26 steps performed one complete cycle of operation. Those steps are repeated until printing plates for all pages of the newspaper have been made.

The aforesaid 26 steps may be performed in any of various ways. One way would be to have a push button for each step. These buttons could be depressed in the desired sequence. A second way performing the sequence is to employ a rotary stepping switch which continuously rotates and closes a circuit to perform one of said steps each time the switch advances one step.

Even if hand push buttons, or a stepping switch, is provided to control the system, some of the operations can be performed automatically. For example, circuits (2512) and (2571) automatically perform two of the 26 steps.

In accordance with this invention, however, the loading and unloading of transport (150) is performed by microprocessor-controlled means as set forth below in the context of a control system which oversees various operations of the present scanning device.

Figure 22D:
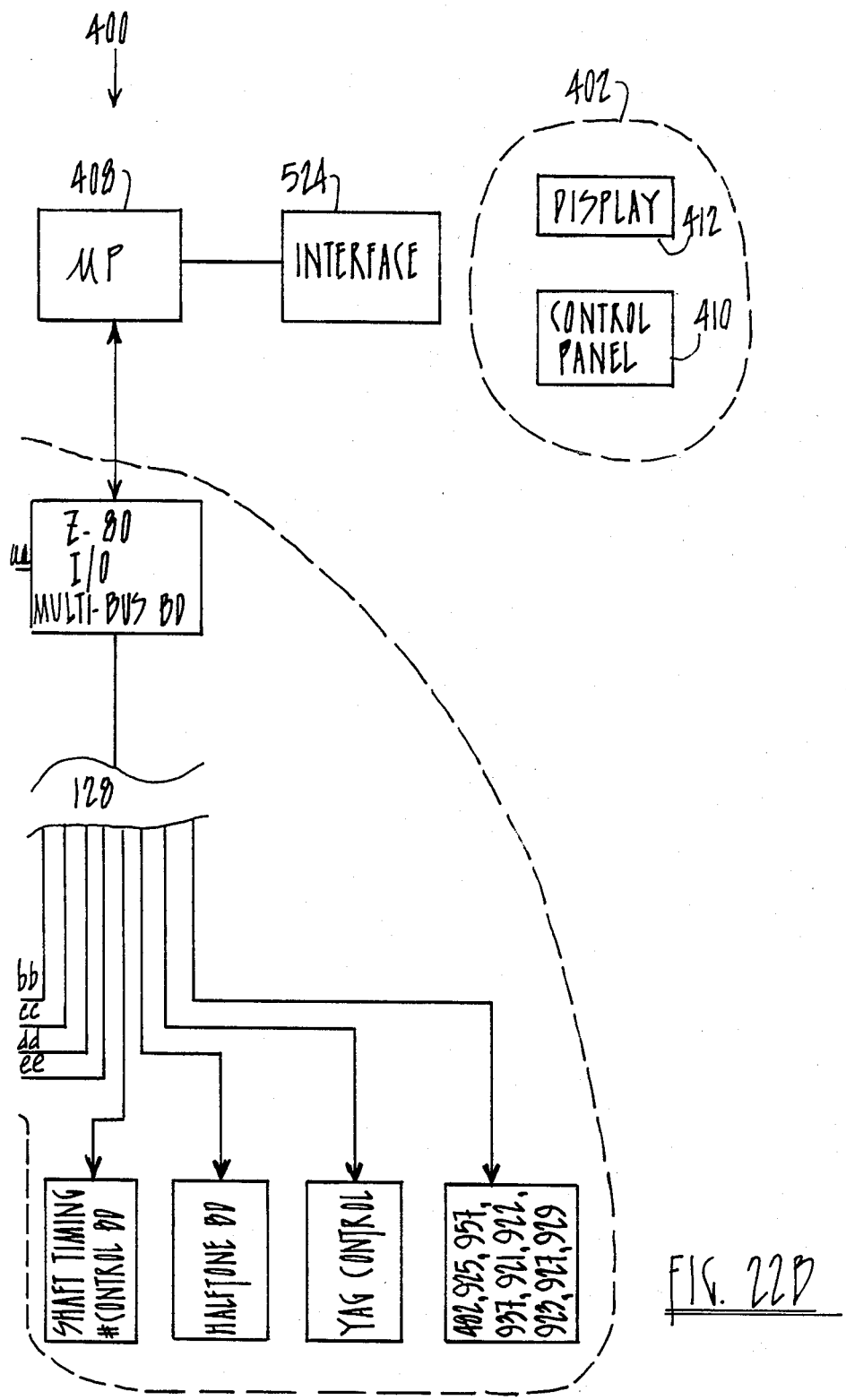
FIGS. 22(A and B) is a general block diagram showing elements of a laser platemaker reader and/or writer which cooperate under microprocessor control.

The control system (400) of the present invention is illustrated, in general, in FIG. 22. The control system (400) may be viewed as comprising three subsystems (402), (404) and (406) which are linked together by a central microprocessor (408). The central microprocessor (408) is, preferably, a *Z-80 microprocessor.
*Trademark of ZILOG Subsystem (402) includes a control panel (410) and a display (412) and provides a channel of communication between the operator and the central microprocessor (408).

Subsystem (404) is provided for loading transports (150) (see FIG. 6) onto the drum section (243) (of FIG. 1) from table bed (191) and unloading transports (150) from the drum section (243) back onto the table bed (191). The loading and unloading is effected by a plurality of motors and solenoids (416) which are selectively actuated by solidstate relays (SSRs) (418). In the embodiment shown in FIG. 22, the status of the table bed (191), the status related to the drum section (243), and the status of the transports (150) carried on the table bed (191) and drum section (243) are detected as signals which are conveyed by sensors (419), via an interface (420), to an input device (422) (such as a commercially available Pro Log 7603). The device (422) also receives input from the central microprocessor (408) and provides a signal to a subsidiary microprocessor (424). The subsidiary microprocessor (424) examines the signal received from the input device (422) and provides an appropriate output to an output device (426) (preferably a commercially available Pro Log 7602). The output device (426) directs its output to (a) the central microprocessor (408)—thereby informing the central microprocessor (408) of a loading or unloading operation——and (b) the solidstate relays (418)—thereby providing a closed loop for achieving proper transport loading and unloading. The subsidiary microprocessor (424) is, preferably, an INS8073 microprocessor.

The third subsystem (406) connects the central microprocessor (408) with the inputs and outputs required to achieve proper, synchronized reading of a paste-up (473) and/or writing of a known plate (516) carried on a drum (243). The plate (516) may be substituted by another receptor made of material which undergoes a property change when a beam of light radiation is applied thereto.

The three subsystems (402), (404) and (406) permit a measure of operator control over the loading and unloading of transports and assure the desired, selected reading and/or writing of a paste-up or plate on a loaded transport. That is, the three subsystems (402), (404) and (406) act separately in providing specific load-/unload operations, operator informing functions, and scan, read, and write control functions all act together in an overall control system. How the subsystems (402), (404) and (406) perform their respective functions and interact with each other through the central microprocessor (408) is recognized by examining each subsystem alone in detail.

Before addressing the various subsystems (402), (404) and (406), however, reference is made to the general block diagram of FIG. 23 which expands on FIG. 1. FIG. 23 shows a reader/writer (460) combined into a single structure. As previously described, the reader (462) includes a HeNe laser beam exitting the splitter (468) which is then expanded and collimated by lenses (470) as a beam (471) enroute to a mirror (121a). The mirror (121a) is disposed at the predetermined fixed angle relative to the axis of the beam (471). The mirror (121a) is mounted to a rotatable shaft (102) which has an axis preferably aligned with the axis of the beam (471). As previously discussed, a turbine (118) at each end of the shaft (102) causes the shaft (102) to rotate as air under pressure is forced through the turbines (118). Also the beam (471) is focussed by lens (122) (See FIG. 2).

As the shaft (102) rotates, the mirror (121a) rotates about the shaft axis. The HeNe beam (471) as it strikes the mirror (121a) is redirected as beam (477) toward a paste-up (478) which is held against a transport (140) which has been loaded into the machine (460). (The drum section (243), it is noted, is not shown). The rotation of the mirror (121a) causes displacement of the beam (477) along a line from the top of the paste-up (478) to the bottom thereof. At the same time, the shaft (102) is coupled to a lead screw (133) which is parallel to the shaft axis and is connected to a stepping motor (136). When the stepping motor (136) turns the lead screw (133) in one direction, e.g. counterclockwise, the shaft (102) is translated axially in a first direction and when the motor (136) turns the screw (133) in the opposite direction, e.g. clockwise, the shaft (102) translates in the corresponding opposite axial direction. The rotation and translation of the shaft (102) permits the beam (477) to read one top-to-bottom line after another, from right to left, as the shaft (102) is translated.

Depending on whether the spot struck by the beam (477) is black or white, a corresponding light intensity is directed back to the mirror (121) and through the lenses (122) and beam splitter (468). The detector (486) is preferably a conventional p-i-n diode. The detector (486) provides a low-level electrical signal to a preamp (488). The level of the electrical signal entering the preamp (488) is proportional to the amount of white covered by the beam (477) on the paste-up (478). The preamp (488) is included to clarify the distinction in the electrical signal between detected black and white. The electrical signal is then quantized and defined digitally, a "high" voltage corresponding to black and a "low" voltage corresponding to white (or vice versa) by a video processor and sync separator (490). Conveyed with the quantized video is a synchronization pulse generated once per revolution of the shaft (102). To generally define the timing of the sync pulse, a magnet (479) is affixed to a rotating part of the shaft (102) and a Hall effect sensor (480) which translates, but does not rotate, with the shaft (102) is positioned so that the magnet (479) passes the Hall effect sensor (480) once per revolution. In addition, the black-white light reflective encoder (143) (see FIG. 5), having a black portion and a white portion with a sharp interface therebetween, is coupled to be translated by the screw (133) so that the black-white element translates with, but does not rotate with, the shaft (102). The path of the rotating HeNe beam (477) passes the black-white element, thereby providing a distinctive sync pulse with each revolution. The instant that the HeNe beam (477) passes the black-white interface represents a precise sync pulse which is anticipated by the pulse generated by the magnet-Hall effect sensor arrangement. That is, the optically-generated sync pulse closely follows the magnetically-generated sync pulse, thereby distinguishing the optical sync pulse from the video signals formed when the HeNe beam (477) traverses the paste-up (478). The magnet-Hall sensor arrangement is of particular value in maintaining shaft speed in the event of an optical malfunction or HeNe loss. Also, the magnet-Hall sensor arrangement allows continued sync maintenance even when the HeNe beam is shut off during the loading of a transport (150). Thus, the shaft (102) need not be stopped and restarted to bring the shaft (102) up to proper speed each time a transport is loaded. It is further noted that a shaft timing and control board (491) is employed in the control system to perform the shaft sync function.

The video processor and sync separator (490) feeds the quantized video and the optically generated sync pulses to digital logic and memories element (500). As is known in the art, the element (500) enters the quantized electrical signal for successive "vertical" lines into either of two memories (not shown) in alternation. In that way, one memory may receive data from a reader, like (462), while the other transmits data to a write (502). Where a reader is not combined with a writer into a single structure along a single shaft, as in FIG. 23, digitized video can be entered into an element (500) from a remote reader (not shown) to an independent writer which may be configured like writer (502). (It is noted that the rotation of the shaft of the writer and the shaft of the independent reader are synchronized to achieve proper operation.)

In order to write or burn an image onto the plate (516), the element (500) provides electrical signals corresponding to the data entered into memory by the reader (462) to a modulator driver (504). The output of the driver (504) enters an acousto-optical modulator (506). When writing is not to be performed, the YAG laser system (510) positions a shutter (not shown) to block the beam (508). When not blocked, the beam (508) passes through the modulator (506) and, unless deflected, is stopped by a trap (512). The trap (512) has a hole therethrough which is in at least substantial alignment with a mirror (121b) and the modulator (506). By properly deflecting the beam (508), the beam (508) can pass through the hole in the trap (512) and strike the mirror (121) via lenses (515). Of the two levels of signals emanating from the driver (504), one applies a deflection to the beam (508) which directs the beam (508) through the hole in the trap (512) while the other does not. When the selectively deflected YAG beam reflects off the mirror (514), it strikes the plate (516) which can comprise a known Lasermask and image receiver. The beam striking the plate (516) "writes" or burns an image thereon in response to the output of the driver (504). Thus, as the shaft (102) rotates in synchrony for the reader (462) and writer (502), one line after another is (a) read from the paste-up (478), (b) entered into memory, and (c) laser-written onto the plate (516).

Still referring to FIG. 23, a rotary control (520) is shown controlling the angular speed of the shaft (102). The sync pulse from the video processor and sync separator (490) and a timing signal from the digital logic and memories element (500) are combined to adjust the angular speed. The rotary control (142) adjusts the current-pressure transducer (142) which varies the air pressure being applied to the turbines (118) and, hence, controls shaft speed. Further, a linear control (522) changes the operating speed of the stepping motor (136) and, hence controls the rate of translational scan of the shaft (102).

The control panel (410) and display (412) are shown in FIGS. 23 and 24. In FIG. 24, the control panel (410) has a conventional lock (430) which prevents unauthorized programming control at the panel (410). When the lock (430) is unlocked one of a plurality of control buttons (432) through (454) may be actuated. Actuating LOAD button (432) enables an automatic load sequence. Specifically, actuating the LOAD button (432) conveys a signal through the central microprocessor (408) instructing the subsystem (404) to effectuate a transport load sequence, as discussed further below. Similarly, actuating UNLOAD button (434) effectuates an unload sequence, which is also discussed below.

In FIG. 23, the central microprocessor (408) is shown coupled (a) to the control panel (410) through interface (524), (b) to the display (412) (as in FIG. 22), (c) to the linear control (522) and (d) to the digital logic and memories element (500). As described below with reference to FIG. 24, this interrelationship permits the operator to actuate the buttons (432) through (454); numerically ordered keys (601) through (609); plus (+) and minus (−) keys (610) and (612); decimal point key (611); CLEAR key (614); and ENTER key (616) to provide various inputs, operational modifications, and status checks to the machine (460) of FIG. 24.

Figure 25A:
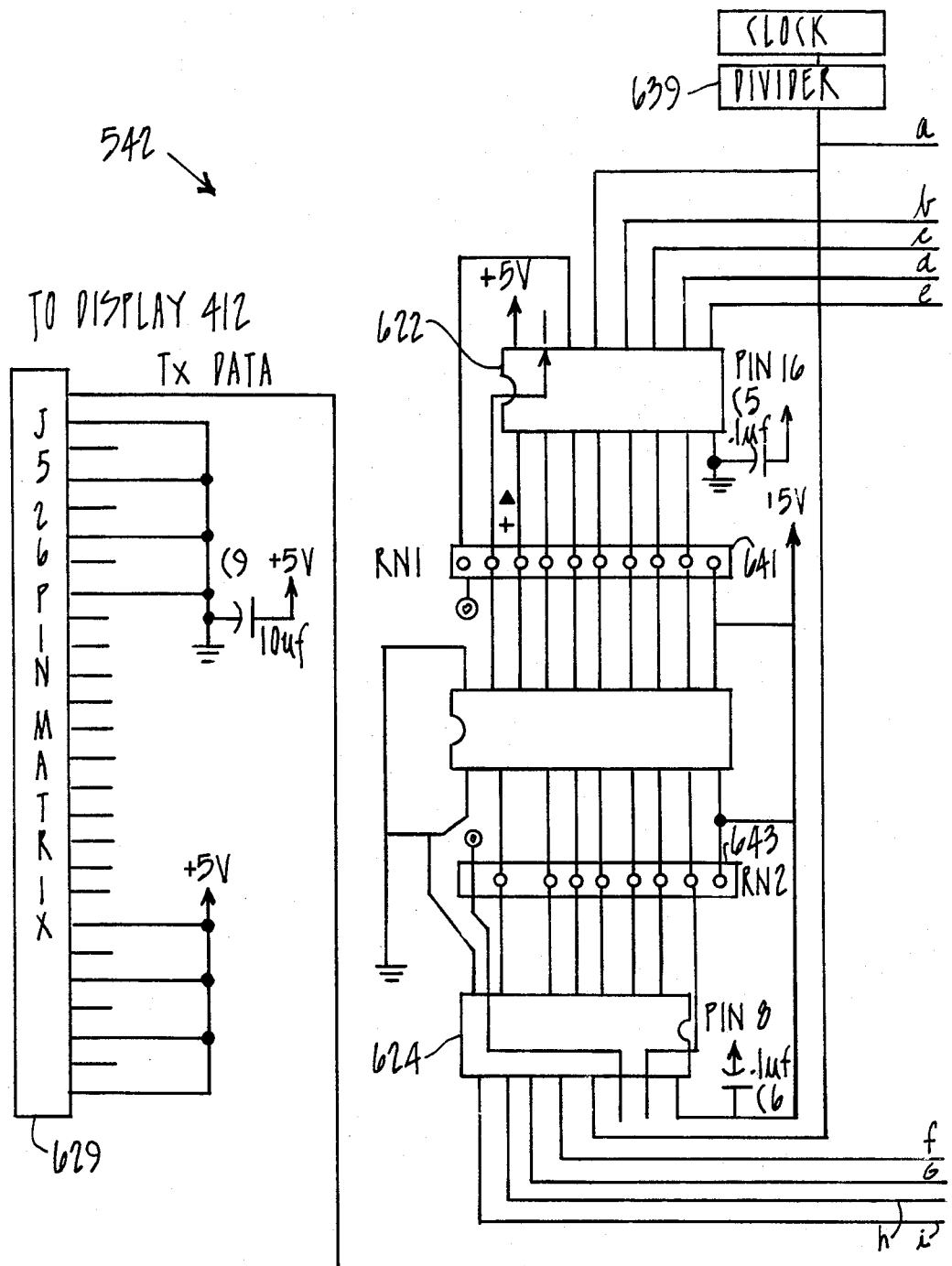
FIGS. 25(A,B,C) is a schematic diagram showing the interface between the control panel of FIG. 24 and a control microprocessor.
Figure 25B:
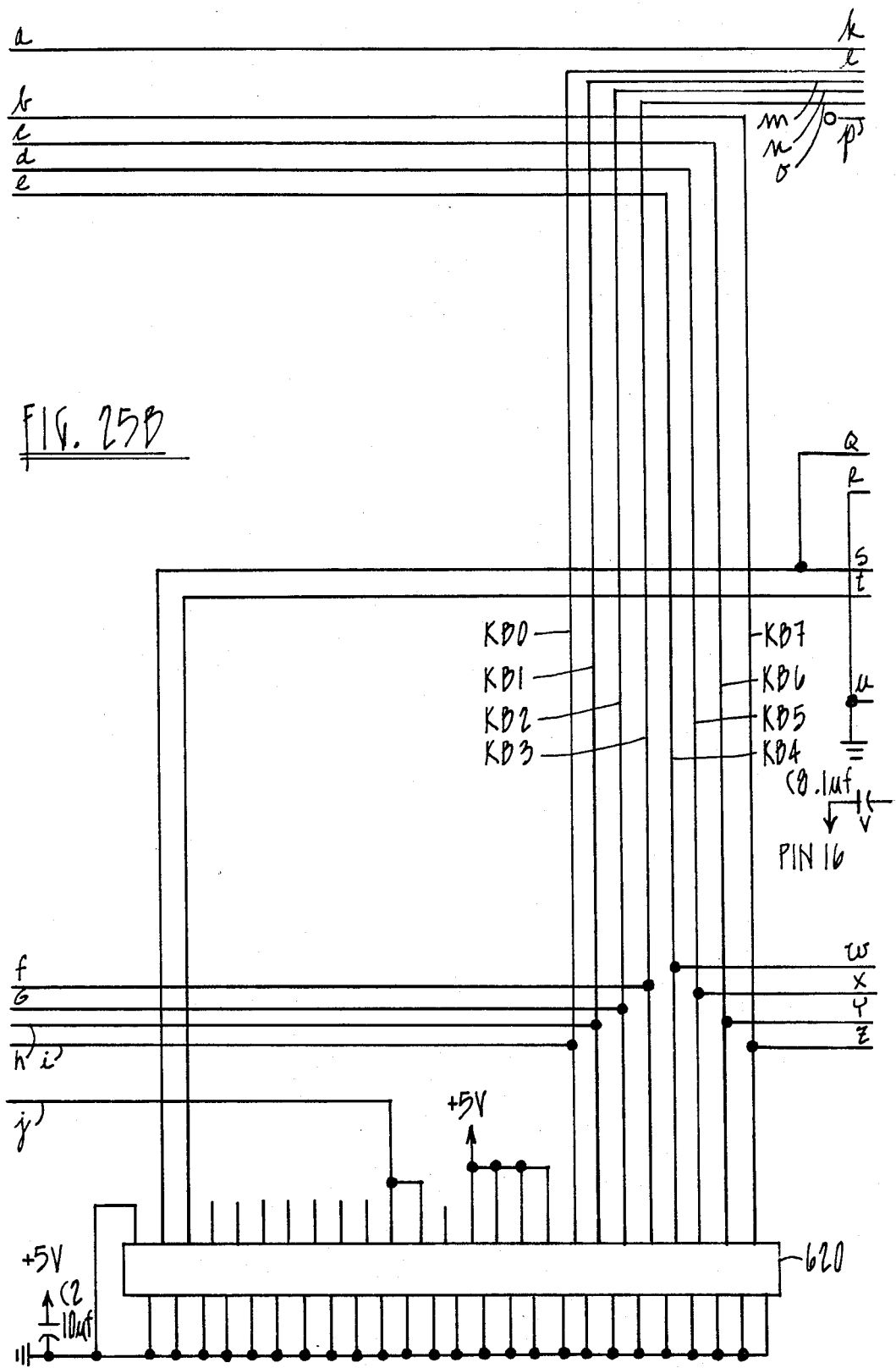
Figure 25C:
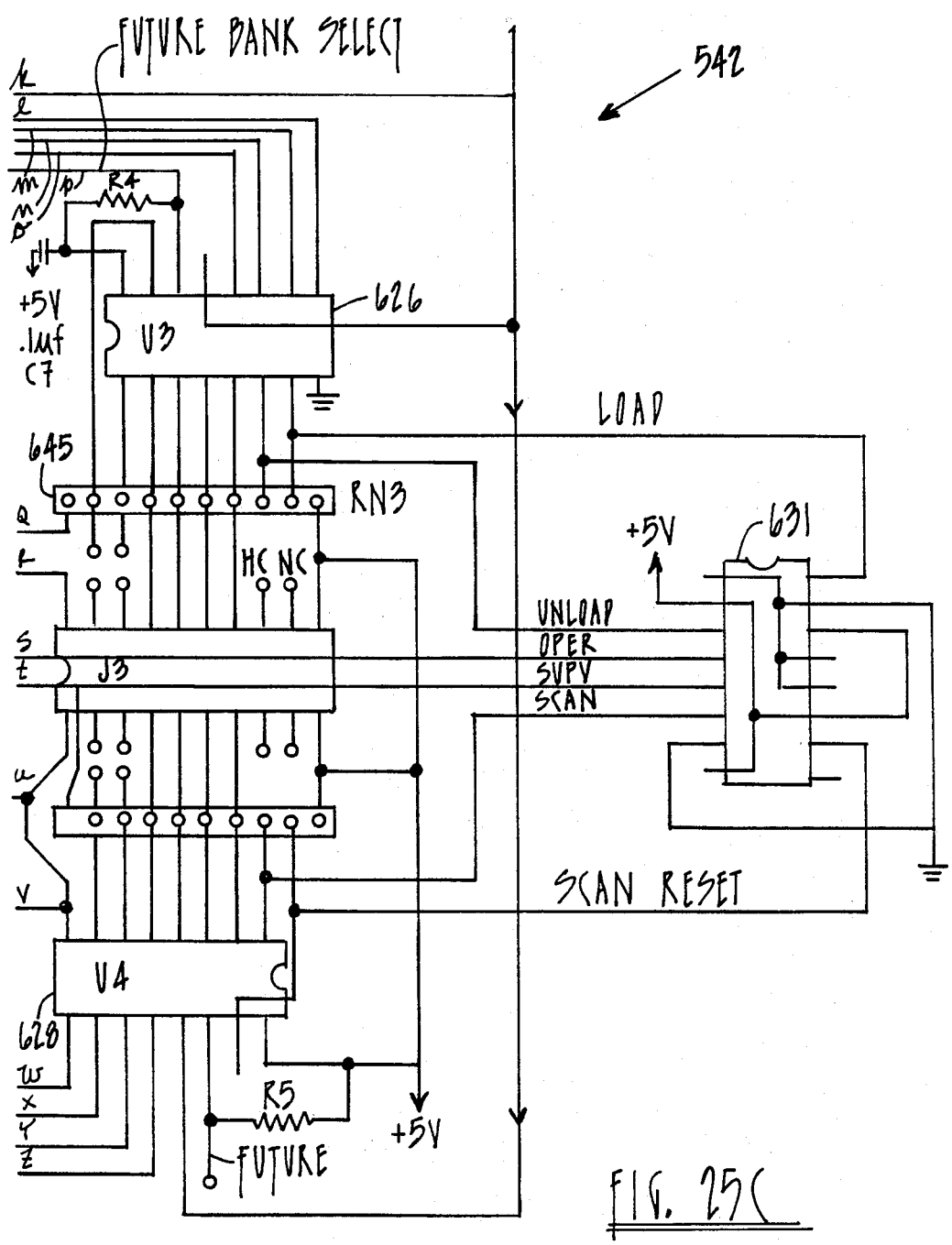

The interface (542) is shown in detail in FIG. 25. Specifically, a cable (620) to the central microprocessor (not shown in FIG. 25) includes eight lines (KB0 through KB7) on which the various inputs related to the buttons (440) through (454) and keys (601) through (616) are conveyed. Each button or key is connected to a PROM (622), (624), (626) or (628) which assigns to each button or key actuation a distinct, corresponding input word on the lines (KB0) through (KB7). The PROMS (622) through (628) are preferably 82S131 ICs. Data is also transmitted to a 26 pin connector (629) connected to the display (412). The access lock (430) is connected to a junction element (631) which provides a selective interlock of the buttons. Also noted in FIG. 25 is a clock (637) which is divided by divider (639). The divider (639) provides two outputs, each of which provide pulses at a frequency of 45–50 Hz. The divider (639) directs pulses to the PROMS (622, 624) and to the PROMS (626, 628) in alternation so that one pair of the PROMS at a time provides input to the lines (KB0) through KB7). Associated with each PROM (622) through (628) is a respective pull-up resistor (641) through (647).

Figure 26B:
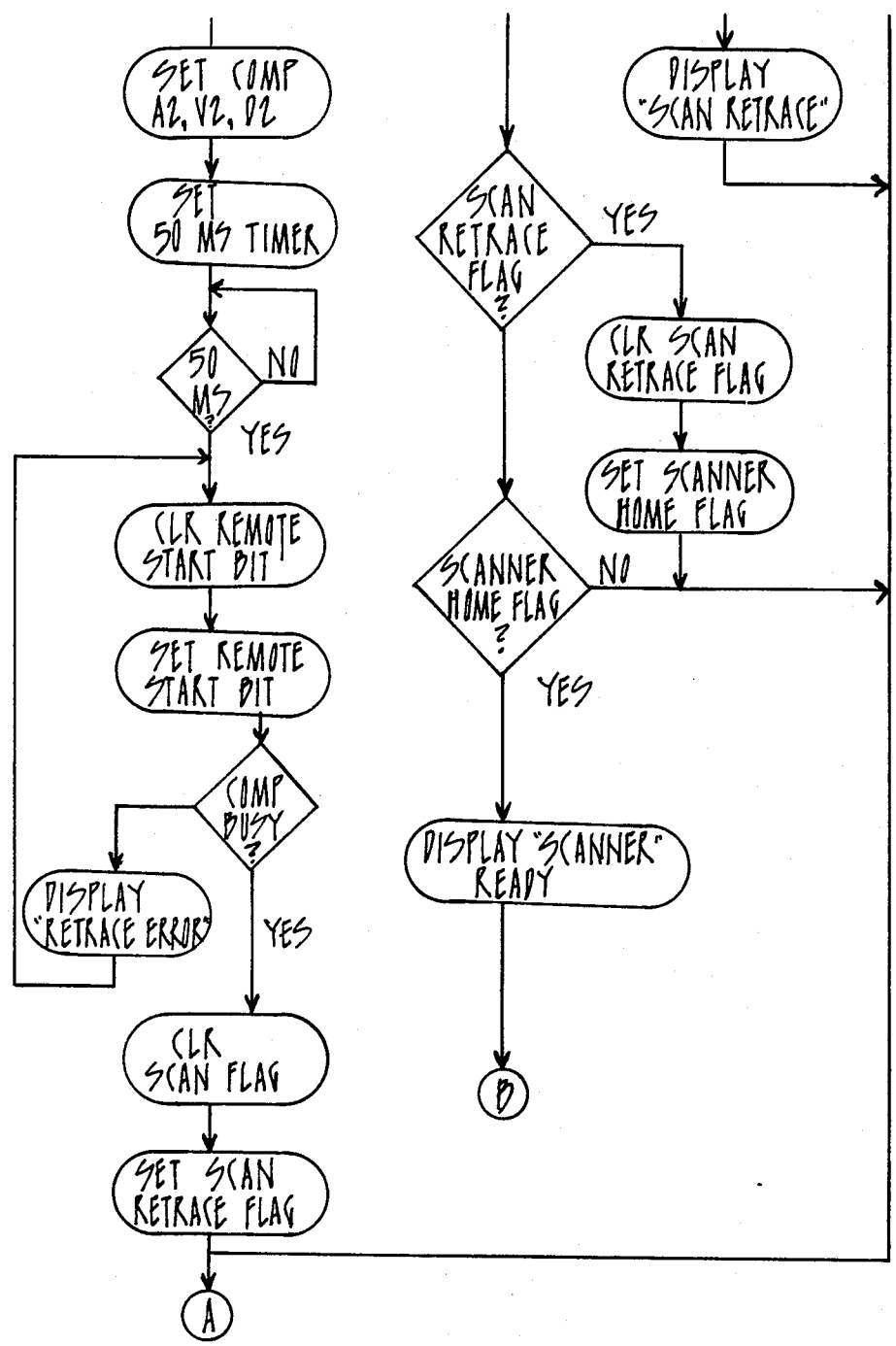
FIGS. 26(A,B,C) is a flowchart setting forth the microprocessor-controlled steps in scanning according to the invention.
Figure 26S:
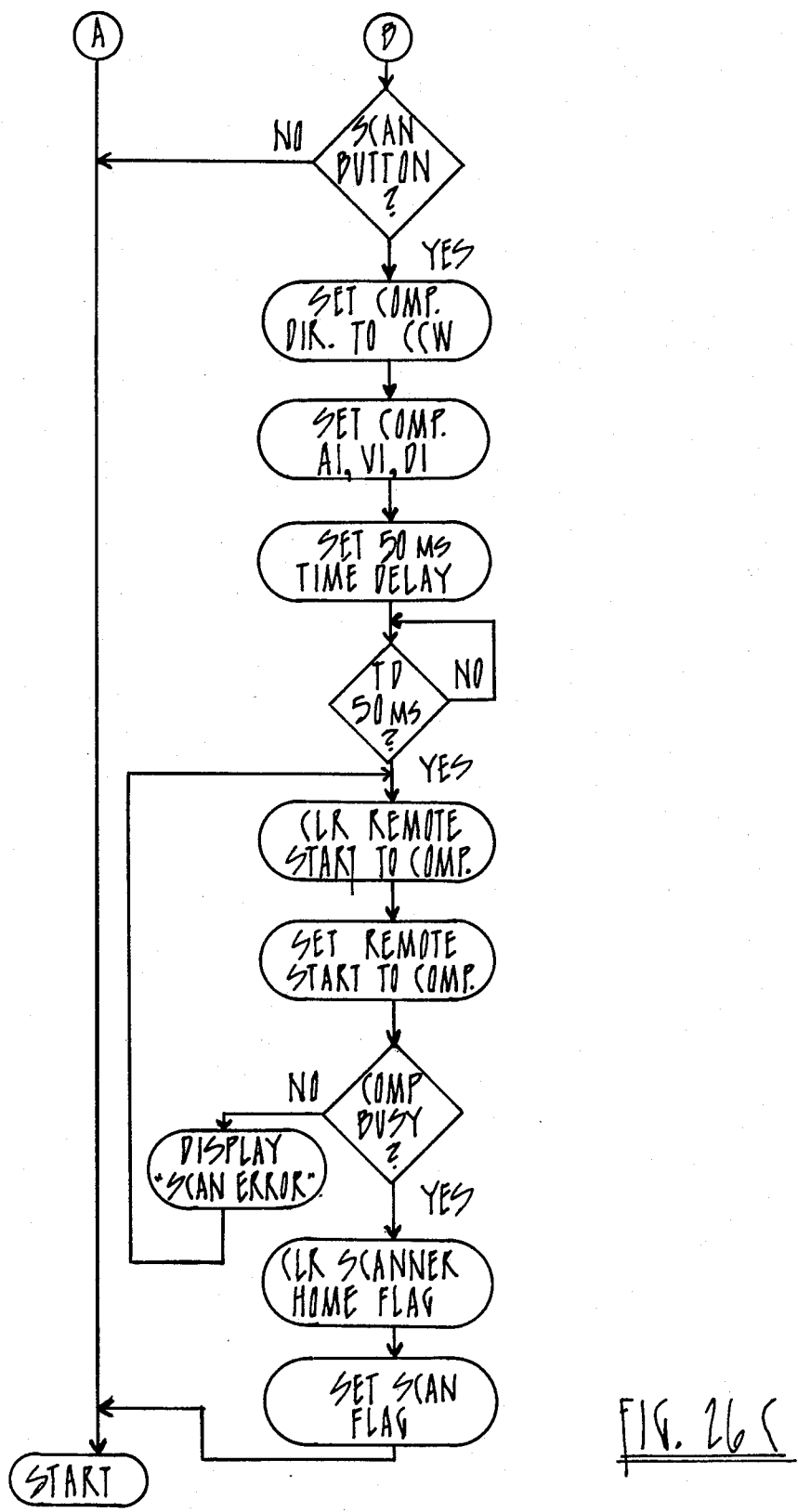

Still referring to FIG. 24, actuating the SCAN button (436) initiates a translational scan of the shaft (102) (of FIG. 23) when specified internal machine conditions are satisfied. Scanning, in response to the actuation of the SCAN button (436), is effected by action of the central microprocessor (408) as outlined in the flowchart of FIG. 26.

Referring to FIG. 25, after initializing the various flags related to scanning, the central microprocessor (408) determines if the stepping motor (136) is running. If the motor (136) is running, the direction of scanning is determined by noting if the "scan" or retrace flag is present. If the motor is not running, a flag indicating that scanning has been ordered is checked. If the scan flag is present, this indicates that a scan has been completed. The parameters of the stepping motor (136) (such as distance d, velocity v, acceleration a, and direction of travel) are entered for retracing after which a start command to the motor 136 is provided to start a scan retrace cycle. The stepping motor (136) is again checked. If the stepping motor (136) is running the scan flag is reset and a retrace flag is set. If not running, an error signal is displayed. If, after determining that the stepping motor (136) was initially running and no scan flag was noted, the scan retrace flag is checked. If in retrace, the scanner is at a home (or start) position, a flag is set. If not retracing, it is determined if the scanner is at the home position, in which case forward scanning is performed if the SCAN button (436) has been actuated. Prior to forward scanning, the parameters are noted. During forward scanning, the stepping motor (136) should be "busy" or running, otherwise an error signal is displayed. During forward scanning the scan flag is set and the home flag is cleared. The SCAN RESET button (438) aborts a scan cycle, causing the shaft (474) to cease translation and return to a reference position dictated by the machine format. The SCAN RESET button (438) performs the halting function only after actuation of the SCAN button (436). The SCAN button (436) and SCAN RESET button (438) thus provide commands which effect the linear control (522) (of FIG. 23). A sample software listing for controlling the scanning effected by the microprocessor-control of the stepper motor (136) is provided in Appendix I.

The FUNCTION button (440) permits the operator to select one of a plurality of operating modes in several categories. Function #1, for example, allows selection of a machine mode wherein either a reader alone, a writer alone, or both a reader and writer are provided in the machine. After the operator presses the FUNCTION button (44) and then the key (601), the central microprocessor (408) inquires, via the display (412), which of the three modes is desired. By pressing 01 for reader alone, 02 for writer alone, or 03 for both, the operator informs the microprocessor (408) of the mode. Function #2 permits the operator to select either automatic or manual scan. Function #3 permits the operator to inform the system of the form of communication being employed e.g. NRZ, T2, or bi-phase. Similarly, function #4 permits the operator to effect a datum, or reference position, find. Specifically, the scanner is returned to a predefined datum position and is repositioned with reference to the datum position. For example, if it is desired that the shaft (102) be twenty stepper motor steps from the dataum (136), the datum find function will cause the shaft (102) to return to the datum position and to then be translated twenty steps. Other functions may also be provided.

The FORMAT button (442) permits the operator to select one of a plurality of paste-up (478) or plate (or paper) (516) sizes and locations on the transport (150). This is achieved by coupling the FORMAT button (442) to the central microprocessor (408) which provides signals that effect "shrink" in the vertical direction and "squeeze" in the horizontal direction and produce desired positioning. That is, in addition to defining the size of the write-up on the plate (516), the location of the plate (516) on the transport (150) can be defined. In addition, the number of images scanned by a reading device or writing device during a single scan is a selected variable.

In this regard, it is known that the vertical dimension of an image is shrunk when the clocking rate from a load clock board (672) (see FIG. 22) to the memories on a memory board (670) (of element [500] of FIG. 23) into which the video signal is entered, is increased as the data is shifted out of each memory of effectuate writing. That is, with a constant rotary speed for the shaft (102) under the control of the rotary control element (142), an increased data output rate compresses the written image in the vertical direction. In addition, it is known that a slow translation will cause successive top-to-bottom lines to be compressed, or "squeezed", in the horizontal direction. Finally, by varying the time when the video data-storing memories on memory board (670) of element (500) are signalled to shift out the stored data, various positions of an image on a transport can be defined. By selecting one of the formats by pressing the FORMAT button (442) and pressing appropriate keys which identify the desired format (for example, 15 for format fifteen), the central microprocessor (408) provides control signals to the load clock board (672), to memory control and memory BDs, (670), shaft timing and control (673) and to the linear control (522) which effectuate the desired format. The linear control (522)—identified as the stepper motor board in FIG. 22—controls the input to the motor (136).

The scan rate of the shaft (102) is changed by the SCAN RATE button (444). When the lock (430) is switched to an unlock position, the operator can enter a new scan rate after button (444) has been pressed, the new rate being applied to the linear control element (522).

IMAGE button (446) allows the programmer to select a positive or negative image and to select how the image is received, e.g., direct image or mirror image. In addition, the IMAGE button is used in generating more than one written copy of an image previously read. Specifically, data entered in memory during the reading is read out repetitively, once for each copy to be written. Thus, in a single scan, multiple copies are written by the scanning device.

Pressing the HALFTONE button (448) enters a signal to the central microprocessor (408) which relates to shading. In response thereto, the central microprocessor (408) provides a signal to a halftone board (678) which causes a change in the length of "black" video pulses exitting the video processor and sync separator (490). As is known, the "black" pulses are AND-gated or OR-gated with pulses formed by delaying the "black" pulses a short, specified time. The coincident pulses derived thereby represent halftones, the period of black being slightly reduced or increased. After pressing the HALFTONE button (448) a setting is entered which, by determining the delay between the two ANDed pulses, defines the measure of halftoning.

The MULTI-SCAN button (450) permits the operator to determine how many times the machine scans before transport unloading.

The TEST button (452) permits the operator to run various diagnostic tests. For example the TEST button (452) can be followed by several codes—such as 01 which effectuates a checkerboard output, 02 which enters an outline of the selected current format, 03 which provides a tone test to determine if an alarm tone generator is functioning, 04 which allows the operator to manually translate the shaft (102), and 05 which is directed to manual transport loading.

By pressing the STATUS button (454) after pressing any of the previously discussed buttons (440–452) results in a read-out on the display (412)—generated by the central microprocessor (408)—that indicates the current state of the related feature. For example, pressing the STATUS button (454) results in the current scan rate being displayed upon the pressing of ENTER (616).

ENTER key (616) is pressed to complete and effect a transmission to the central microprocessor (424).

Keys (610) and (612) have two major functions. First, the keys (601–609) can have a positive or negative sense. And, second, the shaft (102) can be manually moved to the right in the positive direction or the left in the negative direction after a TEST button (436) and a particular key is actuated to achieve manual step-wise scanning.

CLEAR key (614) erases the most recent information keyed but not entered.

Communication between the central microprocessor (424) and the operator is shown in the accompanying communication listing below. The listing identifies the operator inputs with underlining. The central microprocessor (424) instructions and confirmations to the operator are provided in quotation marks (").

1. Machine turned on. Hardware starts-up, shaft goes to datum and holds position.
2. "Ready to Program" ENTER
3. "Reader 01, Writer 02, R/W 03?"
4. 03 ENTER
5. "Machine function, R/W" ENTER 6. "Mode of operation, onto scan=01, Manual=02"
7. 02 ENTER
8. "Manual Scan Mode" ENTER
9. "Enter Scan Rate 800, 1000, 1200?"
10. 1200 ENTER
11. "Scan Rate 1200 L/in." ENTER
12. "Receptor Image (+), (−)?"
13. +ENTER
14. "Receptor Image, Positive" ENTER
15. "Receptor Image, Right Read 01, Wrong Read 02?"
16. 02 ENTER
17. "Receptor Image, Wrong Reading" ENTER
18. "Halftone setting ±(0 through 7)?"
19. +2 ENTER
20. "Halftone setting=+2" ENTER
21. "Format inches 01, Agate 02, mm 03?"
22. 01 ENTER
23. "Format in Inches" ENTER
24. "Reader vert. Offset?"
25. +.037 ENTER
26. "Reader vert. of offset, +.037 in." ENTER
27. "Reader horz. offset?"
28. −0.205 ENTER
29. "Reader horz. offset, −0.205" ENTER
30. "Writer vert. offset?"
31. +0.525 ENTER
32. "Writer vert. offset, +0.525 in." ENTER
33. "Format #1 Title?"
34. 305 ENTER
35. "Format #1, 305" ENTER
36. "Paste-up #1, vert. size?"
37. 21.786 ENTER
38. "Paste-up #1, vert. size 21.786 in." ENTER
39. "Paste-up #1 horz. size?"
40. 16.125 ENTER
41. "Paste-up #1, horz. size 16.125 in." ENTER
42. "Paste-up #1, right side scan offset?"
43. +.250 ENTER
44. "Paste-up #1, right side scan offset; +.250 in. " ENTER
45. "Paste-up #1, left side scan offset?"
46. −.050 ENTER
47. "Paste-up #1, left side scan offset; −.050 in." ENTER
48. "Additional format required? Yes=01, No=02" ENTER
49. 01 Enter
50. "Format 190 2, Title?"
51. 337 ENTER
52. "Format #2, 337" ENTER
53. "Paste-up #2, vert. size?"
54. 24.062 ENTER
55. "Paste-up #2, vert. size, 24.062 in." ENTER
56. "Paste-up #2, horz. size?"
57. 17.250 ENTER
58. "Paste-up #2 horz. size, 17.250 in." ENTER
59. "Paste-up #2, right side scan offset?"
60. +.100 ENTER
61. "Paste-up #2, left side scan offset, −.150 in." ENTER
62. "Paste-up #2, left side scan offset?"
63. −0.150 ENTER
64. "Paste-up #2, left side scan offset, −.150 in." ENTER
65. "Additional format required? yes=01, no=02?"
66. 02 ENTER
67. "Output image #1 vert size?"
68. 21.050 ENTER
69. "Image #1 vert size, 21.050 in.38 ENTER
70. "Image #1 vert. offset?"
71. −3.525 ENTER
72. "Image #1 vert. offset, −3.525 in" ENTER
73. "Output image #2 vert size?"
74. 23.000 ENTER
75. "Output image #2 vert. size, 23.000 in." ENTER
76. "Image #2 vert offset?"
77. 0 ENTER
78. "Image #2 vert. offset, 0.0 in." ENTER
79. "Formatting complete, enter Format #"
80. 1 ENTER (Scanner goes to format #1 dwell position)
81. "Machine set to format #1"
82. "Load Transport"

It is noted that the sequence listing relates to a reader/writer combination. The communication may, of course, be readily adapted to a reader alone (or writer alone) by simply retaining the interchanges related solely to the reader (or writer) and deleting the interchanges relating to writing (or reading). For example, the reader alone would include an interchange for halftone, whereas a writer alone would not. Conversely, the writer alone would provide an interchange relating to image, whereas the reader alone would not.

Referring now to subsystem (404) of FIG. 22, the loading and unloading of a transport (150) between the table bed (191) and drum (243) is initiated by actuation of the LOAD button (432) or UNLOAD button (434), respectively, on the control panel (410) of FIG. 24. The loading and the unloading operations include specific, predetermined sequences of operations based on sensor inputs, solenoid and valve actions, motor operation, and responses thereto generated by the subsidiary microprocessor (424).

The sensors, solenoids, valves, and motors are shown in FIG. 27, which represents a simplified side view of the table bed (191) and drum (243). To facilitate identification, sensors are enclosed by triangles, motors are enclosed by circles, and solenoids and valves are enclosed by boxes. The sensors, unless otherwise specified, may be conventional proximity, contact, magnetic or other such sensors.

Sensor (701) senses whenever a transport (150) is properly positioned on the bed (191) of the table. Sensor (702) senses when the table bed (191) is properly elevated to its upper position. Specifically, sensor (702) detects if cylinders (200) are extended by action of a corresponding solenoid input. Sensor (704) detects when the door (239) is open sufficiently to permit the loading or unloading of a transport (150). Sensor (704) detects, in effect, the state of the cylinder (705) which controls the door (239). As stated above, the transport (150) is advanced by the bar (192) in response to pressure being applied to the cylinder (210). Sensor (257) detects when the leading edge of the transport (150) passes a point A located on the inner surface of the drum (243). Similarly, sensor (2511) detects when the leading edge (151) of the transport (150) reaches point B located on the inner surface of the drum (243). Sensor (713) detects if a transport is currently loaded on the drum (243). Sensor (714) detects if registration pins (261) are properly located through corresponding hole (262) in a loaded transport (150). Air cylinder (260), as previously discussed, extends the pin (261) through the hole (157) into hole (262) when air pressure is applied thereto. Sensor (715) determines when the squeege (274) has reached the end of its travel. Sensor (716)

detects when the overlay of the carrier is lifted. Sensor (717) detects when the squeege roller (274) is at its start position. Sensor (718) detects when a transport (150) has exitted the pinch rollers (710) and has been deposited onto the upper track where of the table bed (191) with the table bed (191) in its lower position. Air cylinder (213) [and (214)], as discussed with respect to FIG. 1, selectively effects tilting of the brackets (195) [and (197)], permitting a transport (150) on the brackets (196) and (197) to drop onto the bed (191) of the table. Sensor (720) detects the presence of an adequate vacuum at valve (722) to hold a transport (150) against the inner surface of the drum (243).

In addition, three conventional motors (205), (2520) and (734)—which can operate in a forward or reverse direction—are employed in the loading and unloading sequences. Motor (205) effectuates rotation of the pinch rollers (201-204) in either direction to enter or withdraw a transport (150) from the drum (243). Motor (2520), as shown in FIG. 17, rotates (a) the disc (251) and (b) the air cylinder (260) and pin (261) thereon clockwise or counterclockwise for loading and unloading, respectively. Motor (734) moves the squeegee roller (274) through its arcuate path.

In operation, the LOAD button (432) of FIG. 23 is pressed and a load sequence begins. Assuming there is a transport (150) on the upper brackets (195, 197) and on the bed (191) of the table, the subsidiary microprocessor (424) examines the input from sensor (713) to assure that a third transport is not currently held against the drum. Thereafter, the subsidiary microprocessor (424) determines, based on input from sensor (701), whether a transport (150) on the bed (191) of the table. With a transport (150) on the bed (191), air pressure is applied to cylinders (200) in order to elevate the table, thereby readying the transport (150) for loading. The microprocessor (424) checks sensor (702) to assure that the table is at the proper elevated level. Air cylinder (210) then advances the transport (150) toward the pinch rollers (710) by pushing bar (192) forward. Air cylinder (705) is energized to open the entrance door (239) to the drum (243). The microprocessor (424) is signalled by the sensor (704) when the door (239) is opened. Motor (205) is energized in a forward direction. The transport (150) is pushed between the pinch rollers (710) and directed toward the drum (243). The transport (150) at this time is engaged by the pinch rollers (710). As previously noted, a magnet (176) is imbedded in the leading edge of the transport (150). When the magnet (176) reaches point A, the sensor (257), which detects the magnet (176), signals the microprocessor (424); causing the microprocessor (424) to cause head (259) to clamp the transport (150) to the disc (251). This is a modified form that may replace at least a part of circuit (2571) of FIG. 17. The disc drive motor (2520) is then turned on in the forward direction by a signal from the microprocessor (424), effecting clockwise rotation of the disc (251) and the transport (150) which is clamped thereto. When the magnet (176) reaches point B, sensor (712) so indicates and the motor (205) and motor (732) are shut off. Cylinder (260) then extends registration pin (261) through the transport (150) and into slot (262) in the drum (243). The microprocessor (424) is informed of the registration by sensor (714). The microprocessor (424) signals a cylinder (275) to force the squeegee (274) against the top of the transport (150). The squeegee drive motor (734) is energized in the forward direction, causing the squeegee (274) to press against successively lower portions of the drum (243). The cam (271) (see FIG. 18) rotates in the forward direction (counterclockwise in FIG. 27) to turn on the vacuum solenoid (267), (268), (276) and (279) in the predefined manner. Preferably valves (267) and (268) are initially energized, with valves (276) and (279) being energized as the cam (271) passes them during its rotation. The microprocessor (424) actuates cylinder (213) which effectuates the dropping of a second transport (150) from the brackets (195, 197) onto the table bed (191) immediately after the transport (150) is sensed as registered by sensor (712). The placement of the transport (150) onto the bed (191) is sensed by the sensor (701) and cylinder (213) is deactivated. The microprocessor (424) thereafter provides a deactivating signal to the cylinder (200), the table bed (191) thereby descending so that the upper track defined by the brackets (195, 197) becomes aligned with the ramp (240). The door (239) is then closed. The motor (734) continues until the squeegee (274) (shown with a dashed representation) is sensed by sensor (715) at point C on the drum (243). The microprocessor (424) is informed that the door (239) is closed and that the squeegee (274) is at the end of its travel. The transport (150) is now loaded and ready to be scanned.

In accordance with the invention, an unloading sequence can be initiated by pressing UNLOAD button (434) of FIG. 23 or can be initiated automatically by a command from the microprocessor (408). The microprocessor (424), prior to commencing an unload sequence, checks to make sure that a transport (150) is against the drum (243). Only after scanning is an automatic unload sequence performed. Sensor (716) is also checkes to assure that the overlay of the transport (150) on the bed (191) has not been lifted and sensor (702) is checked to assure that the table bed (191) is in its lower position with the upper track (725)—defined by brackets (195) and (197)—aligned with the preamp (249). Cylinder (258) is deactivated to retract the squeegee (274) and the squeegee driver motor (734) reverses to return the squeegee (274) to its initial retracted position at the top of its path. The solenoid valves (267), (268), (276) and (279) are closed. The registration pin (261) is retracted as pressure is removed from the cylinder (260). Sensor (712) detects the retraction of the pin (261). The motor (2520) starts in the reverse direction and the transport (150) is directed toward the pinch rollers (201-204), away from the drum (243). Cylinder (705) is pressurized to open the door (239), the opening being sensed by sensor (704). The motor (205) is turned on in the reverse direction as the transport (150) is pushed between the pinch rollers (201-204). When the leading edge of the transport (150) is detected at point A, the clamp on the disc disengages the transport (150) and motor (2520) shuts off. The sensor (717) is periodically checked to determine when the squeegee (274) returns to its top position, at which time motor (2520) is switched off. Motor (205) continues in the reverse direction for a short period during which the transport (150) is fed onto the brackets (195) and (197) of the upper track on the table. A sensor (704) detects when the disc is returned to a "home" position awaiting the entry of the next transport (150).

By elevating the table, another transport—which has been dropped onto the bed—is ready to be loaded. The scanned transport (150) on the upper track may have new materials placed therein and a loading and unloading cycle may then again be performed.

Figure 28A:
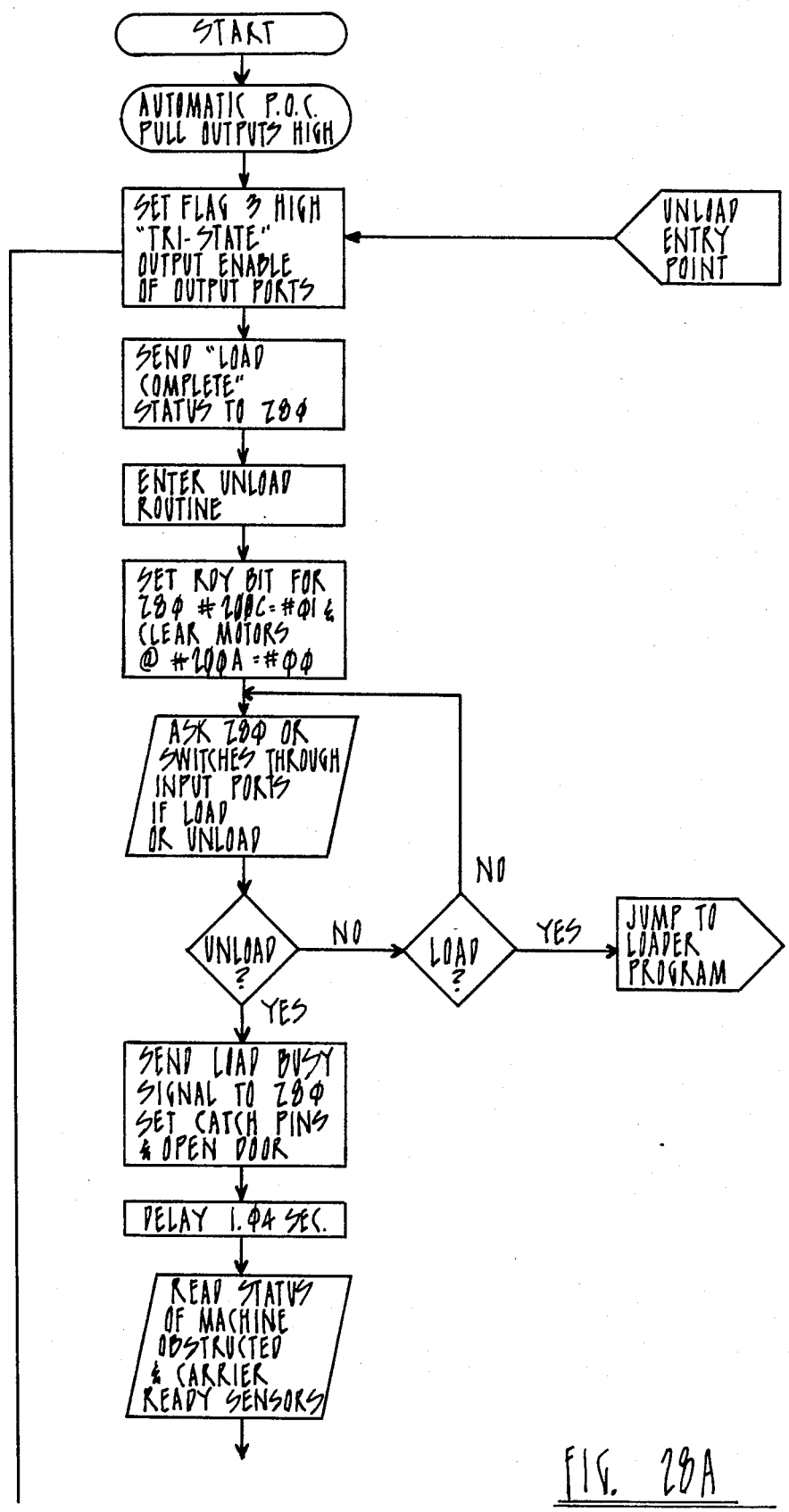
FIGS. 28A to 28O, taken together, constitute a flowchart setting forth the microprocessor-controlled operations of loading and unloading transports.
Figure 28D:
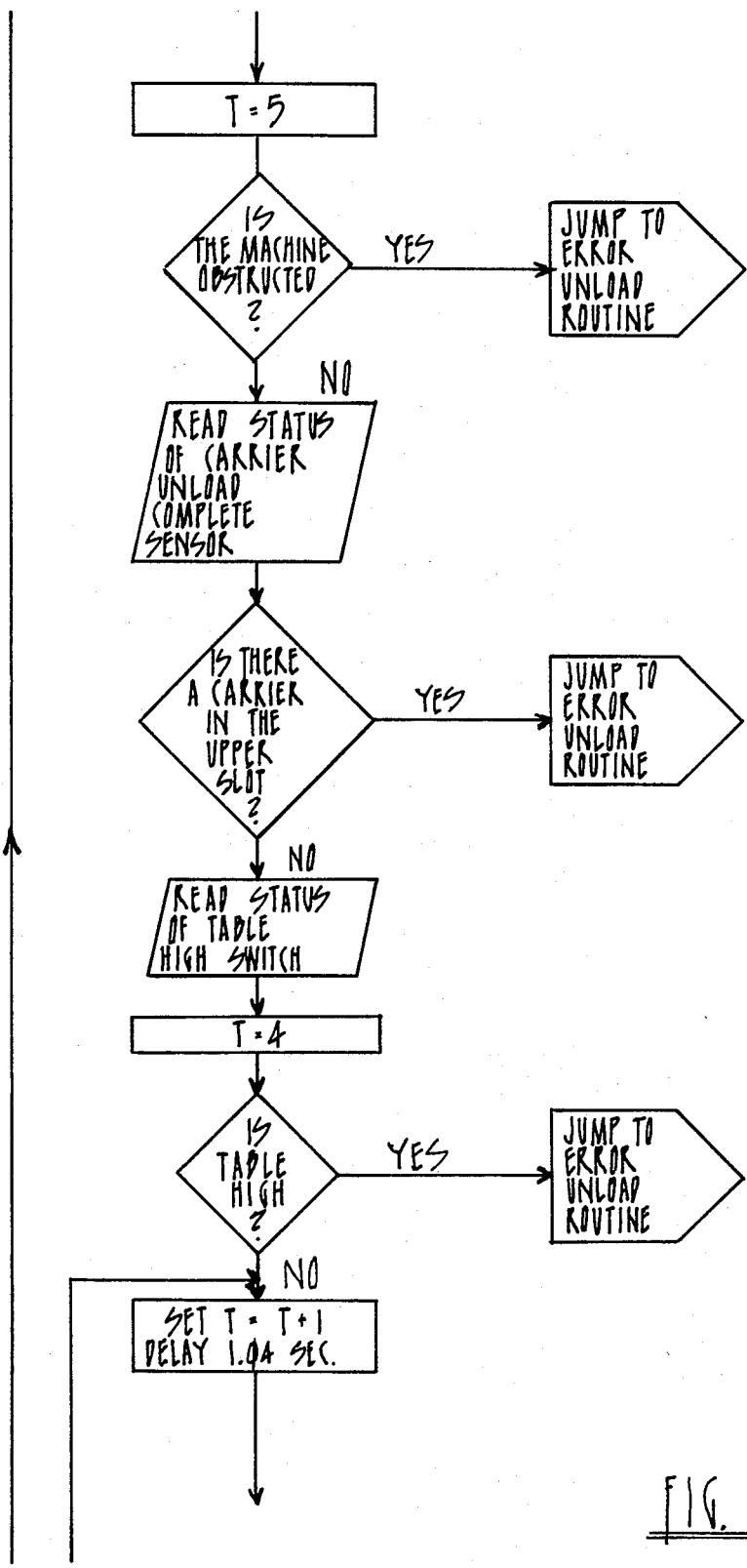
Figure 28C:
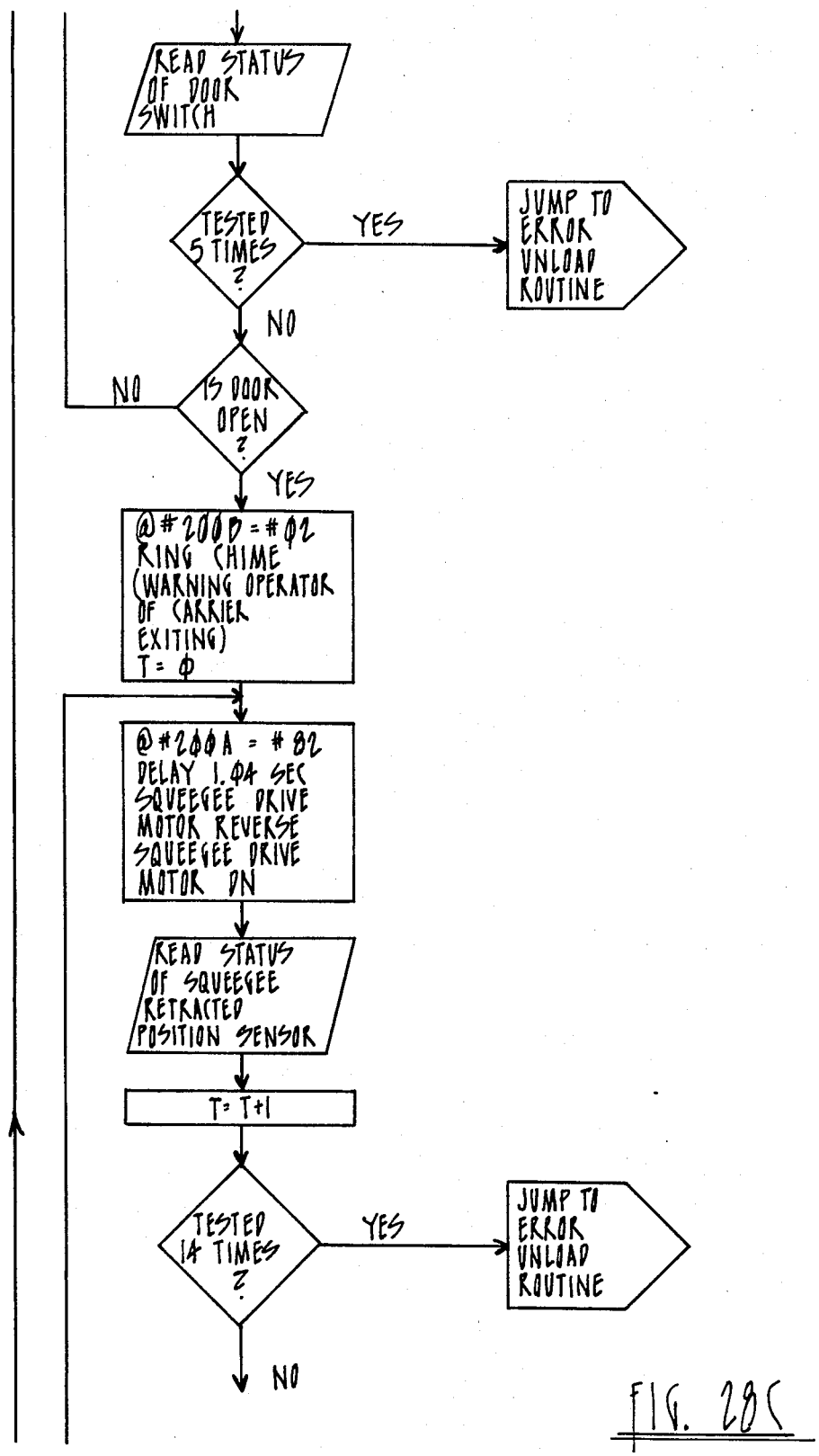
Figure 28P:
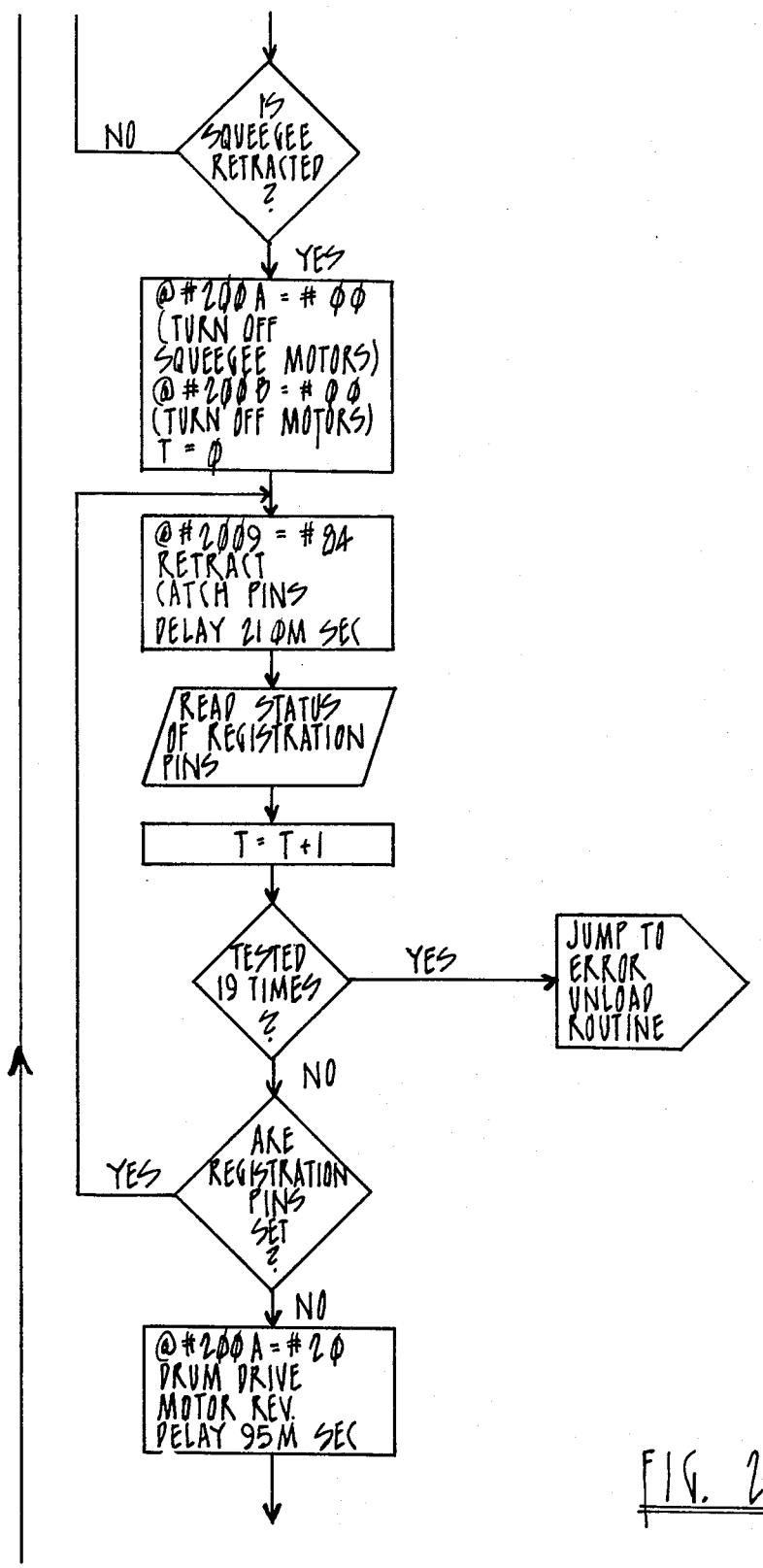
Figure 28E:
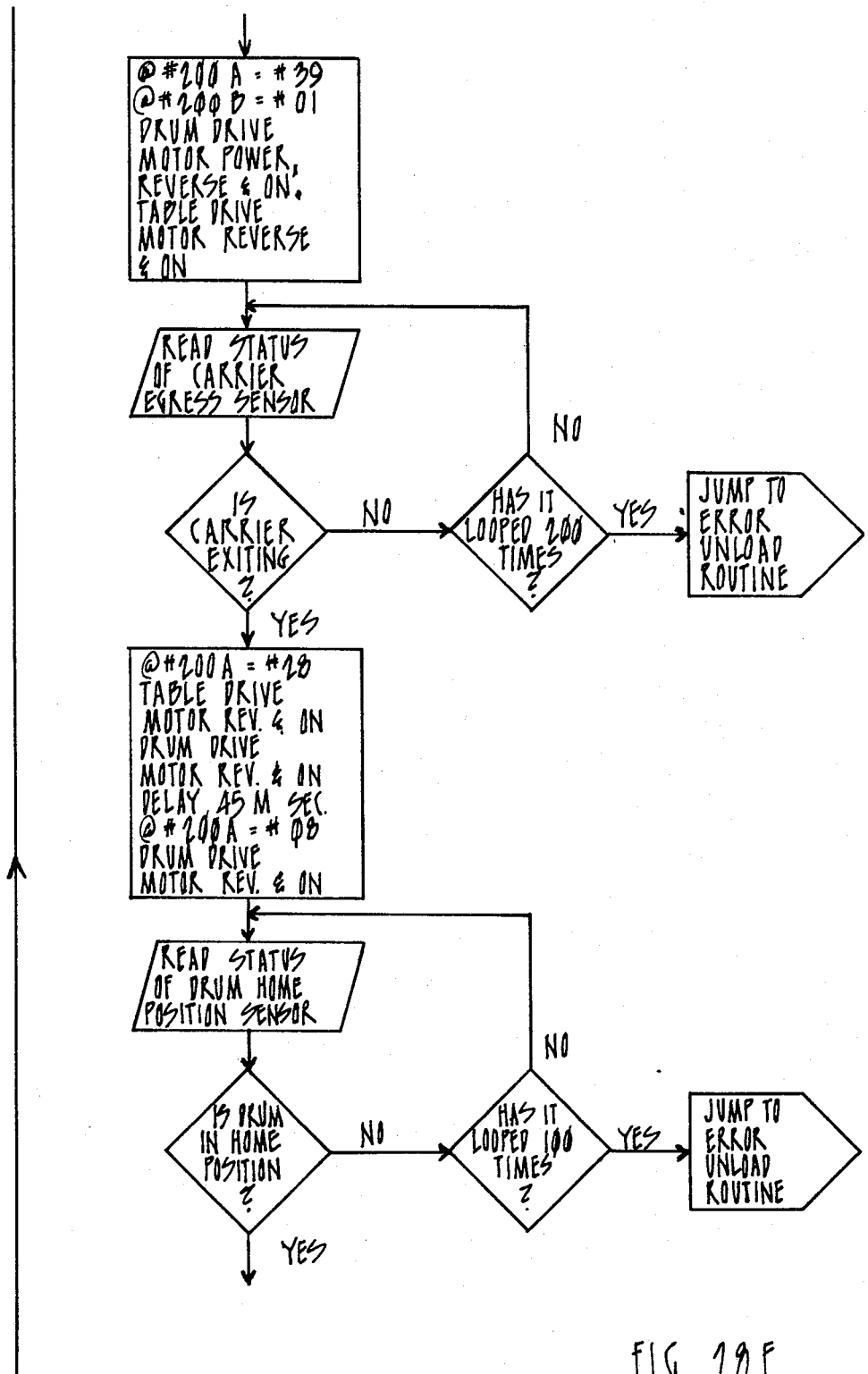
Figure 28F:
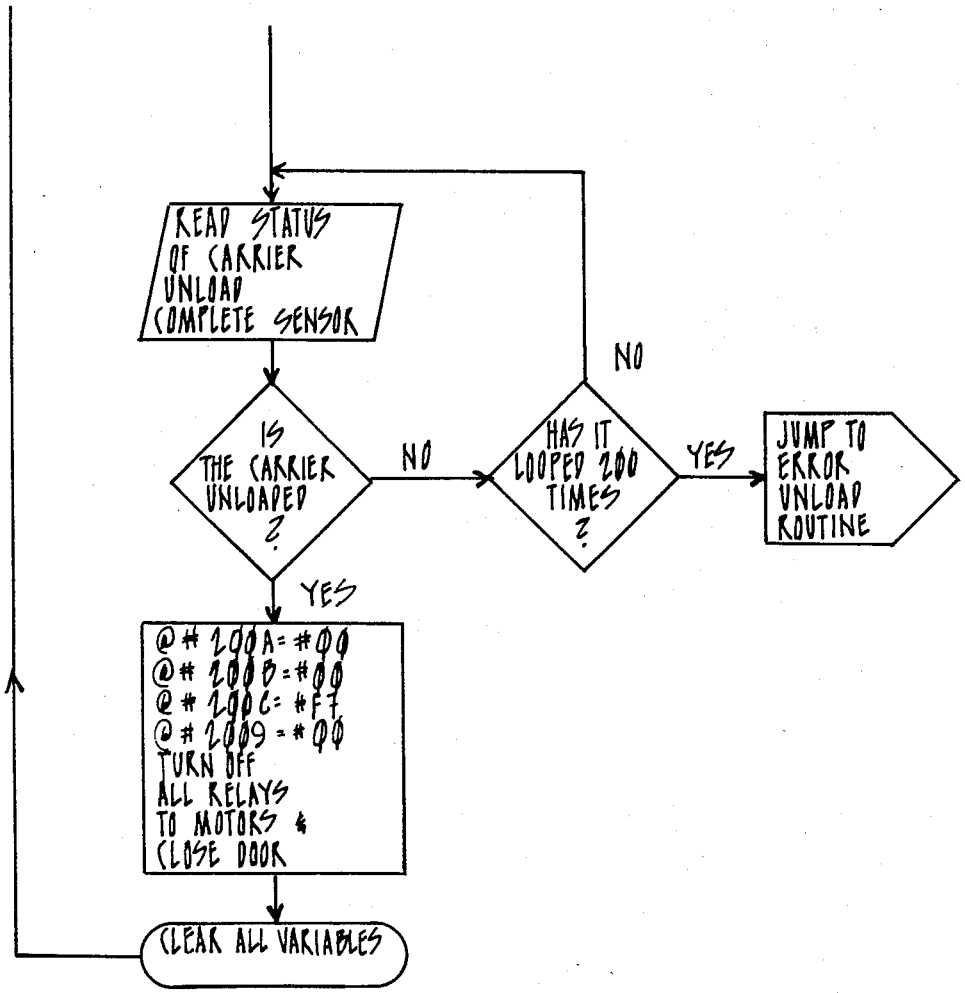
Figure 28G:
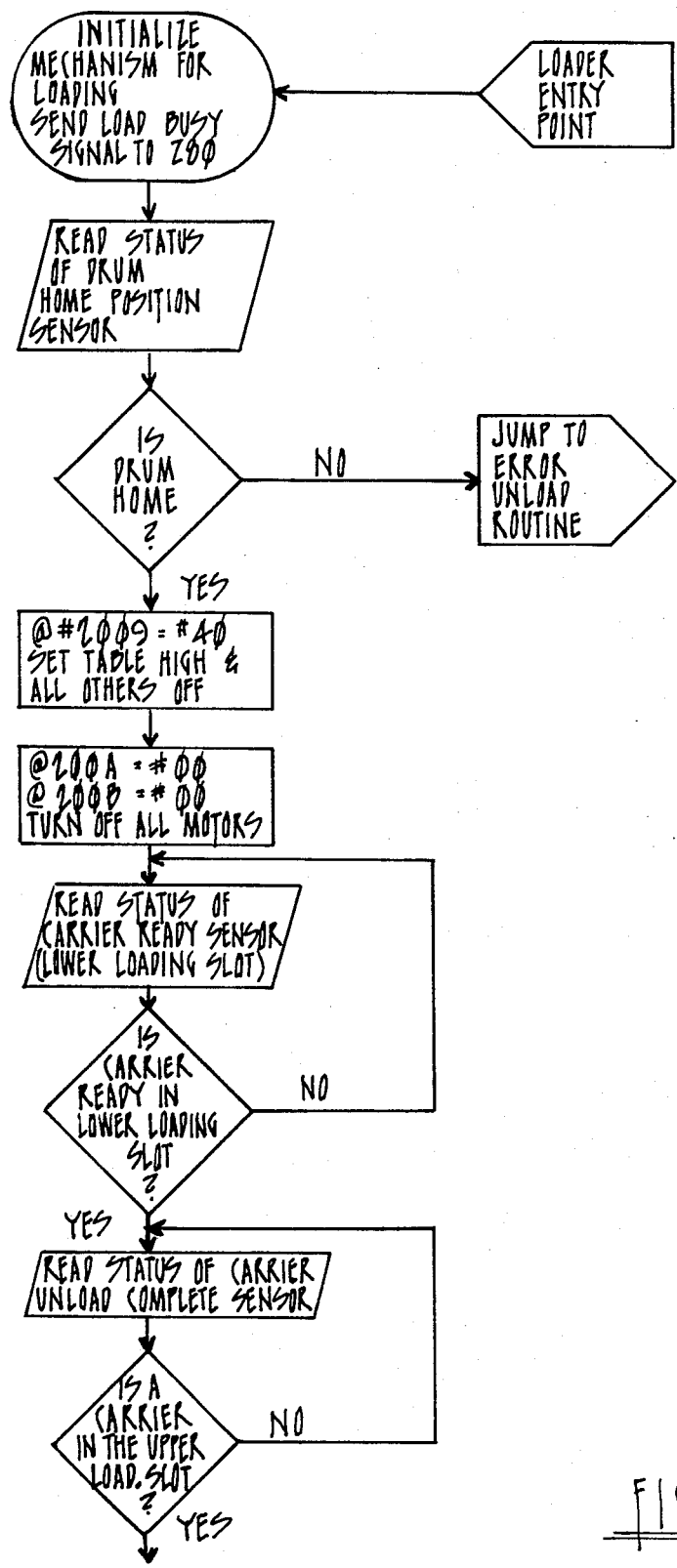
Figure 28H:
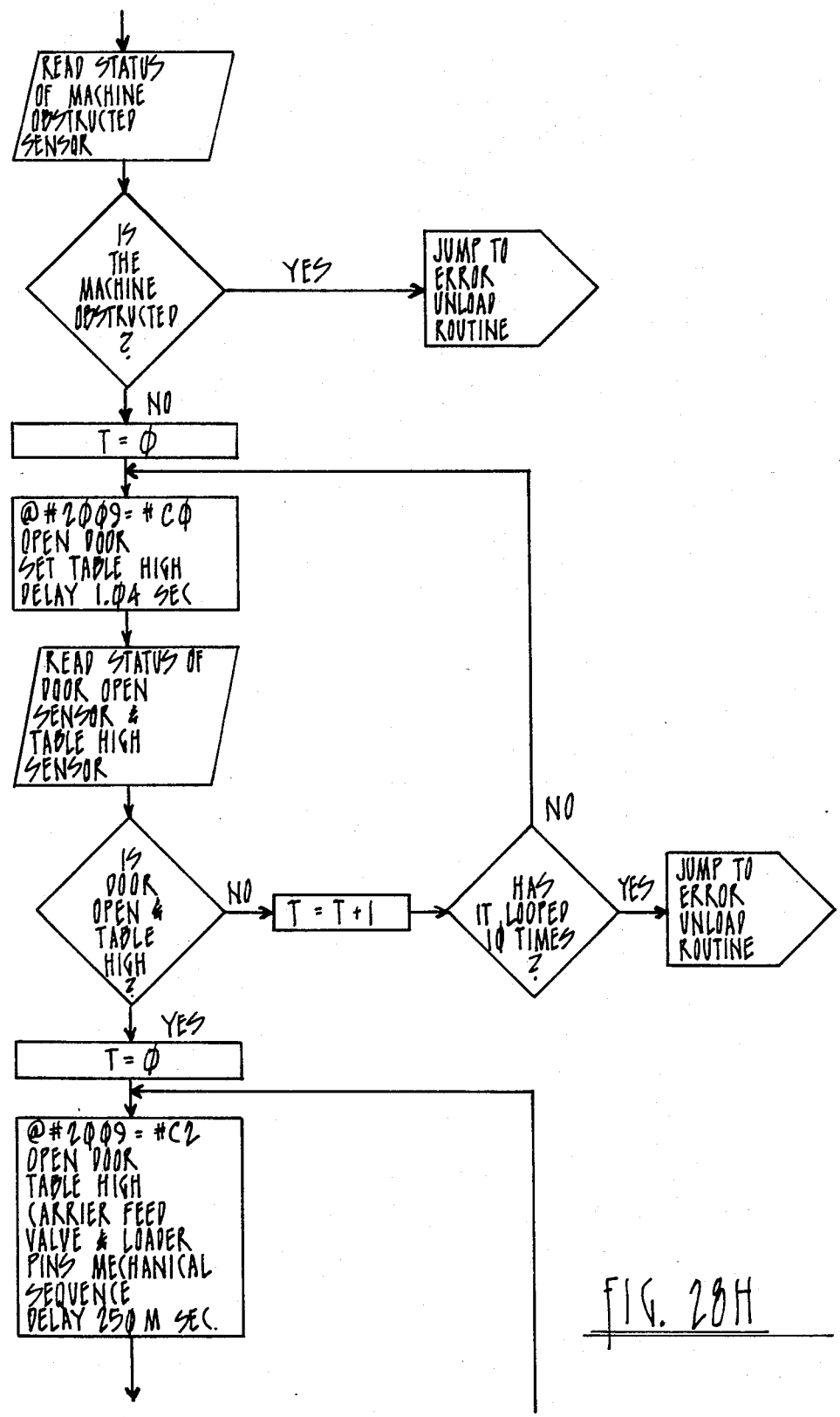
Figure 28I:
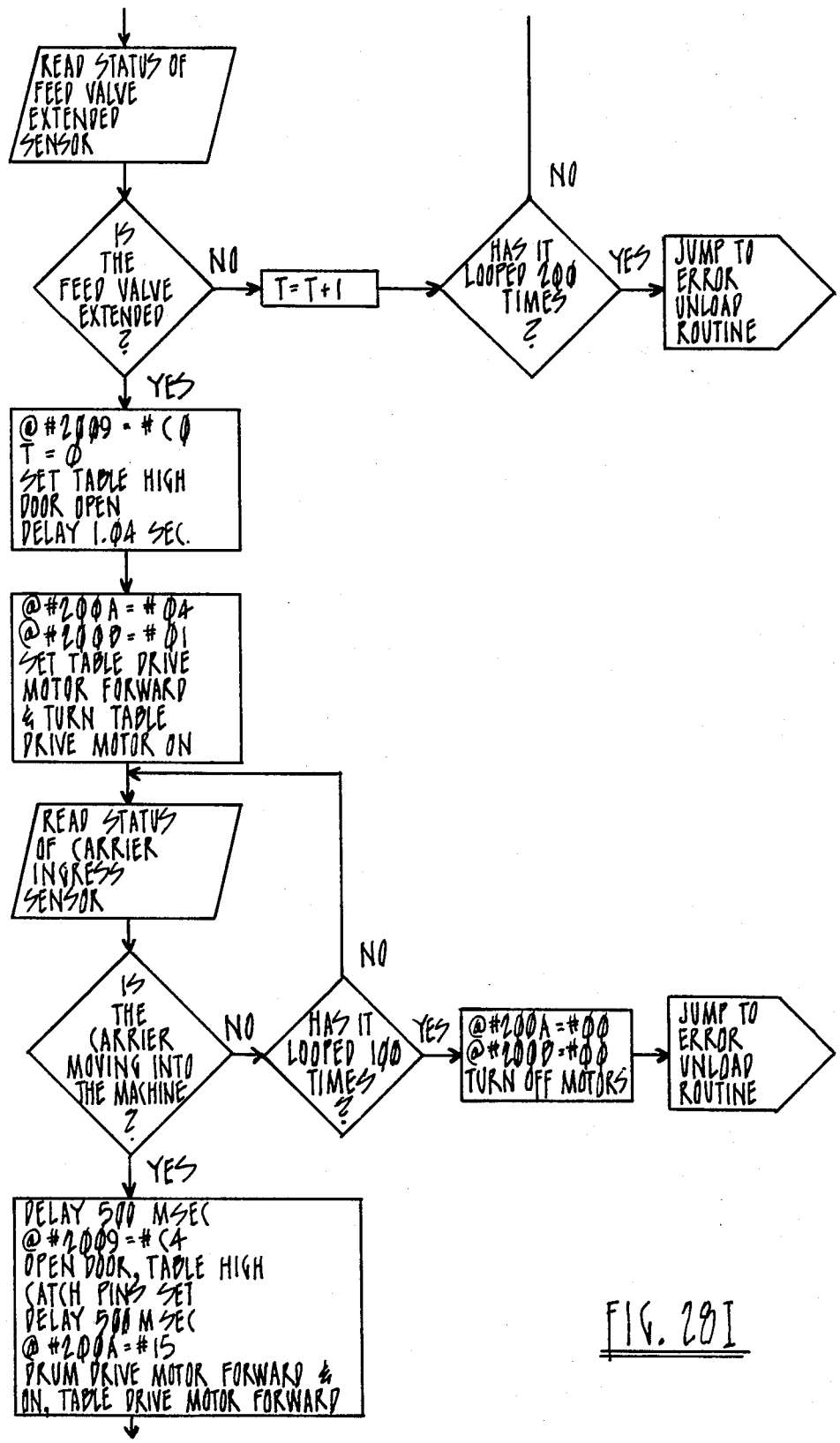
Figure 28J:
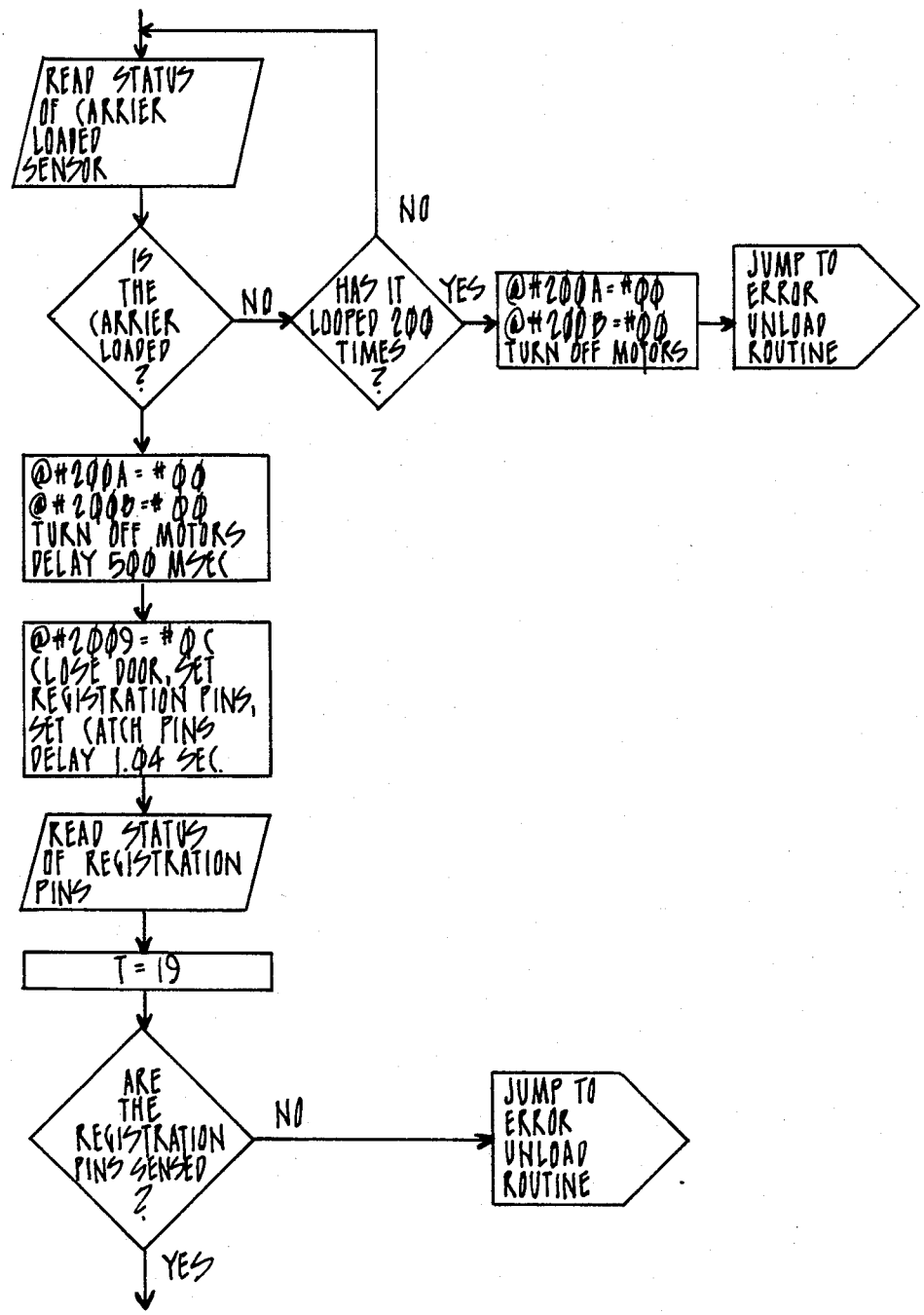
Figure 28K:
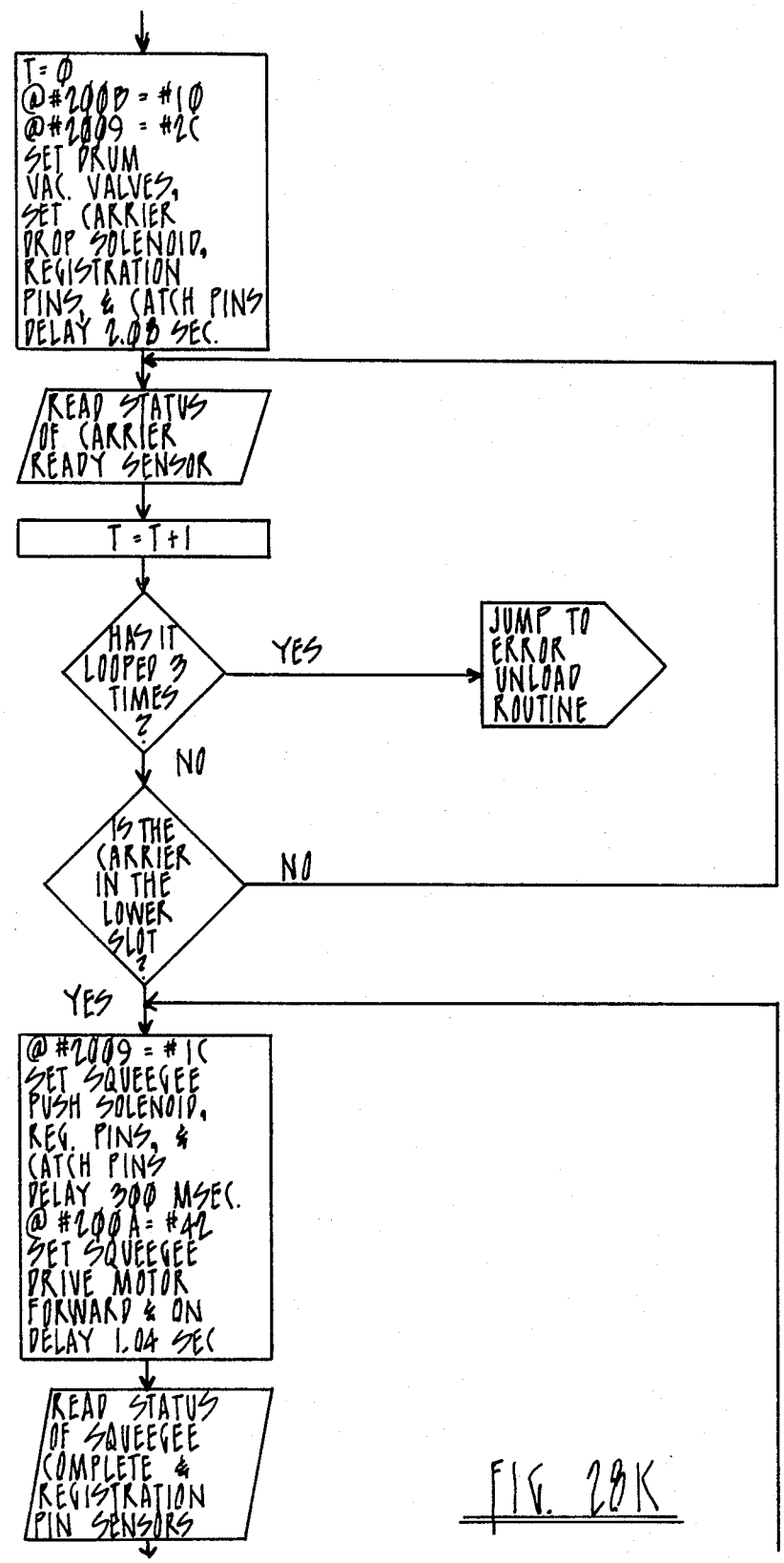
Figure 28L:
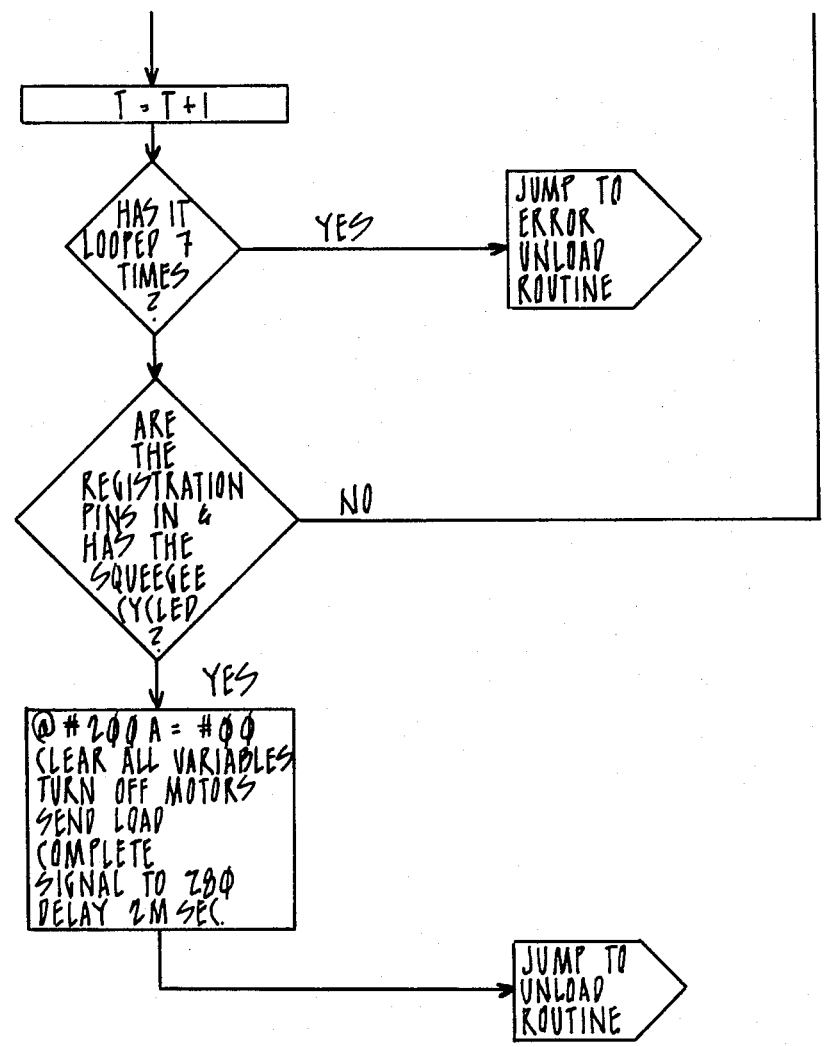
Figure 28M:
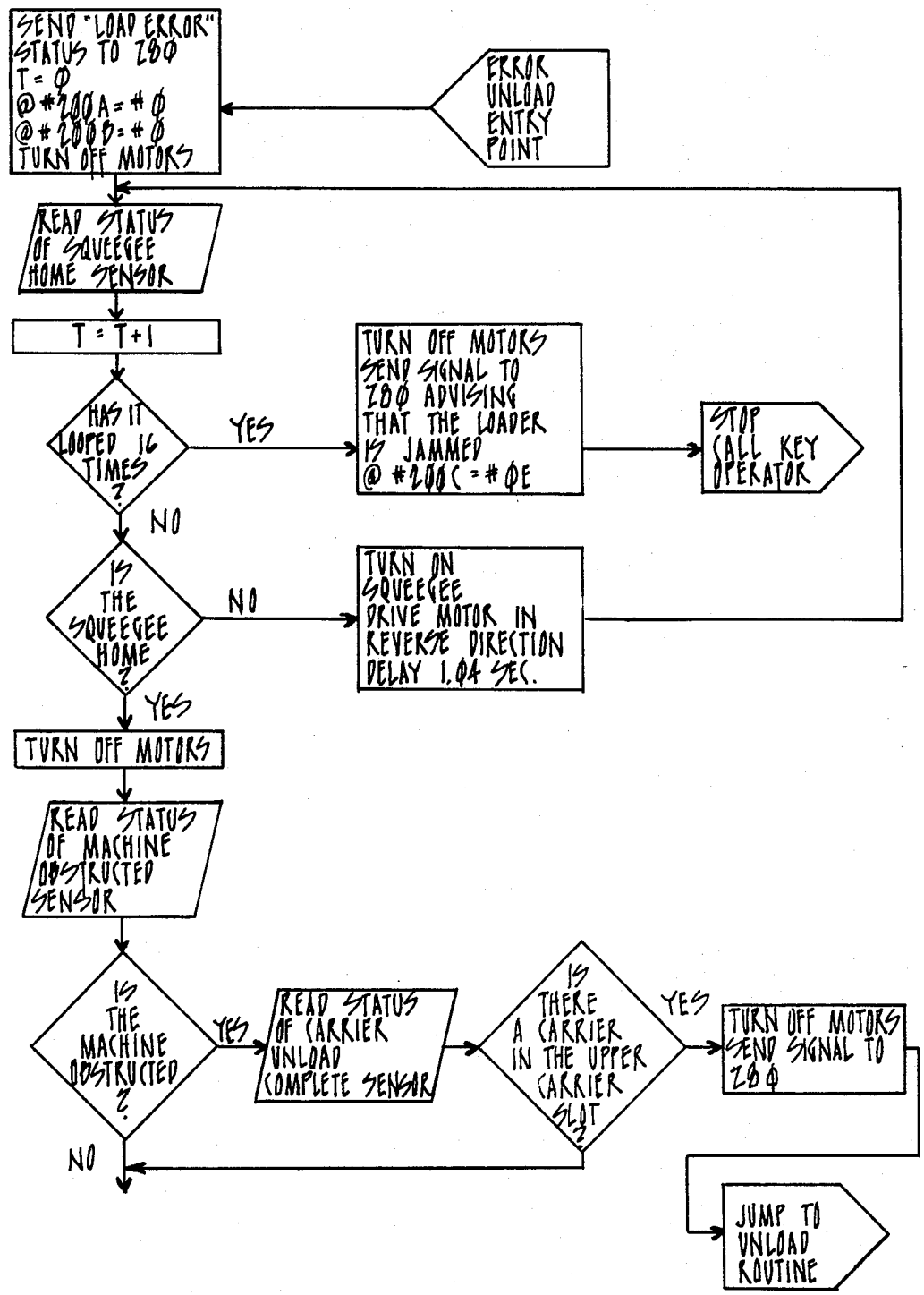
Figure 28N:
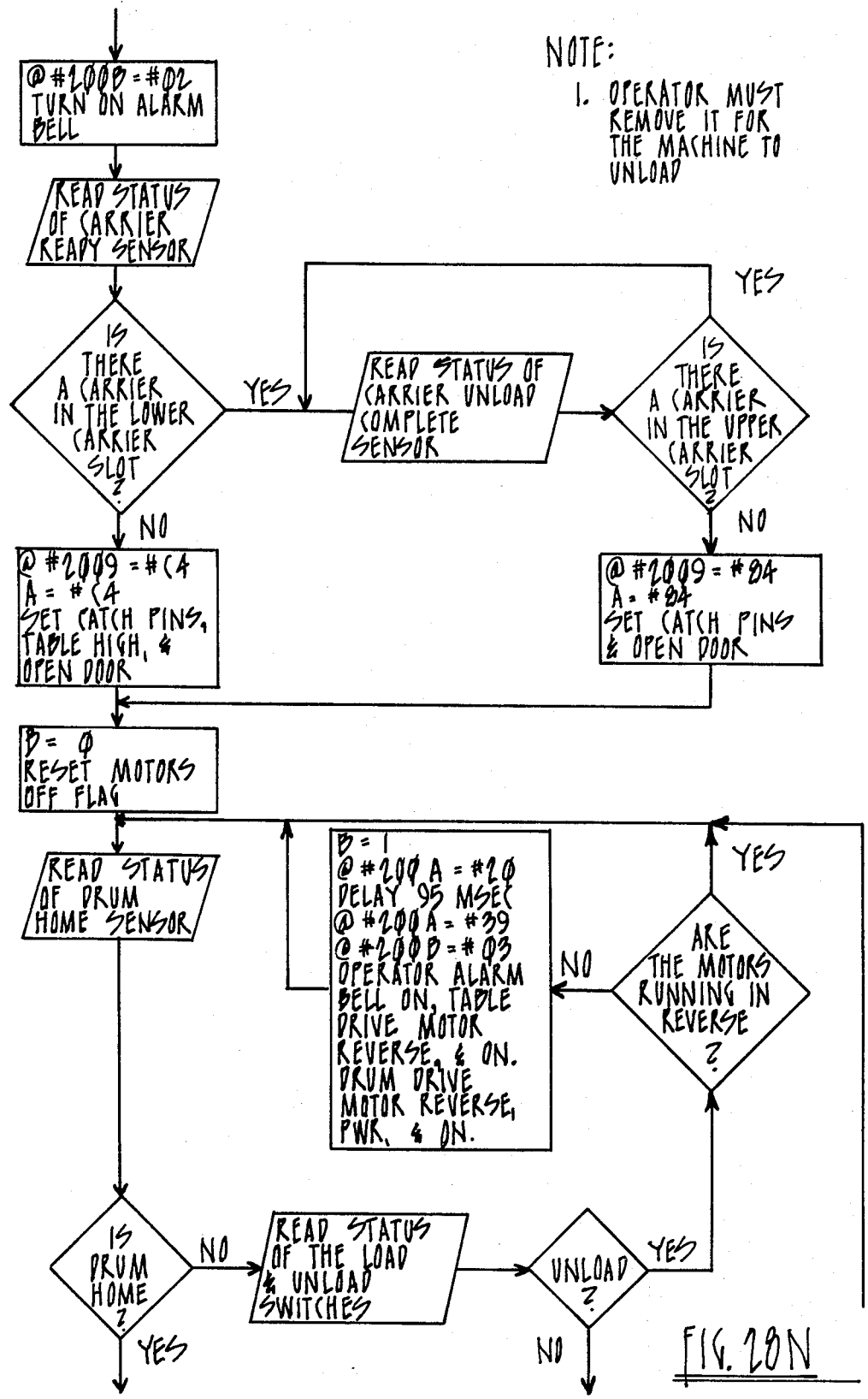

A flowchart which details the role of the subsidiary microprocessor (424) is shown as FIGS. 28A to 28O. Appropriate timing delays are included. In addition, an ERROR UNLOAD routine is provided which switches off all motors, informs the central microprocessor (408) of the problem, and effects a transport unloading sequence under specified conditions. A sample software listing for transport loading and unloading is also provided for an 8073 microprocessor (424), as APPENDIX II.

Referring once again to FIG. 22, it is noted that some of the elements operate similarly in prior scanning devices. For example, as previously noted, the memory control and memory boards (670); the load clock board (672) which provides (a) a basic clock for timing revolutions, (b) status words, and (c) input/output buffering; and a shaft timing and control board (673) which detects shaft timing function similarly to boards previously employed in LogEscan scanning devices. The shaft timing and control board and rotary control board (142) (673) differs from prior boards in that timing, as discussed above, is preferably detected by both optical and magnetic means. Other inputs to the microprocessor (424) include various YAG-related signals; datum detect status signals which are derived from a scanner position sensor and are used in finding a datum position as described with regard to the FUNCTION button (440); and an external "start scan" signal entered by pressing SCAN button (436).

Other improvements, modifications and embodiments will become apparent to one of ordinary skill in the art upon review of this disclosure. Such improvements, modifications and embodiments are considered to be within the scope of this invention as defined by the following claims. For example, the plate (516), as discussed previously, may comprise a metal counting—such as Aluminum—or a Lasermask with paper or paper alone provided that the receptor, in response to the application of light radiation, forms a detectable image thereon.

It is also noted that transports (150) are referred to as carriers set forth in FIGS. 28A to 28O.

APPENDIX I

```
Z80 ASSEMBLER VER.2.9                    1

1               LIST    M.R.3
2           ;
3                   NAME    SCAN
4           ;       TITLE   STEPPER MOTOR CONTROL

6           ;       LANGUAGE        Z80 ASM
7           ;       MACHINE         Z80A
8           ;
9           ;

11          ;       FOR:    LogEScan (3600)
12          . ;
13          ;
14          ;
15          ;               EXTERNAL LABELS:
16                  EXTRN   CHFBUF,CHRPTR,CONBUF,CONPTR,DIRECT,KEYBUF,KEYPTR
17                  EXTRN   MMODE,MTYPE,IMPOL,SRATE,RIMPON,MGFTON
18                  EXTRN   LINPIN,FORMAT,DOWNER,SCALER,ENDBTS,REPCNT
19          ;
20          ;               EXTERNAL MODULES:
21                  EXTRN   ASCNUM,KBOARD,SCANKY,TYMS10
22          . ;
23          ;               EXTERNAL SUBROUTINES:
24                  EXTRN   CHROUT,CLRCHK,CLRIO,COMKEY,DECODE,DELAY,CMENUM,DSP40
25                  EXTRN   TONAD,VOCBR,SCROLL,SENDIT,STRING,DABCLR,LOAD,UNLOAD
26                  EXTRN   BLDSP
27          ;
28          ;               EXTERNAL POINTERS TO RCM:
29                  EXTRN   MMENU           ;POINTER TO TOP OF MESSAGE MENU
30                  EXTRN   ERMESS          ;POINTER TO ERROR MESSAGE
31                  EXTRN   BUFFER          ;FIRST LOCATION OF TURN-ON-AD MESSAGE
32                  EXTRN   FLASH           ;REPEAT LOCATION FOR END OF 'TONAD'
33          ;
34          ;
```

```
35                  PUBLIC    SCAN           ;DECLARATION FOR THIS MODULE
36                  PUBLIC    CLRLAT,RDBUSY,RESCAN,REDSP,STRIG0,STRIG1,IMMSUB
37           ;                               ;AND FOR SUBROUTINES CONTAINED IN
38           ;                               ; THE MODULE SOURCE.
39           ;
40                  EXTRN     PORT80,PORT81,PORT82,PORT83,PORT84,PORT85,PORT86,PORT87
41                  EXTRN     PORT88,PORT89,PORT8A,PORT8B,PORT8C,PORT8D,PORT8E,PORT8F
42           ;
43           ;                LABELS 'PORTXX' ARE FOR RAM IMAGE OF OUTPUT LATCHES
44           ;
45           ;
46 0096      CMSTAT  EQU      96H                  ;PORT ADDRESS FOR COMPUMOTOR STATUS
47                   EXTRN    EXFLAG               ;EXIT FLAG FOR 'SELFUN' ROUTINE
48                   EXTRN    FLAGHO               ;HOME FLAG
49                   EXTRN    FLAGPR               ;POWER-ON-RESET FLAG
50                   EXTRN    FLAGSC               ;SCAN FLAG
51                   EXTRN    FLAGRT               ;RETRACE FLAG
52                   EXTRN    FLAGER               ;ERROR FLAG
53                   EXTRN    IVAR00,IVAR01,IVAR02 ;GENERAL PURPOSE RAM VARIABLES
54                   EXTRN    IVAR03,IVAR04,IVAR05 ;
55                   EXTRN    IVAR06,IVAR09        ;
56 008F      OPEN    EQU      8FH                  ;OUTPUT PORT ENABLE ADDRESS
57 00E8      KEYPPA  EQU      0E8H
58 0001      SUPV    EQU      1
             Z80 ASSEMBLER VER.2.9                 2

59 0002      OPER    EQU      2
60           ;
61           ;
62           ;$$$$$$$$$$$$$$$$$$$$$  START OF MACRO DEFINITIONS  $$$$$$$$$$$$$$$$$
63           ;
64           ALIGN   MACRO    #PTR,#BUF
65                   LD       HL,#BUF
66                   LD       (#PTR),HL
67                   ENDM
68           ;
69           PLANK   MACRO
70                   CALL     BLDSP
71                   ENDM
72           ;
73           CASE    MACRO    #COND,#C1,#C2
74                   CP       #C1
75                   #COND    #C2
76                   ENDM
77           ;
78           EQUAL   MACRO    #E1
79                   CALL     Z,#E1
80                   ENDM
81           ;
82           NOTEQ   MACRO    #N1
83                   CALL     NZ,#N1
84                   ENDM
85           ;
86           GTOREQ  MACRO    #G1
87                   CALL     P,#G1
88                   ENDM
```

```
 89             ;
 90             UNDER   MACRO   #U1
 91                     CALL    M,#U1
 92                     ENDM
 93             ;
 94             IF_EQ   MACRO   #E,#ADDR
 95                     CP      #E
 96                     JR      Z,#ADDR
 97                     ENDM
 98             ;
 99             IFNOT   MACRO   #N,#ADDR
100                     CP      #N
101                     JR      NZ,#ADDR
102                     ENDM
103             ;
104             GET     MACRO   #ADDR
105                     LD      A,(#ADDR)
106                     ENDM
107             ;
108             PUT     MACRO   #ADDR
109                     LD      (#ADDR),A
110                     ENDM
111             ;
112             GETIN   MACRO
113                     LD      A,(HL)
114                     INC     HL
115                     ENDM
116             ;
                Z80 ASSEMBLER VER.2.9             3

117             PUTIN   MACRO
118                     LD      (HL),A
119                     INC     L
120                     ENDM
121             ;
122             FETCH   MACRO   #F
123                     LD      HL,#F
124                     LD      A,(HL)
125                     INC     HL
126                     ENDM
127             ;
128             STORE   MACRO   #S
129                     LD      (HL),#S
130                     LD      (HL),A
131                     INC     HL
132                     ENDM
133             ;
134             WAIT    MACRO   #W
135                     PUSH    BC
136                     LD      B,#W
137                     CALL    DELAY
138                     POP     BC
139                     ENDM
140             ;
141             PROMPT  MACRO
142                     CALL    STRING
```

```
143                 DB      3EH,0
144                 ENDM
145         ;
146         SET     MACRO   #FLAG
147                 LD      A,1
148                 LD      (#FLAG),A
149                 ENDM
150         ;
151         CLEAR   MACRO   #FLAG
152                 XOR     A
153                 LD      (#FLAG),A
154                 ENDM
155         ;
156         INMASK  MACRO   #PORT,#BIT
157                 PUSH    BC
158                 CALL    INMSUB
159                 DB      #PORTH,#BIT
160                 POP     BC
161                 ENDM
162         ;
163         ORAMIM  MACRO   #PORT
164                 LD      A,(PORT#PORT)
165                 OUT     (#PORTH),A
166                 ENDM
167         ;
168         OUTPUT  MACRO   #PORT,#BYTE
169                 LD      A,#BYTE
170                 OUT     (#PORTH),A
171                 ENDM
172         ;
173         SHOW    MACRO   #A
174                 LD      A,#A
         Z80 ASSEMBLER VER.2.9                        4
175                 CALL    SENDIT
176                 ENDM
177         ;
178         ;EEEEEEEEEEEEEEEEEEEEEEEEEEEEE END OF MACRO DEFINITIONS  EEEEEEEEEEEEEEEEEEEE
179         ;
180                 ASEG
181 0700           ORG      0700H
182         ;
183 0700 F5   SCAN: PUSH    AF
184 0701 C5         PUSH    BC
185 0702 E5         PUSH    HL
186 0703           SET      IVAR09          ;FIRST-TIME FLAG
185 0703 3E 01   +  LD      A,1
186 0705 32 00 00 E + LD    (IVAR09),A
188         ;
189 0708 CD B0 08    CALL   CLRLAT          ;CLEAR OUTPUT PORT PATTERNS
190                                         ; WITHOUT AFFECTING RAM IMAGE
191 070B 3E 12       LD     A,18            ;SET TO 'SCAN'
192 070D            PUT     MMODE           ; AND SAVE AS MODE
192 070D 32 00 00 E + LD   (MMODE),A
194 0710 3E 80       LD     A,80H           ;SET OUTPUT ENABLE ON
195 0712 D3 BF       OUT    (OPEN),A        ;ENABLE OUTPUT PORTS (IF NOT ALREADY)
```

```
196                          ;
197 0714             BR000:   GET     FLAGPR
197 0714 3A 00 00  E  +       LD      A,(FLAGPR)
198 0717                      IF_EQ   1,BR001
199 0717 FE 01        +       CP      1
199 0719 28 17 0732   +       JR      Z,BR001
201                          ;
202 071B CD C0 0A             CALL    STRIG1
203 071E                      CLEAR   FLAGSC          ;SCAN FLAG
203 071E AF           +       XOR     A
203 071F 32 00 00  E  +       LD      (FLAGSC),A
205 0722                      PUT     FLAGRT          ;RETRACE FLAG
205 0722 32 00 00  E  +       LD      (FLAGRT),A
207 0725                      PUT     DOWNER          ;SET DOWN COUNTER = 0
207 0725 32 00 00  E  +       LD      (DOWNER),A
209 0728                      SET     FLAGHO          ;HOME FLAG
209 0728 3E 01        +       LD      A,1
209 072A 32 00 00  E  +       LD      (FLAGHO),A
211 072D                      SET     FLAGPR          ;POWER ON RESET FLAG
211 072D 3E 01        +       LD      A,1
211 072F 32 00 00  E  +       LD      (FLAGPR),A
213                          ;
214 0732 CD 9E 09    BR001:   CALL    RDBUSY
215 0735                      IF_EQ   0,BR002
215 0735 FE 00        +       CP      0
215 0737 28 21 075A   +       JR      Z,BR002
217                          ;
218 0739                      GET     FLAGSC          ;SCAN FLAG
218 0739 3A 00 00  E  +       LD      A,(FLAGSC)
220 073C                      IF_EQ   1,BR003
220 073C FE 01        +       CP      1
220 073E 28 39 0779   +       JR      Z,BR003
222                          ;
223 0740                      GET     FLAGRT          ;RETRACE FLAG
223 0740 3A 00 00  E  +       LD      A,(FLAGRT)
225                  ;        IF_EQ   1,BR007
                     Z80 ASSEMBLER VER.2.9             5

226 0743 FE 01                CP      1               ; BRANCH TOO LONG FOR RELATIVE JUMP
227 0745 CA 16 08             JP      Z,BR007         ;   SO 'JP' INSTEAD OF 'JR'
228                          ;
229 0748                      GET     FLAGHO          ;HOME FLAG
229 0748 3A 00 00  E  +       LD      A,(FLAGHO)
231 074B                      IF_EQ   0,BR000
231 074B FE 00        +       CP      0
231 074D 28 C5 0714   +       JR      Z,BR000
233                          ;
234 074F                      GET     IVAR03          ;CHECK FOR FIRST-TIME FLAG
234 074F 3A 00 00  E  +       LD      A,(IVAR03)
236 0752 FE 01                CP      1               ; AND IF SET,
237 0754 CA 22 08             JP      Z,BR028         ;     DO A SCAN.
238 0757 C3 A6 08             JP      SCANXT          ;OTHERWISE, EXIT WHEN DONE.
239                                                   ;  (AT HOME=1, SCAN=0, RETRACE=0)
240 075A             BR002:   GET     FLAGSC          ;SCAN FLAG
240 075A 3A 00 00  E  +       LD      A,(FLAGSC)
242                  ;        IF_EQ   1,BR006         ;JUMP TOO FAR FOR RELATIVE, SO
```

```
243 075D FE 01              CP      1               ; IF SCAN FLAG SET,
244 075F CA EB 07            JP      Z,BR006         ; USE ABSOLUTE JUMP.
245                    ;                             ;   ELSE,
246 0762                     GET     FLAGRT          ;     CHECK RETRACE FLAG, AND IF
246 0762 3A 00 00    E  +    LD      A,(FLAGRT)
248 0765                     CASE    EQUAL,0,NOCMS   ;      IT'S NOT SET EITHER,
248 0765 FE 00          +    CP      0
248 0767                +    EQUAL   NOCMS
248 0767 CC 5D 03       +    CALL    Z,NOCMS
250                    ;                             ;       SHOW 'NO COMPUMOTOR STATUS'.
251 076A                     IFNOT   0,BR020         ; IF RETRACE SET, SKIP OUT OF LOOP.
251 076A FE 00          +    CP      0
251 076C 20 A6 0714     +    JR      NZ,BR020
253 076E                     GET     REPCNT          ;    HOW MANY TIMES 'NO STATUS' ?
253 076E 3A 00 00    E  +    LD      A,(REPCNT)
255 0771 FE 0A               CP      0AH             ; GIVE UP IF ) OR = 10 TRIES,
256 0773 F2 A6 08            JP      P,SCANXT        ;   AND JUMP TO EXIT OF SCAN ROUTINE.
257 0776 C3 14 07            JP      BR000           ; ELSE, GO BACK TO START.
258                    ;
259 0779             BR003:  GET     PORT80          ;GET RAM IMAGE
259 0779 3A 00 00    E  +    LD      A,(PORT80)
261 077C E6 FD               AND     11111101B       ; SET DIRECTION = RETRACE (0 ON BUS=1 AT SMC)
262 077E D3 80               OUT     (80H),A         ; WRITE PATTERN OUT
263 0780 32 00 00    E        LD      (PORT80),A     ;   AND UPDATE RAM
264 0783                     GET     PORT81          ;GET RAM IMAGE
264 0783 3A 00 00    E  +    LD      A,(PORT81)
266 0786 E6 0F               AND     00001111B       ; MASK VEL. DIGIT
267 0788 F6 30               OR      00110000B       ; SET VEL. DIGIT = 4, STOP TRIG=1
268 078A D3 81               OUT     (81H),A         ;    WRITE PATTERN OUT
269 078C                     GET     PORT8C
269 078C 3A 00 00    E  +    LD      A,(PORT8C)
271 078F E6 0F               AND     00001111B       ; CLOSE YAG SHUTTER, SET IDLE CURRENT
272 0791 D3 8C               OUT     (8CH),A         ;   WRITE PATTERN OUT
273 0793                     DRAMIM  83
273 0793 3A 00 00    E  +    LD      A,(PORT83)
273 0796 D3 83          +    OUT     (83H),A
275 0798                     DRAMIM  85
275 0798 3A 00 00    E  +    LD      A,(PORT85)
275 079B D3 85          +    OUT     (85H),A
277 079D                     WAIT    16H             ;APPROX. 50 MILLISECONDS
                Z80 ASSEMBLER VER.2.9                      6

277 079D C5             +    PUSH    BC
277 079E 06 16          +    LD      B,16H
277 07A0 CD 00 00    E  +    CALL    DELAY
277 07A3 C1             +    POP     BC
279 07A4 CD 00 00    E       CALL    DABCLR
280 07A7 CD 00 00    E       CALL    SCROLL
281 07AA 25                  DB      37,66,81,120,0  ;'SETTING BACK TO HOME'
282 07AF CD CA 0A     BR004: CALL    STRIG0          ;\
283 07B2                     WAIT    1               ; )-- TRIGGER SEQUENCE (SET 0, SET 1)
283 07B2 C5             +    PUSH    BC
283 07B3 06 01          +    LD      B,1
283 07B5 CD 00 00    E  +    CALL    DELAY
283 07B8 C1             +    POP     BC
285 07B9 CD C0 0A            CALL    STRIG1          ;/
```

```
286 07BC CD 9E 09              CALL    RDBUSY
287 07BF                       IF_EQ   0,BR005        ;BRANCH TAKEN IF BUSY (NOT READY)
287 07BF FE 00          +      CP      0
287 07C1 28 0B 07CE     +      JR      Z,BR005
289                            ;
290 07C3 CD 00 00    E         CALL    DASCLR         ;   THIS SECTION FOR NOT BUSY
291 07C6 CD 00 00    E         CALL  . SCROLL
292 07C9 03                    DB      3,124,0        ;'RETRACE ERROR'
293 07CC 18 E1 07AF            JR      BR004          ;   TRY TRIGGER AGAIN.
294                            ;
295 07CE                BR005: CLEAR   FLAGSC         ;SCAN FLAG
295 07CE AF             +      XOR     A
295 07CF 32 00 00    E  +      LD      (FLAGSC),A
297 07D2                       SET     FLAGRT         ;RETRACE FLAG
297 07D2 3E 01          +      LD      A,1
297 07D4 32 00 00    E  +      LD      (FLAGRT),A
299 07D7                       GET     IVAR08         ;CHECK 'LOAD' QUEUE
299 07D7 3A 00 00    E  +      LD      A,(IVAR08)
301 07DA                       IFNOT   1,BR5P5        ; AND SKIP IF NOT SET
301 07DA FE 01          +      CP      1
301 07DC 20 0A 07E8     +      JR      NZ,BR5P5
303 07DE CD 00 00    E         CALL    UNLOAD         ; OTHERWISE: SWAP CARRIERS,
304 07E1 CD 00 00    E         CALL    LOAD           ;   BY UNLOADING, THEN LOADING
305 07E4                       CLEAR   IVAR03         ;   RESET QUEUE, THEN GO
305 07E4 AF             +      XOR     A
305 07E5 32 00 00    E  +      LD      (IVAR03),A
307 07E8 C3 14 07       BR5P5: JP      BR220          ; BACK TO START.
308                            ;
309 07EB CD 00 00    E  BR006: CALL    SCANKY         ; CALL APPROPRIATE SUB IF
310 07EE                       CASE    EQUAL,224,RESCAN ; SCAN RESET BUTTON DETECTED
310 07EE FE E0          +      CP      224
310 07F0                +      EQUAL   RESCAN
310 07F0 CC CA 09      +       CALL    Z,RESCAN
312 07F3                       CASE    EQUAL,1,LDACK
312 07F3 FE 01          +      CP      1              ;ACKNOWLEDGE 'LOAD' INPUT
312 07F5                +      EQUAL   LDACK
312 07F5 CC 2F 09       +      CALL    Z,LDACK
314 07F8                       CASE    EQUAL,6,UNLOAD
314 07F8 FE 06          +      CP      6              ; ALLOW UNLOAD DURING SCAN
314 07FA                +      EQUAL   UNLOAD
314 07FA CC 00 00   E  +       CALL    Z,UNLOAD
316 07FD                       CASE    EQUAL,6,REDSP  ;   AND RESTORE DISPLAY AFTER UNLOAD.
316 07FD FE 06          +      CP      6
316 07FF                +      EQUAL   REDSP
                       Z80 ASSEMBLER VER.2.9          7
316 07FF CC BC 09       +      CALL    Z,REDSP
318 0802                       GET     DOWNER         ; CHECK # OF PEPS.
318 0802 3A 00 00    E  +      LD      A,(DOWNER)
320 0805 3C                    INC     A              ;   AFTER INCREMENTING
321 0806                       PUT     DOWNER         ;   SAVE TO RAM, THEN
321 0806 32 00 00    E  +      LD      (DOWNER),A
323 0809 06 0A                 LD      B,10           ;   WAIT FOR SOME
324 080B CD 00 00    E         CALL    DELAY          ;     CONSTANT TIME
325 080E 47                    LD      B,A            ;   SAVE 'DOWNER',
326                         ;  NOTE: SCALER --> C AT SCAN TIME   ; COMPARE WITH 'SCALER', AND
```

```
327 080F B9                              CP       C               ;SKIP COUNTDOWN DISPLAY IF NO MATCH.
328 0810 CC D8 08                        CALL     Z,CNTDWN        ;  BUT IF LOOPS=SCALER, COUNTDOWN.
329                         ;
330 0813 C3 14 07       BR007:  JP       BR020                    ; BACK TO START
331                         ;
332 0816               BR008:  CLEAR    FLAGRT                   ;RETRACE FLAG
332 0816 AF                  +           XOR      A
332 0817 32 00 00    E +                 LD       (FLAGRT),A
334 081A                     SET        FLAGHO                    ;HOME FLAG
334 081A 3E 01              +           LD       A,1
334 081C 32 00 00    E +                 LD       (FLAGHO),A
336 081F C3 14 07                        JP       BR020           ; BACK TO START
337                         ;
338 0822               BR038:  GET      PORT80                  ;
338 0822 3A 00 00    E +                 LD       A,(PORT80)
340 0825 F6 02                            OR       00000010B       ;SET DIRECTION=SCAN (1 ON BUS=0 AT SMC)
341 0827 E6 FE                            AND      11111110B       ;   AND TRIGGER STAYS HIGH
342 0829                     PUT        PORT80                  ;
342 0829 32 00 00    E +                 LD       (PORT80),A
344 082C                     DRAMIM     80                      ;\
344 082C 3A 00 00    E +                 LD       A,(PORT80)
344 082F D3 80              +           OUT      (80H),A
346 0831                     DRAMIM     81                      ;\
346 0831 3A 00 00    E +                 LD       A,(PORT81)
346 0834 D3 81              +           OUT      (81H),A
348 0836                     DRAMIM     8C                      
348 0836 3A 00 00    E +                 LD       A,(PORT8C)      ; )=- WRITE SCAN IMAGE TO PORTS
348 0839 D3 8C              +           OUT      (8CH),A
350 083B                     DRAMIM     83                      ;/
350 083B 3A 00 00    E +                 LD       A,(PORT83)
350 083E D3 83              +           OUT      (83H),A
352 0840                     DRAMIM     85                      ;/
352 0840 3A 00 00    E +                 LD       A,(PORT85)
352 0843 D3 85              +           OUT      (85H),A
354 0845                     WAIT       16H                     ; APPROX. 50 MILLISECONDS
354 0845 C5                  +           PUSH     BC
354 0846 06 16              +           LD       B,16H
354 0848 CD 00 00    E +                 CALL     DELAY
354 084B C1                  +           POP      BC
356 084C CD 00 00    E                  CALL     DAPCLR           ;
357 084F                     CLEAR      IVAR03                  ;
357 084F AF                  +           XOR      A
357 0850 32 00 00    E +                 LD       (IVAR03),A
359 0853                     CLEAR      IVAR08                  ;
359 0853 AF                  +           XOR      A
359 0854 32 00 00    E +                 LD       (IVAR08),A
361 0857                     CLEAR      IVAR03                   ;KNOCK OFF FIRST-TIME FLAG
361 0857 AF                  +           XOR      A
                        Z80 ASSEMBLER VER.2.3                      8

361 0858 32 00 00    E +                 LD       (IVAR03),A
363 085B 3E 30                            LD       A,30H           ;INITIALIZE TO ASCII '0'
364 085D                     PUT        IVAR02                  ;\
364 085D 32 00 00    E +                 LD       (IVAR02),A
366 0860 3C                            INC      A               ;
367 0861                     PUT        IVAR00                  ; )=- AND SET COUNTER DIGITS
```

```
367 0861 32 00 00    E  +         LD      (IVAR00),A
369 0864 3E 36                    LD      A,36H           ;       TO '1' '6' '0'
370 0866                          PUT     IVAR01          ;/
370 0866 32 00 00    E  +         LD      (IVAR01),A
372 0869 CD 03 09    E            CALL    SCROLL          ;.
373 086C 76                       DB      118,114,114,0   ;'SCANNING'
374 0870 CD 11 09                 CALL    SECDSP          ;
375                               ;
376 0873 CD CA 0A        BR009:   CALL    STRIG0          ;\
377 0876                          WAIT    1               ; )-- TRIGGER SEQUENCE (SET 0, SET 1)
377 0876 C5             +         PUSH    BC
377 0877 06 01          +         LD      B,1
377 0879 CD 00 00    E  +         CALL    DELAY
377 087C C1             +         POP     BC
379 087D CD C0 0A                 CALL    STRIG1          ;/
380 0880 CD 9E 09                 CALL    RDBUSY
381 0883                          IF_EQ   0,BR010         ;BRANCH TAKEN IF BUSY (NOT READY)
381 0883 FE 00          +         CP      0
381 0885 28 0F 0896     +         JR      Z,BR010
383                               ;
384 0887 CD 00 00    E            CALL    DABCLR          ; THIS SECTION FOR NOT BUSY
385 088A CD 00 00    E            CALL    SCROLL
386 088D 12                       DB      18,124,114,0    ;'SCAN ERROR'
387 0891 CD 11 09                 CALL    SECDSP
388 0894 18 DD 0873               JR      BR009           ; TRY TRIGGER AGAIN
389                               ;
390 0896                 BR010:   CLEAR   FLAGH0          ;HOME FLAG
390 0896 AF             +         XOR     A
390 0897 32 00 00    E  +         LD      (FLAGH0),A
392 089A                          SET     FLAGSC          ;SCAN FLAG
392 089A 3E 01          +         LD      A,1
392 089C 32 00 00    E  +         LD      (FLAGSC),A
394 089F                          GET     SCALER          ; SET UP SCALE FACTOR
394 089F 3A 00 00    E  +         LD      A,(SCALER)
396 08A2 4F                       LD      C,A             ;       FOR COUNTER (CLOCK)
397 08A3 C3 14 07                 JP      BR000           ; BACK TO START
398                               ;
399 08A6 CD 00 00    E   SCANXT:  CALL    DABCLR
400 08A9 CD B0 08                 CALL    CLRLAT
401                               ;
402 08AC E1                       POP     HL
403 08AD C1                       POP     BC
404 08AE F1                       POP     AF
405 08AF C9                       RET
406                               ;------------------------------------------------
407     •                         ;               ;END OF 'SCAN' SUBROUTINE
408                               ;------------------------------------------------
409 08B0                 CLRLAT:  OUTPUT  80,11111110B    ;\
409 08B0 3E FE          +         LD      A,11111110B
409 08B2 D3 80          +         OUT     (80H),A
411 08B4                          OUTPUT  81,01111111B    ; \__ ZERO DISTANCE, ZERO VELOCITY,
411 08B4 3E 7F          +         LD      A,01111111B
                        Z80 ASSEMBLER VER.2.3                   9

411 08B6 D3 81          +         OUT     (81H),A
413 08B8                          OUTPUT  8C,00001111B    ; /    YAG SHUTTER OFF, YAG IDLE CURRENT
```

```
413 08B9 3E 0F         +        LD      A,00001111B
413 08BA D3 8C         +        OUT     (8CH),A
415 08BC                        OUTPUT  83,11111111B    ; /         TRIGGERS DISABLED
415 08BC 3E FF         +        LD      A,11111111B
415 08BE D3 83         +        OUT     (83H),A
417 08C0                        OUTPUT  84,00000000B    ;
417 08C0 3E 00         +        LD      A,00000000B
417 08C2 D3 84         +        OUT     (84H),A
419 08C4                        OUTPUT  85,11111111B    ;
419 08C4 3E FF         +        LD      A,11111111B
419 08C6 D3 85         +        OUT     (85H),A
421 08C8                        OUTPUT  86,11111110B    ;
421 08C8 3E FE         +        LD      A,11111110B
421 08CA D3 86         +        OUT     (86H),A
423 08CC                        OUTPUT  87,00011111B    ;
423 08CC 3E 1F         +        LD      A,00011111B
423 08CE D3 87         +        OUT     (87H),A
425 08D0                        WAIT    50H             ;
425 08D0 C5           +        PUSH    BC
425 08D1 06 50         +        LD      B,50H
425 08D3 CD 00 00    E +        CALL    DELAY
425 08D6 C1           +        POP     BC
427 08D7 C9                     RET
428                             ;
429                             ;----------------------------------------
430 08D8 F5           CNTDOWN:  PUSH    AF              ; 'COUNTDOWN' SUBROUTINE
431 08D9 E5                     PUSH    HL              ;
432 08DA                        GET     IVAR02          ; THEN GET CURRENT DISPLAY CHAR.
432 08DA 3A 00 00    E +        LD      A,(IVAR02)
434 08DD 3D                     DEC     A               ; COUNT IT DOWN BY ONE, AND
435 08DE FE 2F                  CP      2FH             ; ROLLOVER YET?
436 08E0 20 16 08F8             JR      NZ,CD01         ;   IF NOT, CONTINUE NORMAL SEQUENCE
437 08E2                        GET     IVAR01          ; FETCH TEN'S DIGIT,
437 08E2 3A 00 00    E +        LD      A,(IVAR01)
439 08E5 3D                     DEC     A               ;   AND BUMP IT,
440 08E6 FE 2F                  CP      2FH             ; ROLLOVER YET?
441 08E8 20 09 08F3             JR      NZ,CD02         ;   IF NOT, CONTINUE TEN'S UPDATE
442 08EA                        GET     IVAR00          ;       FETCH HUNDRED'S DIGIT
442 08EA 3A 00 00    E +        LD      A,(IVAR00)
444 08ED 3D                     DEC     A               ;         AND BUMP IT
445 08EE                        PUT     IVAR00          ;       THEN UPDATE RAM HUNDREDS
445 08EE 32 00 00    E +        LD      (IVAR00),A
447 08F1 3E 39                  LD      A,39H           ; . SET TEN'S TO 9
448 08F3               CD02:    PUT     IVAR01          ; . THEN UPDATE RAM TEN'S
448 08F3 32 00 00    E +        LD      (IVAR01),A
450 08F6 3E 39                  LD      A,39H           ; SET ONE'S TO 9
451 08F8               CD01:    PUT     IVAR02          ; THEN UPDATE RAM ONES
451 08F8 32 00 00    E +        LD      (IVAR02),A
453 08FB CD 00 00    E          CALL    STRING
454 08FE 08                     DB      8,8,8,0         ; THREE BACKSPACES
455 0902 21 00 00    E          LD      HL,IVAR00       ; THEN POINT TO FIRST CHAR
456 0905 CD 00 00    E          CALL    DSP40           ; SHOW CHARS FROM (HL) UP TO '0'
457 0908                        CLEAR   DOWNER          ;   RESET THE LOOP COUNTER,
457 0908 AF           +         XOR     A
457 0909 32 00 00    E +        LD      (DOWNER),A
459 090C E1                     POP     HL              ;
```

```
460 030D F1                     POP     AF              ; AND HOME AGAIN !!
461 030E C9                     RET
462                       ;----------------------------------------------------------------
463 030F 00             INMSUB: NOP                     ;DUMMY FOR NOW
464 0910 C9                     RET
465                       ;----------------------------------------------------------------
466 0911 F5             SECDSP: PUSH    AF
467 0912 E5                     PUSH    HL
468 0913 CD 00 00   E           CALL    STRING
469 0916 53                     DB      'SECONDS LEFT = ',0
470 0926 21 00 00   E           LD      HL,IVAR00
471 0929 CD 00 00   E           CALL    DSP40
472 092C E1                     POP     HL
473 092D F1                     POP     AF
474 092E C9                     RET
475                       ;
476                       ;--------------------------------------------------------------
477                       ;                           ==================
478                       ;                           =   LDACK   SUB  =
479                       ;                           ==================
480                       ;                       LoaD ACKnowledge subroutine.
481 092F F5             LDACK:  PUSH    AF
482 0930                        SET     IVAR08          ;USE AS FLAG TEMPORARILY
482 0930 3E 01              +   LD      A,1
482 0932 32 00 00   E      +   LD      (IVAR08),A
484 0935                        SHOW    0AH             ;CLEAR DISPLAY
484 0935 3E 0A              +   LD      A,0AH
484 0937 CD 00 00   E      +   CALL    SENDIT
486 093A CD 00 00   E          CALL    SCROLL
487 093D 24                    DB      36,81,57,74,18,116,0
488                       ;       ;'SET TO LOAD WHEN SCAN COMPLETE'
489 0944                        WAIT    60H
489 0944 C5                 +   PUSH    BC
489 0945 06 60              +   LD      B,60H
489 0947 CD 00 00   E      +   CALL    DELAY
489 094A C1                 +   POP     BC
491 094B                        GET     DOWNER
491 094B 3A 00 00   E      +   LD      A,(DOWNER)
493 094E 79                    LD      A,C
494 094F 3D                    DEC     A
495 0950                        PUT     DOWNER
495 0950 32 00 00   E      +   LD      (DOWNER),A
497 0953 CD BC 09             CALL    REDSP           ;RESTORE DISPLAY
498 0956 3E 39                 LD      A,57            ;\
499 0958                        PUT     MMODE           ;SET LAST COMMAND='LOAD'
499 0958 32 00 00   E      +   LD      (MMODE),A
501 095B F1                    POP     AF
502 095C C9                    RET                     ;  ---- END OF 'LDACK' SUB ----
503                       ;
504                       ;--------------------------------------------------------------
505                       ;                           ==================
506                       ;                           =   NOCMS   SUB  =
507                       ;                           ==================
508                       ;       'NO CompuMotor Status' subroutine.
```

```
509                         ;
510 035D F5                 NOCMS:  PUSH    AF
511 035E CD 00 00    E              CALL    DABCLR
512 0361 CD 00 00    E              CALL    SCROLL
                            Z80 ASSEMBLER VER.2.3              11

513 0364 68                         DB      104,123,55,114,114,114,114,49,63,0
514                         ;              ;'NO STEPPER STATUS    RESET ON'
515 036E                            WAIT    50H
515 036E C5          +              PUSH    BC
515 036F 06 50       +              LD      B,50H
515 0371 CD 00 00    E  +           CALL    DELAY
515 0374 C1          +              POP     BC
517 0375                            GET     REPCNT
517 0375 3A 00 00    E  +           LD      A,(REPCNT)
519 0378 3C                         INC     A
520 0379                            PUT     REPCNT
520 0379 32 00 00    E  .+          LD      (REPCNT),A
522 037C                            OUTPUT  86,11111111B      ;RESET 8085 BOARD (SET BIT 0 = 0)
522 037C 3E FF       +              LD      A,11111111B
522 037E D3 86       +              OUT     (86H),A
524 0380                            WAIT    16H               ; ~ 50 MILLISECONDS
524 0380 C5          +              PUSH    BC
524 0381 06 16       +              LD      B,16H
524 0383 CD 00 00    E  +           CALL    DELAY
524 0386 C1          +              POP     BC
526 0387                            OUTPUT  86,11111110B      ;REMOVE RESET (BACK TO 1)
526 0387 3E FE       +              LD      A,11111110B
526 0389 D3 86       +              OUT     (86H),A
528 038B CD 00 00    E              CALL    STRING
529 038E 08                         DB      08,08,08,'OFF',0   ;WRITE 'OFF' OVER 'ON '
530 0395                            WAIT    50H
530 0395 C5          +              PUSH    BC
530 0396 06 50       +              LD      B,50H
530 0398 CD 00 00    E  +           CALL    DELAY
530 039B C1          +              POP     BC
532 039C F1                         POP     AF
533 039D C9                         RET
534
535                         ;
536                         ;-----------------------------------------------------------------
537                         ;                       =================
538                         ;                       =  RDBUSY SUB   =
539                         ;                       =================
540                         ;       'ReaD BUSY' subroutine.
541                         ;              a)returns '1' in A if ready (not busy).
542                         ;              b)returns '0' in A if not ready (busy).
543                         ;              c)resets loop counter if 'ready' status is read.
                            ;              d)'debounces' the status input port.
544 039E C5                 RDBUSY: PUSH    BC
545 039F DB 96              RDB1:   IN      A,CMSTAT          ;READ BUSY/NOT BUSY CODE
546 03A1 47                         LD      B,A               ; SAVE CODE READ
547 03A2                            WAIT    2
547 03A2 C5          +              PUSH    BC
547 03A3 06 02       +              LD      B,2
547 03A5 CD 00 00    E  +           CALL    DELAY
547 03A8 C1          +              POP     BC
```

```
549 09A9 DB 96                    IN      A,CMSTAT      ; READ AGAIN
550 09AB B8                       CP      B             ; AND COMPARE WITH LAST
551 09AC 20 F1 09AF               JR      NZ,RDB1       ;    IF NOT THE SAME, TRY AGAIN
552 09AE E6 10                    AND     10H           ;MASK ALL BUT BIT OF INTEREST
553 09B0                          IF_EQ   0,RDBX        ;EXIT IF NOT READY
553 09B0 FE 00            +       CP      0
553 09B2 28 06 09BA       +       JR      Z,RDBX
555 09B4 AF                       XOR     A             ;CLEAR A & FLAGS
                               Z80 ASSEMBLER VER.2.9                12

556 09B5                          PUT     REPCNT        ;RESET LOOP COUNTER
556 09B5 32 00 00    E    +       LD      (REPCNT),A
558 09B8 3E 01                    LD      A,1           ;SET A=1 FOR 'READY'
559 09BA C1               RDBX:   POP     BC
560 09BB C9                       RET
561                           ;                         ;END OF 'RDBUSY' SUBROUTINE
562                           ;---------------------------------------------------
563                           ;
564                           ;                         ==================
565                           ;                         =   REDSP SUB    =
566                           ;                         ==================
567                           ;       REstore DiSPlay subroutine.
568 09BC CD 00 00    E    REDSP:  CALL    DABCLR
569 09BF CD 00 00    E            CALL    SCROLL
570 09C2 76                       DB      118,114,114,0 ;'SCANNING'
571 09C6 CD 11 09               CALL    SECDSP
572 09C9 C9                       RET
573                           ;
574                           ;---------------------------------------------------
575                           ;                         ==================
576                           ;                         =   RESCAN SUB   =
577                           ;                         ==================
578 09CA F5               RESCAN: PUSH    AF            ; 'RE'SET 'SCAN' ON 'SCAN RESET' KEY
579 09CB C5                       PUSH    BC
580 09CC 3E 80                    LD      A,80H
581 09CE D3 8F                    OUT     (OPEN),A      ; ENSURE OUTPUTS ARE ENABLED.
582 09D0 CD 00 00    E            CALL    DABCLR
583 09D3 DB E8                    IN      A,(KEYPPA)    ; CHECK SWITCH
584 09D5                          IF_EQ   SUPV,RSL00    ; AND SKIP 'RESET DETECTED' MESSAGE
584 09D5 FE 01            +       CP      SUPV
584 09D7 28 16 09EF       +       JR      Z,RSL00
586                           ;                         ; IN KEY MODE.
587 09D9 CD 00 00    E            CALL    SCROLL
588 09DC 4B                       DB      75,17,110,0   ; 'SCAN RESET DETECTED'
589 09E0                          WAIT    50H
589 09E0 C5               +       PUSH    BC
589 09E1 06 50            +       LD      B,50H
589 09E3 CD 00 00    E    +       CALL    DELAY
589 09E6 C1               +       POP     BC
591 09E7                          GET     DOWNER        ;\
591 09E7 3A 00 00    E    +       LD      A,(DOWNER)
593 09EA 79                       LD      A,C           ; )=- ACCELERATE COUNTER
594 09EB 3D                       DEC     A             ; / BY SETTING JUST BELOW 'SCALER' VALUE
595 09EC                          PUT     DOWNER        ;/      TO COMPENSATE FOR EXECUTION TIME
595 09EC 32 00 00    E    +       LD      (DOWNER),A
597 09EF              RSL00:      GET     ENDATS        ; CHECK FOR DATUM PRESENCE.
```

```
597 09EF 3A 00 00    E  +        LD      A,(ENDATS)
598                            ; IF_EQ   0,RSXT         ;   AND eXiT ReScan IF ABSENT.
600 09F2 FE 00                   CP      0              ; JUMP TOO LONG FOR RELATIVE BRANCH
601 09F4 CA B4 0A                JP      Z,RSXT         ;     SO 'JP' INSTEAD OF 'JR'
602                            ;
603    .                       ;
604 09F7                         OUTPUT  82,11111110B   ; ELSE, SET START TRIG=1
604 09F7 3E FE         +         LD      A,11111110B
604 09F9 D3 80         +         OUT     (80H),A
606 09FB               RSL01:    OUTPUT  81,11111111B   ;SET STOP TRIG=0
606 09FB 3E FF         +         LD      A,11111111B
606 09FD D3 81         +         OUT     (81H),A
                        Z80 ASSEMBLER VER.2.9              13

608 09FF                         WAIT    1              ;~150 MICROSECONDS
608 09FF C5            +         PUSH    BC
608 0A00 06 01         +         LD      B,1
608 0A02 CD 00 00    E +         CALL    DELAY
608 0A05 C1            +         POP     BC
610 0A06                         OUTPUT  81,00001111B   ;SET STOP TRIG=1 AND VEL=7.00
610 0A06 3E 0F         +         LD      A,00001111B
610 0A08 D3 81         +         OUT     (81H),A
612 0A0A                         ELDSP                  ;DISPLAY
612 0A0A CD 00 00    E +         CALL    ELDSP
614                            ; STEPPER SHOULD NOW BE HALTED  ;
615 0A0D 06 0A                   LD      B,10           ; SET FOR TEN TRIES
616 0A0F CD 9E 09                CALL    RDBUSY         ;CHECK STATUS
617 0A12                         IF_EQ   1,RSL02        ; & CONTINUE IF "READY"
617 0A12 FE 01         +         CP      1
617 0A14 28 12 0A28    +         JR      Z,RSL02
619 0A16 CD 00 00    E           CALL    SCROLL         ;SHOW:
620 0A19 81                      DB      129,125,0      ;"STEPPER BUSY",
621 0A1C                         WAIT    20             ; SLIGHT PAUSE,
621 0A1C C5            +         PUSH    BC
621 0A1D 06 14         +         LD      B,20
621 0A1F CD 00 00    E +         CALL    DELAY
621 0A22 C1            +         POP     BC
623 0A23 10 D6 09FB              DJNZ    RSL01          ; AND TRY AGAIN UNTIL TEN ATTEMPTS,
624 0A25 C3 B4 0A                JP      ESXT           ; THEN, GIVE UP & GO AWAY.
625 0A28              RSL02:     OUTPUT  8C,0           ;CLOSE YAG SHUTTER & SET IDLE CURRENT
625 0A28 3E 00         +         LD      A,0
625 0A2A D3 8C         +         OUT     (8CH),A
627 0A2C                         GET     IVAR01         ;10'S DIGIT
627 0A2C 3A 00 00    E +         LD      A,(IVAR01)
629 0A2F CB 07                   RLC     A              ;MOVE TO POSITION
630 0A31 CB 07                   RLC     A              ;  IN
631 0A33 CB 07                   RLC     A              ;    TOP.
632 0A35 CB 07                   RLC     A              ;     1/2 BYTE,
633 0A37 E6 F0                   AND     11110000B      ;   MASK EXCESS, THEN
634 0A39 4F                      LD      C,A            ; SAVE TEMPORARILY.
635 0A3A                         GET     IVAR03         ;1'S DIGIT (IVAR02='.')
635 0A3A 3A 00 00    E +         LD      A,(IVAR03)
637 0A3D E6 0F                   AND     00001111B      ; MASK EXCESS, THEN
638 0A3F 81                      ADD     A,C            ;COMBINE THE TWO DIGITS.
639 0A40 D3 85                   OUT     (85H),A        ; AND LATCH DIGITS 2 & 3 TO PORT 85
640 0A42 DB E8                   IN      A,(KEYPPA)     ;CHECK SWITCH
```

```
641 0A44                             IF_EQ   SUPV,RSL2P5     ; AND SKIP DISPLAY IN KEY MODE
641 0A44 FE 01           +           CP      SUPV
641 0A46 28 08 0A50      +           JR      Z,RSL2P5
643 0A48 CD 00 00    E               CALL    SCROLL          ;
644 0A4B 25                          DB      37,66,81,120,0  ;'SETTING BACK TO HOME'
645 0A50                 RSL2P5:     GET     IVAR00          ;100'S DIGIT ('2P5' = 2 'POINT' 5 = 2.5)
645 0A50 3A 00 00    E   +           LD      A,(IVAR00)
647 0A53 CB 07                       RLC     A               ;MOVE INTO POSITION
648 0A55 CB 07                       RLC     A               ;   IN BITS 2 & 3
649 0A57 E6 0C                       AND     00001100B       ;       AND MASK EXCESS.
650 0A59 F6 03                       OR      3               ;SET START TRIGGER & DIR = RETRACE
651 0A5B 2F                          CPL                     ;INVERT FOR BUS -) (1111XX00)
652 0A5C 47                          LD      B,A             ;SAVE INTERMEDIATE RESULT
653 0A5D                             GET     DIRECT          ;READ DIRECTION BIT FROM RAM
653 0A5D 3A 00 00    E   +           LD      A,(DIRECT)
655 0A60 B0                          OR      B               ; BIT 2 = 0 FOR RET, 1 FOR SCAN (ON BUS)
                                 Z80 ASSEMBLER VER.2.9           14

656 0A61 06 05                       LD      B,5             ;SET MAX TRIES
657 0A63 4F                          LD      C,A             ;SAVE FOR NEXT TRIGGER, IF REQ.
658 0A64 79              RSL03:      LD      A,C             ;RE-ENTRY ON RE-TRIGGER
659 0A65 D3 80                       OUT     (80H),A         ;LATCH TO PORT 80
660 0A67                             WAIT    16H             ; ~50 MILLISECONDS FOR DATA SETTLING
660 0A67 C5             +            PUSH    BC
660 0A68 06 16          +            LD      B,16H
660 0A6A CD 00 00   E   +            CALL    DELAY
660 0A6D C1             +            POP     BC
662 0A6E F6 01                       OR      1               ;TRIGGER = 0
663 0A70 D3 80                       OUT     (80H),A         ;LATCH TRIGGER
664 0A72                             WAIT    1               ;~150 MICROSECONDS
664 0A72 C5             +            PUSH    BC
664 0A73 06 01          +            LD      B,1
664 0A75 CD 00 00   E   +            CALL    DELAY
664 0A78 C1             +            POP     BC
666 0A79 E6 FE                       AND     11111110B       ;TRIGGER = 1
667 0A7B D3 80                       OUT     (80H),A         ;END TRIGGER PULSE
668 0A7D                             CLEAR   IVAR00          ;\    SET DISTANCE = ZERO
668 0A7D AF             +            XOR     A
668 0A7E 32 00 00   E   +            LD      (IVAR00),A
670 0A81                             CLEAR   IVAR01          ; )—   SO NO MOTION ON
670 0A81 AF             +            XOR     A
670 0A82 32 00 00   E   +            LD      (IVAR01),A
672 0A85                             CLEAR   IVAR03          ;/    NEXT 'SCAN RESET' UNLESS SCAN FIRST.
672 0A85 AF             +            XOR     A
672 0A86 32 00 00   E   +            LD      (IVAR03),A
674 0A89 CD 9E 03                    CALL    RDBUSY          ;
675 0A8C                             IF_EQ   0,RSL04         ;CONTINUE IF TRIGGER ACK'ED.
675 0A8C FE 00          +            CP      0
675 0A8E 28 14 0AA4     +            JR      Z,RSL04
677 0A90                             SHOW    0AH             ;CLEAR
677 0A90 3E 0A          +            LD      A,0AH
677 0A92 CD 00 00   E   +            CALL    SENDIT
679 0A95 CD 00 00   E                CALL    SCROLL          ;
680 0A98 81                          DB      129,124,0       ;'STEPPER ERROR'
681 0A9B                             WAIT    20              ;SLIGHT PAUSE
681 0A9B C5             +            PUSH    BC
```

```
681 8A3C 06 14            +        LD      B,20
681 8A3E CD 00 00    E    +        CALL    DELAY
681 8AA1 C1               +        POP     BC
683 8AA2 10 C0 8A64                DJNZ    RSL03           ; TRY TRIGGER AGAIN UP TO 5 TIMES
684 8AA4                  RSL04:   CLEAR   FLAGSC          ;SCAN FLAG = 0
684 8AA4 AF               +        XOR     A
684 8AA5 32 00 00    E    +        LD      (FLAGSC),A
686 8AA8                           SET     FLAGRT          ;RETRACE FLAG = 1
686 8AA8 3E 01            +        LD      A,1
686 8AAA 32 00 00    E    +        LD      (FLAGRT),A
688 8AAD 3E 4B                     LD      A,75            ;CODE FOR SCAN RESET
689 8AAF                           PUT     HMODE           ; SET AS LAST COMMAND
689 8AAF 32 00 00    E    +        LD      (HMODE),A
691 8AB2 18 09 8ABD                JR      RSXT2           ;SKIP DISPLAY IF RESETTING
692                                ;
693                                ;
694 8AB4 DB E8            RSXT:    IN      A,(KEYFPA)      ;READ SWITCH
695 8AB6                           IF_EQ   SUPV,RSXT2      ; AND SKIP DISPLAY IN KEY MODE.
695 8AB6 FE 01            +        CP      SUPV
695 8AB8 28 03 8ABD       +        JR      Z,RSXT2
                          Z80 ASSEMBLER VER.2.9                    15
697 8ABA CD BC 09                  CALL    REDSP           ;  ELSE, RESTORE DISPLAY.
698 8ABD C1               RSXT2:   POP     BC              ;
699 8ABE F1                        POP     AF              ;
700 8ABF C9                        RET
701                                ;
702                                ;-----------------------------------------------------
703 8AC0 F5               STRIG1:  PUSH    AF
704 8AC1                           GET     PORT80          ;GET OLD PATTERN
704 8AC1 3A 00 00    E    +        LD      A,(PORT80)
705 8AC4 E6 FE            +        AND     11111110B       ;BIT 0 = 0 ON BUS, 1 AT PORT OUTPUT
707 8AC6 D3 80                     OUT     (80H),A         ; WRITE PATTERN TO PORT
708 8AC8 F1                        POP     AF
709 8AC9 C9                        RET
710                                ;
                                   ;-----------------------------------------------------
711 8ACA F5               STRIG0:  PUSH    AF
712 8ACB                           GET     PORT80          ;GET OLD PATTERN
712 8ACB 3A 00 00    E    +        LD      A,(PORT80)
714 8ACE F6 01            +        OR      00000001B       ;BIT 0 = 1 ON BUS, 0 AT PORT OUTPUT
715 8AD0 D3 80                     OUT     (80H),A         ; WRITE PATTERN TO PORT
716 8AD2 F1                        POP     AF
717 8AD3 C9                        RET
718                                ;-----------------------------------------------------
719 8AD4                           END
```

ERRORS = 0000

```
ASCNUM  E 0013    BLDSP  E 0827    BR000    0714    BR001    0732
BR002    075A     BR003    0779    BR004    07AF    BR005    07CE
BR006    07EB     BR007    0816    BR008    0822    BR009    0873
BR010    0836     BR5P5    07E8    BR607    0813    BUFFER E 082A
CD01     08F8     CD02     08F3    CHRBUF E 0000    CHROUT E 0017
CHRPTR E 0001    CLRCHK E 0018    CLRIO  E 0019    CLRLAT   08D3
```

| | | | |
|---|---|---|---|
| CMSTAT 0036 | CNTDWN 0808 | COMKEY E 001A | CONBUF E 0022 |
| CONPTR E 0003 | DABCLR E 0024 | DECODE E 001B | DELAY E 001C |
| DIRECT E 0004 | DMENU E 001D | DOWNER E 000F | DSP40 E 001E |
| ENDATS E 0011 | ERMESS E 0023 | EXFLAG E 003C | FLAGER E 0041 |
| FLAGHO E 003D | FLAGPR E 003E | FLAGRT E 0040 | FLAGSC E 003F |
| FLASH E 002B | FORMAT E 000E | HAFTON E 002C | IMPOL E 0009 |
| INMSUB 090F | IVAR00 E 0042 | IVAR01 E 0043 | IVAR02 E 0044 |
| IVAR03 E 0045 | IVAR04 E 0046 | IVAR05 E 0047 | IVAR08 E 0048 |
| IVAR09 E 0049 | KBOARD E 0014 | KEYBUF E 0005 | KEYFPA 00E8 |
| KEYPTR E 0006 | LDACK 092F | LINPIN E 000D | LOAD E 0025 |
| KMENU E 0028 | MMODE E 0007 | MTYPE E 0008 | NOEMS 0950 |
| OPEN 008F | OPER 0002 | PORT80 E 002C | PORT81 E 002D |
| PORT82 E 002E | PORT83 E 002F | PORT84 E 0030 | PORT85 E 0031 |
| PORT86 E 0032 | PORT87 E 0033 | PORT88 E 0034 | PORT89 E 0035 |
| PORT8A E 0036 | PORT8B E 0037 | PORT8C E 0038 | PORT8D E 0039 |
| PORT8E E 003A | PORT8F E 003B | RDB1 093F | RDBUSY 093E |
| RDBX 093A | REDSP 03BC | REPCNT E 0012 | RESCAN 03CA |
| RIWRON E 000B | RSL00 03EF | RSL01 03FB | RSL02 0A28 |
| RSL03 0A64 | RSL04 0AA4 | RSL2P5 0A50 | RSXT 0A84 |
| RSXT2 0ABD | SCALER E 0010 | SCAN 0700 | SCANKY E 0315 |
| SCANXT 08A6 | SCROLL E 0021 | SECDSP 0911 | SENDIT E 0022 |
| SRATE E 000A | STRIG0 0ACA | STRIG1 0AC0 | STRING E 0023 |
| SUPV 0001 | TONAD E 001F | TYMS10 E 0016 | UNLOAD E 0026 |
| VOCBB E 0020 | | | |

APPENDIX II   TRANSPORT LOAD/UNLOAD SOFTWARE LISTING

```
2STA1=STAT OR 8:J=0:GO263
3Q=0:J=0
4@#200C=#FE:@#200A=0
5D=#2003:E=@D:Q=3 AND E
6IF Q)2GO5
7IF Q=0GO5
8@#200C=#FD:GOSUB244
9IF Q=2GO12
10GO100
12@#2009=#84:DELAY0:D=#2001:E=@D:H=#80 AND E
14T=5:IF H=0GO17
15GO200
17D=#2002:E=@D:H=#10 AND E:T=6
18IF H=16GO21
19GO200
21D=#2001:E=@D:H=2 AND E:T=4
23IF H=2GO27
24GO200
27T=T+1:DELAY0
28D=#2001:E=@D:H=4 AND E
29IF T=10GO200
30IF H=4GO27
31@#200B=2:T=0
32@#200A=#82:DELAY0
33D=#2002:E=@D:H=#08 AND E:T=T+1:IF T=14GO200
34IF H=0GO38
35GO32
38@#200A=0:@#200B=0:T=0
40@#2009=#84:DELAY10
42D=#2002:E=@D:H=1 AND E:T=T+1:IF T=19GO200
```

```
43IF H=1GO45
44GO40
45D=#2001:@#200A=#20:DELAY95
46@#200A=#39:@#200B=1
47FOR T=0 TO 200
48E=@D:H=#20 AND E
49IF H=0GO52
50NEXT T
51GO200
52@#200A=#28:DELAY45:@#200A=8
53D=#2002
54FOR T=0 TO 100
55E=@D:H=#40 AND E:IF H=0GO58
56NEXT T
57GO200
58@#2009=#80
59 FOR T=0 TO 200
60E=@D:H=#10 AND E:IF H=0GO63
61NEXT T
62GO200
63@#200A=0:@#200B=0:@#2009=0
64IF C=1GOSUB300
65IF Q=2GO70
67CLEAR:GO100
70CLEAR:GO3
100IF C=1GOSUB300:REM LOADER 6/3/82
101GO350
103D=#2002:E=@D:H=#40 AND E:IF H=0GO106
104GO200
106@#2009=#40:@#200A=0:@#200B=0
108D=#2001:E=@D
109H=1 AND E
110IF H=1GO108
111IF C=1GO128
116GO114
128T=0
129@#2009=#C0:DELAY0
131D=#2001:E=@D:H=#06 AND E
132IF H=0GO137
134T=T+1:IF T=10GO200
135GO129
137T=0
138@#2009=#C2:DELAY250:D=#2001:E=@D:H=#08 AND E
140IF H=0GO146
141T=T+1:IF T=40GO200
142GO138
146@#2009=#C0:DELAY0:T=0:@#200A=#04:@#200B=#01
148FOR N=1 TO 100
150E=@D:H=#10 AND E
151IF H=0GO157
152NEXT N
153GO200
157@#2009=#C4:DELAY250:@#200A=#15
160FOR N=1 TO 200
161E=@D:H=#40 AND E
162IF H=0GO168
163NEXT N
165GO200
168@#200A=0:@#200B=0:DELAY500
```

```
170@#2009=#0C:DELAY0
171D=#2001:E=@D:H=#80 AND E
172IF H=#80GO200
173@#200B=#10:IF C=1GO180
174T=0:@#2009=#2C:DELAY0
175D=#2001:E=@D:H=#01 AND E:T=T+1:IF T=3GO200
176IF H=0GO180
177GO175
180@#2009=#1C:DELAY300:@#200A=#42:DELAY0
182D=#2002:E=@D:H=#02 AND E:T=T+1:IF T=7GO200
183IF H=0GO185
184GO180
185@#200A=0:@#200C=#FC:DELAY5:CLEAR:GO3
200T=0:D=#2002:@#200A=0:@#200B=0:REM ERR UNLD 6/3/82
201@#200C=#F0:E=@D:H=8 AND E:T=T+1:IF T=16GO243
202IF H=0GO204
203@#200A=#82:DELAY0:GO201
204@#200A=0:D=#2001:E=@D:H=#80 AND E:IF H=#80GO208
205GOSUB300:CLEAR:GOSUB244
206O=2:GO17
208@#200B=2:T=0:GOSUB230
209B=0
210D=#2002:E=@D:H=#40 AND E
212IF H=0GO222
213@#200C=#F2
214D=#2003:E=@D:H=#03 AND E
216IF H<>2GO220
217IF B=1GO210
218@#200A=#20:DELAY95
219@#200A=#39:@#200D=#03:B=1:GO210
220IF B=0GO210
221@#200A=#20:@#200B=#02:DELAY45:@#200A=#00:B=0:GO210
222@#200A=#20:@#200B=#00:DELAY45:@#200A=#00:T=0
224D=#F0 AND A:@#2009=D:@#200A=#80:@#200B=#01
225GO365
230D=#2001:E=@D:H=2 AND E
232IF H=2GO240
234A=#C4:@#2009=A
236T=T+1:GO300
243@#200C=#F1:STOP
244C=0:D=#2001:E=@D:H=1 AND E
245IF H=1GO250
247C=C+1
250D=#2002:E=@D:H=#10 AND E
253IF H=#10GO257
255C=C+1
257D=#2001:E=@D:H=#80 AND E
258IF H=#80GO260
259C=C+1
260IF C=0GO403
261IF C>2GO410
262RETURN
263GOSUB244:D=#2001:E=@D
264H=#80 AND E
265IF H=#80GO3
268O=2
269@#200C=#F0:@#2009=#84:GO17
300D=#2002:E=@D:H=#10 AND E
310IF H=0GO320
```

```
315RETURN.
317T=0
320D=#2001:E=0D:H=1 AND E
325IF H=1GO328
327RETURN
328@#2009=#20
335D=#2001:E=0D:H=1 AND E
337T=T+1:IF T=50GO200
338IF H=1GO335
339DELAY0:@#2009=0:RETURN
340@#2009=0:RETURN
350IFC()1GO360
355Q=2
360D=#2001:E=0D:H=#80 AND E
362IF H=0GO12
364GO103
365J=C:T=0
367GOSUB244
369IF J=CGO377
371T=T+1:IF T<10GO367
375@#200A=0:@#200B=0:@#200C=#F3:GO5
376DELAY0:@#200C=#F3:GO5
377D=#70 AND A:@#2009=D
379@#200A=0:@#200B=0:CLEAR:GO3
380IF T=3GO402
381IF A=#84GO392
382 D=#2001:E=0D:H=1 AND E
384IF H=0GO388
386RETURN
388A=#C4:@#2009=A:GO230
392D=#2002:E=0D:H=#10 AND E
394IF H=0GO398
396RETURN
398A=#84:@#2009=A:GO230
402@#200C=#F0:DELAY0:@#200C=#F4:GO5
403IF J)0RETURN
404@#200C=#F0:DELAY0:@#200C=#F5
405GO5
410@#200C=#F0:DELAY0:@#200C=#F6
412GO5
   ERROR CODES
F=FIXABLE ERROR
E=SQUEEGEE ERROR
D=DISK ERROR
A=NO CARRIERS
9=3 CARRIERS
```

We herein claim as our invention:

1. A system for controlling a scanner apparatus for (a) scanning, with an optical reading device which rotates about and translates along an axis, an image on an image-carrying element supported by a transport, (b) converting an optical signal from the optical reading device into a electrical signal which is stored in at least one memory as digital data, (c) clocking out said digital data from the memory, and (d) generating an optical signal from the digital data with an optical writer device which (i) rotates about and translates along an axis and (ii) scans an image receiving medium supported by a transport to write an image on the medium, the reading device and writing device operating independently, the control system comprising:

a first microprocessor;

a control panel having actuatable buttons and keys thereon, each button of which, when actuated, provides a corresponding control-related input to the first microprocessor and each key of which represents a data input;

means for interfacing the control panel to the first microprocessor;

wherein one button comprises a format button which, when actuated by an operator, permits the operator to selectively actuate at least one key which represents a corresponding image size on the medium, the selective key actuations being directed to the first microprocessor through the interfacing means to provide inputs to the apparatus which (a) control the clocking rate of digital data from the memory to effect vertical image size and (b) control the rate of translation of the optical writer device.

2. A control system according to claim 1 wherein actuation of the format button permits the operator to selectively actuate at least one key which represents a corresponding position of the medium on the transport.

3. A control system as in claim 2 wherein actuation of the format button permits the operator to selectively actuate at least one key which represents a corresponding position of the paste-up on the transport.

4. A control system according to claim 1 further comprising:
display means for providing a visible output in response to the most recent key actuations, the display means being coupled to the first microprocessor through the interfacing means.

5. A control system as in claim 3 further comprising:
display means for providing a visible output in response to the most recent key actuations, the display means being coupled to the first microprocessor through the interfacing means.

6. A control system according to claim 1 wherein one button comprises a scan button, the actuation of which directs a corresponding signal to the first microprocessor, the first microprocessor signalling the apparatus to provide translation of the optical reader device and the optical writer device.

7. A control system according to claim 6 wherein the apparatus has a motor and lead screw arrangement for translating the reading device and the writing device; and
wherein the first microprocessor comprises:
first means for determining if the motor is on;
second means for determining if the scanner apparatus is flagged to scan; and
third means for determining if the scanner apparatus is flagged to retrace; and
wherein the control system further comprises:
a display which indicates that scanning is taking place when the motor is flagged on as determined by the first means and when the scanning apparatus is flagged on as determined by the second means.

8. A control system for controlling a scanner apparatus which scans, with an optical device which rotates about and translates along an axis, material supported by a transport; the control system comprising:
a first microprocessor:
a control panel having actuatable buttons and keys thereon, each button of which, when actuated, provides a corresponding control-related input to the first microprocessor and each key of which represents a data input; and
means for interfacing the control panel to the first microprocessor;
wherein one button comprises a scan button, the actuation of which directs a corresponding signal to the first microprocessor, the first microprocessor signalling the apparatus to provide translation of the optical device;
wherein the first microprocessor comprises:
first means for determining if the motor is on;
second means for determining if the scanner apparatus is flagged to scan; and
third means for determining if the scanner apparatus is flagged to retrace; and
wherein the control system further comprises:
a display which indicates that scanning is taking place when the motor is flagged on as determined by the first means and when the scanning apparatus is flagged on as determined by the second means.

9. A control system according to claim 8 wherein the display indicates a retracing scan (a) when the motor is flagged on; (b) when the scan flag is not on; and (c) when a retrace flag is determined to be on by the third means.

10. A control system according to claim 9 wherein the microprocessor further comprises:
means for setting retrace parameters relating to the direction, speed, and distance of retrace in response to a determination that the motor is not on as determined by the first means and the scan flag is on as determined by the second means; and
means for starting the motor in response to the setting of parameters by the parameter setting means.

11. A control system according to claim 10 wherein the microprocessor further comprises:
means for resetting the scan flag and setting the retrace flag after the motor is started after the retrace parameters are set.

12. A control system according to claim 11 wherein the microprocessor further comprises:
fourth means for determining if the scanner apparatus is at a home position; and
wherein the display indicates that the scanner is ready for a forward scan when the scanner apparatus is determined to be at the home position by the fourth means.

13. A control system according to claim 12 wherein the microprocessor further comprises:
means for setting scan forward parameters relating to speed, distance, and direction of scan; and
wherein the scan forward parameters are set in response to the actuation of the scan button when the fourth means determines that the scanner apparatus is at the home position; and
wherein the motor is started by a signal from the microprocessor in response to the setting of the forward parameters.

14. A system according to claim 1 wherein the scanner apparatus further includes a drum section and a table bed; and
wherein the control system further comprises:
means for loading a transport from the table bed onto the inner surface of the drum section; and
a second microprocessor for controlling the loading means.

15. A system according to claim 14 wherein one of the buttons comprises a load button which, when pressed, directs a signal toward the second microprocessor indicating that an operator has requested the loading of a transport onto the drum section.

16. A system according to claim 15 wherein the control system further comprises:
means for unloading a transport from the drum section onto the table;
the second microprocessor controlling the unloading means.

17. A system according to claim 14 wherein the control system further comprises:
means for unloading a transport from the drum section onto the table;
the second microprocessor controlling the unloading means.

18. A system according to claim 14 wherein the first microprocessor and the second microprocessor comprises a single unit.

19. A method for selectively, under control of a microprocessor, (a) loading in response to sensed inputs, a material-carrying transport onto the inner surface of a stationary drum section from a table bed and (b) unloading a transport from the drum section onto an upper track above the table bed, the transport entering and exitting the drum section along substantially the same plane, the method comprising the steps of:
determining if a loading or unloading is to be performed;
if unloading is to be performed, determining from a first sensor if there is a transport in the upper track;
if there is no transport in the upper track during unloading, determining the height of the upper track with a second sensor and lowering the upper track to the level of the exitting transport in response to a signal from the microprocessor in response to a corresponding input from the second sensor; and
rotating (a) an inner drum coaxial with and within the drum section and (b) the transport coupled thereto relative to the interior of the stationary drum section and decoupling the transport from (a) the drum section and (b) the inner drum when the upper track is at the proper height as detected by the second sensor; and
moving the transport along the plane onto the upper track following the inner drum rotation and decoupling.

20. The method of claim 19 comprising the further step of:
detecting with a sensor when the transport has completely exitted during unloading.

21. The method of claim 20 comprising the further steps of:
detecting with a third sensor the angular position of the inner drum and determining if the inner drum is at a preset angular position to receive a transport for loading.

22. The method of claim 21 wherein the transport, after loading, is held against the drum section by vacuum devices and is properly positioned relative to the drum section by registration pins extending from the inner drum and through corresponding holes in the transport and drum section respectively, and;
wherein the transport decoupling step comprises the steps of:
discontinuing the vacuum in the vacuum devices; and retracting the registration pins.

23. The method of claim 22 comprising the further steps of:
performing an error unload sequence comprising the steps of (a) turning off all motors, (b) determining if a transport is in the upper track, and (c) determining if the angular position of the inner drum is at the preset position.

24. The method of claim 19 comprising the further steps of:
if loading is to be performed, detecting the angular position of the inner drum with the third sensor and determining in response to the detected angular position if the inner drum is at a preset angular position to receive a transport for loading;
setting the table so that the bed thereof lies substantially along the plane of the transport entering the drum section;
energizing a device which pushes the transport along the bed and toward the inner surface of the drum section; and
detecting with a fourth sensor that the transport is entering up against the drum section.

25. The method of claim 24 comprising the further steps of:
actuating a clamping catch pin from the inner drum which couples the transport to the inner drum;
rotating the inner drum with the transport coupled thereto in a direction which places the transport along the inner surface of the drum section.

26. The method of claim 25 comprising the further steps of:
detecting with a fifth sensor when the inner drum and transport thereon have rotated to a loaded position; and
extending registration pins from the inner drum through corresponding holes in the transport and in the drum section respectively, thereby assuring proper placement of the transport relative to the drum section when the fifth sensor detects that the transport is in the loaded position.

27. The method of claim 26 comprising the further step of:
detecting with a sixth sensor whether the registration pins are registered in the drum section holes after the registration pins are extended.

28. The method of claim 27 comprising the further steps of:
applying vacuums after registration is detected, to a plurality of vacuum devices angularly displaced about the inner surface of the drum section; and
forcing the transport against the uppermost part of the inner surface of the drum section with a squeegee and rolling the squeegee downward and against the transport;
each of the vacuum devices having a vacuum applied thereto before the squeegee rolls past the angular position of such vacuum device.

29. The method of claim 28 comprising the further steps of:
detecting with a seventh sensor when the squeegee has rolled downward to a point at least near the bottommost portion of the loaded transport.

30. The method of claim 29 comprising the further step of:
detecting with an eighth sensor if a transport is positioned in the upper track after a transport on the bed is in the loaded position and thereafter dropping the detected transport on the upper track onto the bed.

31. The method of claim 30 wherein a movable door is interposed between the table and the drum section, the method comprising the further steps of:
detecting with a ninth sensor the position of the door; and
setting the door to a raised position as a transport enters or exits the drum section and setting the door to a closed position after a transport is loaded or unloaded.

32. The method of claim 31 comprising the further step of:
executing an error unload sequence if the loading is not properly performed.

* * * * *